US 12,480,746 B2

(12) United States Patent
Siver

(10) Patent No.: US 12,480,746 B2
(45) Date of Patent: *Nov. 25, 2025

(54) BARRIER FOR ABSORBING VERY HIGH POWER BULLETS AND USES THEREOF

(71) Applicant: 360° Ballistics, LLC, Wake Forest, NC (US)

(72) Inventor: Mark Alan Siver, Youngsville, NC (US)

(73) Assignee: 360° Ballistics, LLC, Wake Forest, NC (US)

( * ) Notice: Subject to any disclaimer, the term of this patent is extended or adjusted under 35 U.S.C. 154(b) by 12 days.

This patent is subject to a terminal disclaimer.

(21) Appl. No.: 18/431,365

(22) Filed: Feb. 2, 2024

(65) Prior Publication Data

US 2024/0175663 A1    May 30, 2024

Related U.S. Application Data

(63) Continuation of application No. 17/557,510, filed on Dec. 21, 2021, now Pat. No. 11,892,273, which is a continuation of application No. 16/869,142, filed on May 7, 2020, now Pat. No. 11,209,245, which is a continuation-in-part of application No. 15/583,545, filed on May 1, 2017, now Pat. No. 10,739,114, and (Continued)

(51) Int. Cl.
*F41H 5/02*    (2006.01)
*F41H 5/24*    (2006.01)

(52) U.S. Cl.
CPC .............. *F41H 5/02* (2013.01); *F41H 5/24* (2013.01)

(58) Field of Classification Search
CPC ...... F41J 13/00; C04B 40/0039; C04B 28/04; C04B 2201/20; C04B 2103/304; C04B 2111/2046; Y02W 30/96
See application file for complete search history.

(56) References Cited

U.S. PATENT DOCUMENTS 4,046,582 A    9/1977   Kawamura et al.
4,075,808 A    2/1978   Pearlman
(Continued)

FOREIGN PATENT DOCUMENTS

WO         2012020229 A1     2/2012

OTHER PUBLICATIONS

Hudson, Kenneth L. et al., Final Report Demonstration of Shock-Absorbing Concrete (SACON) Bullet Trap Technology (Report No. ATC-8183), Aug. 1999, 219 pages, U.S. Army Environmental Center, Aberdeen Proving Ground, MD 21010-5401. (Year: 1999).*

(Continued)

*Primary Examiner* — Jeffrey S Vanderveen
(74) *Attorney, Agent, or Firm* — NEO IP

(57) ABSTRACT

This disclosure is directed to an improved ballistic concrete mixture which is operable to be cast in many forms such as blocks. The improved ballistic concrete mixture provides an effective barrier for stopping projectiles with a kinetic energy of between about 1.0 kJ (750 foot-pounds) and 20.3 kJ (15,000 foot-pounds) in between about 3 inches and 10 inches such as a fifty-caliber round. The improved ballistic concrete mixture is useful in the erecting of new structures which need ballistics protection or for retrofitting existing structures with ballistics protection.

18 Claims, 33 Drawing Sheets

Related U.S. Application Data a continuation-in-part of application No. 15/440,126, filed on Feb. 23, 2017, now Pat. No. 10,704,256, and a continuation-in-part of application No. 15/434,847, filed on Feb. 16, 2017, now Pat. No. 10,823,535, which is a continuation-in-part of application No. 14/268,435, filed on May 2, 2014, now Pat. No. 9,604,321, said application No. 15/440,126 is a continuation-in-part of application No. 14/268,435, filed on May 2, 2014, now Pat. No. 9,604,321, said application No. 15/583,545 is a continuation of application No. 13/449,420, filed on Apr. 18, 2012, now abandoned.

(60) Provisional application No. 62/352,700, filed on Jun. 21, 2016, provisional application No. 61/818,873, filed on May 2, 2013, provisional application No. 61/476,491, filed on Apr. 18, 2011.

(56) References Cited

U.S. PATENT DOCUMENTS

| | | | |
|---|---|---|---|
| 4,249,948 A | 2/1981 | Okada et al. | |
| 4,391,664 A | 7/1983 | Kramer | |
| 4,488,910 A | 12/1984 | Nicholson et al. | |
| 4,683,800 A | 8/1987 | Snedeker | |
| 4,737,193 A | 4/1988 | Gutmann et al. | |
| 4,979,425 A | 12/1990 | Sprague | |
| 5,131,791 A | 7/1992 | Kitziller | |
| 5,456,752 A | 10/1995 | Hogan | |
| 5,976,656 A | 11/1999 | Giraud | |
| 6,244,009 B1 | 6/2001 | Cerrato | |
| 6,264,735 B1 | 7/2001 | Bean et al. | |
| 6,423,134 B1 | 7/2002 | Trottier et al. | |
| 6,568,310 B2 | 5/2003 | Morgan | |
| 6,582,511 B1 | 6/2003 | Velpari | |
| 6,620,236 B2 * | 9/2003 | Huntsman | C04B 28/02 106/713 |
| 6,688,811 B2 | 2/2004 | Forrester | |
| 6,758,020 B2 | 7/2004 | Cerrato | |
| 6,758,897 B2 | 7/2004 | Rieder et al. | |
| 6,782,673 B2 | 8/2004 | Azar | |
| 6,972,100 B2 | 12/2005 | Minke et al. | |
| 7,111,847 B2 | 9/2006 | Larson et al. | |
| 7,243,921 B2 | 7/2007 | Larson et al. | |
| 7,357,394 B2 | 4/2008 | Halverson | |
| 7,562,613 B2 | 7/2009 | Ahmad | |
| 7,628,104 B2 | 12/2009 | Warren et al. | |
| 7,677,151 B2 | 3/2010 | Ahmad | |
| 7,748,307 B2 | 7/2010 | Hallissy et al. | |
| 7,845,266 B2 | 12/2010 | Duke et al. | |
| 7,849,780 B1 | 12/2010 | Hallissy et al. | |
| 8,043,982 B2 | 10/2011 | Telander | |
| D662,225 S | 6/2012 | Amidon et al. | |
| 8,479,464 B2 | 7/2013 | Holzworth | |
| 8,959,862 B1 | 2/2015 | Kreizinger | |
| 9,021,761 B2 | 5/2015 | Riccobene et al. | |
| 9,074,850 B2 | 7/2015 | Bergiadis | |
| 9,121,675 B1 | 9/2015 | Amidon et al. | |
| 9,440,883 B1 | 9/2016 | Brien | |
| 9,604,321 B1 | 3/2017 | Amidon et al. | |
| 2003/0051418 A1 | 3/2003 | Crowder | |
| 2007/0062143 A1 | 3/2007 | Noushad | |
| 2008/0092471 A1 | 4/2008 | Ahmad | |
| 2008/0275149 A1 | 11/2008 | Ladely et al. | |
| 2009/0020044 A1 | 1/2009 | Constantz et al. | |
| 2009/0049778 A1 | 2/2009 | Kralic et al. | |
| 2009/0162626 A1 | 6/2009 | Konishi et al. | |
| 2009/0169855 A1 | 7/2009 | Tunis | |
| 2009/0282969 A1 | 11/2009 | Ahmad | |
| 2009/0293711 A1 | 12/2009 | Altergott et al. | |
| 2010/0083819 A1 | 4/2010 | Mann et al. | |
| 2010/0229715 A1 | 9/2010 | Tonyan et al. | |
| 2010/0230035 A1 | 9/2010 | Frank et al. | |
| 2010/0326336 A1 | 12/2010 | Struthers et al. | |
| 2011/0107904 A1 | 5/2011 | Queheillalt et al. | |
| 2011/0197789 A1 | 8/2011 | Novak et al. | |
| 2013/0012625 A1 | 1/2013 | Li et al. | |
| 2014/0116235 A1 | 5/2014 | Berroth et al. | |
| 2014/0150362 A1 | 6/2014 | Propst | |
| 2015/0315798 A1 | 11/2015 | Propst | |
| 2016/0289121 A1 | 10/2016 | Coleman | |
| 2017/0160059 A1 | 6/2017 | Amidon et al. | |
| 2017/0175388 A1 | 6/2017 | Siver et al. | |
| 2017/0234659 A1 | 8/2017 | Amidon et al. | |
| 2020/0332520 A1 | 10/2020 | Siver et al. | |
| 2020/0340784 A1 | 10/2020 | Siver | |
| 2021/0010788 A1 | 1/2021 | Amidon et al. | |
| 2021/0239433 A1 | 8/2021 | Amidon et al. | |
| 2022/0282957 A1 | 9/2022 | Siver | |

OTHER PUBLICATIONS

Hudson, Kenneth L. et al., Final Report Demonstration of Shock-Absorbing Concrete (SACON) Bullet Trap Technology (Report No. ATC-8183), Aug. 1999, 219 pages, U.S. Army Environmental Center, Aberdeen Proving Ground, MD 21010-5401.

Technical Specification for Shock Absorbing Concrete (SACON. RTM.)—Shock Absorbing Concrete for Constructing Live-Fire Training Facilities, Document metadata bears creation date of Feb. 12, 2007, 25 pages, U.S. Army Corps of Engineers.

Whiting, David A., Manual on Control of Air Content in Concrete, 1998, 52 pages, Portland Cement Association, Skokie, Illinois, USA.

www.graceconstruction.com, Grace Concrete Products Darafill Dry Controlled low strengthadditive. (Year: 2007).

* cited by examiner

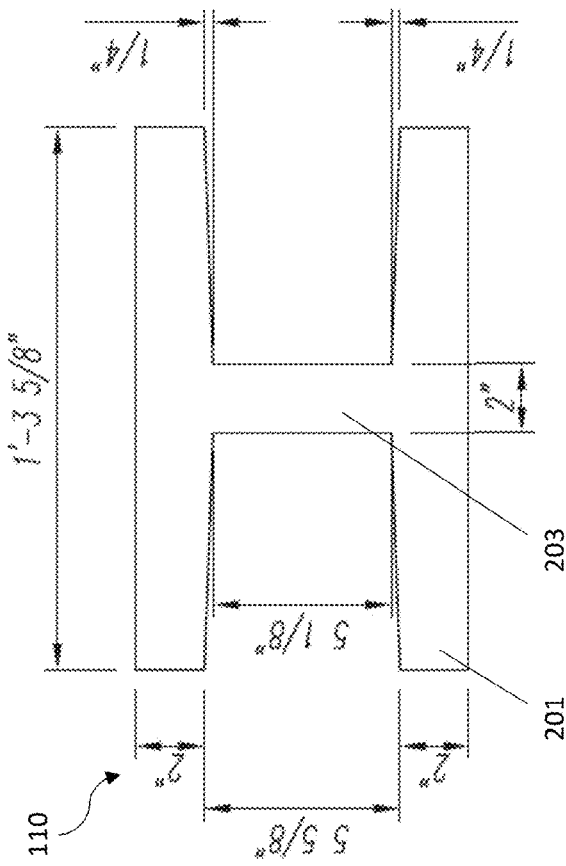
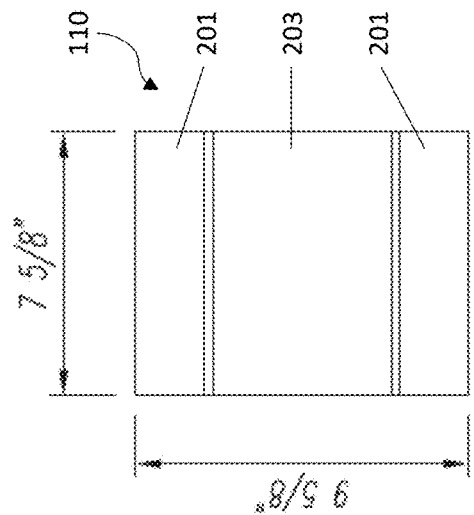
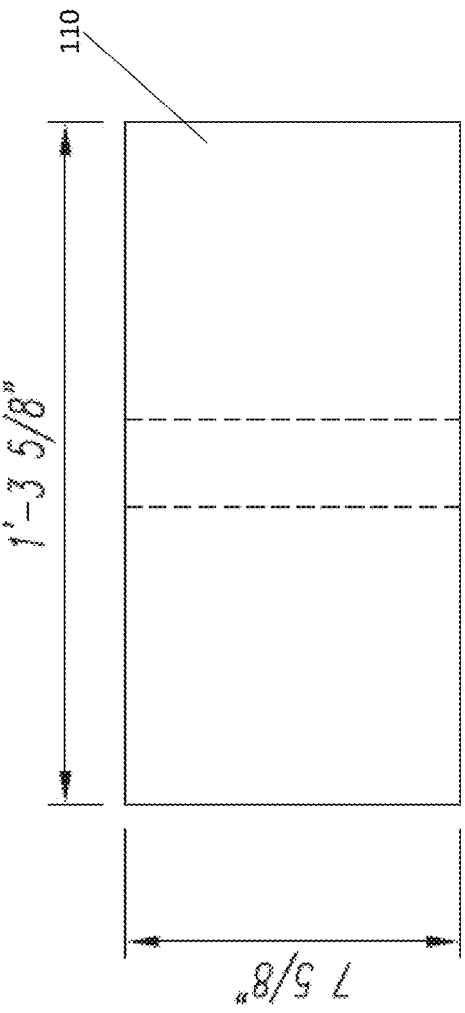

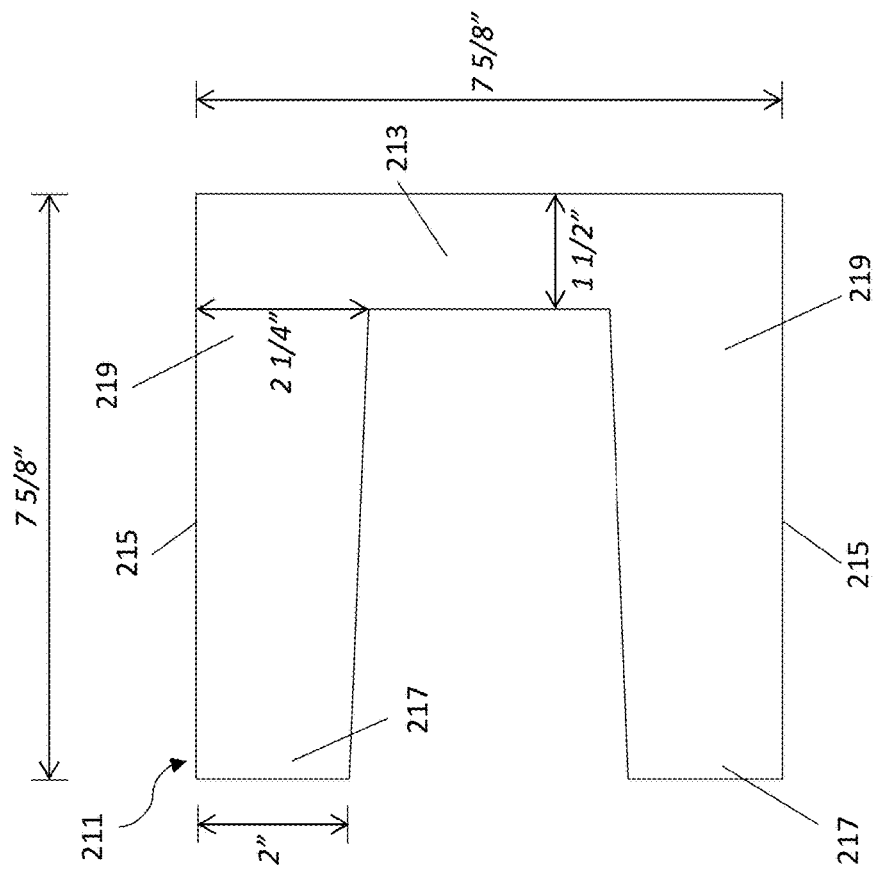
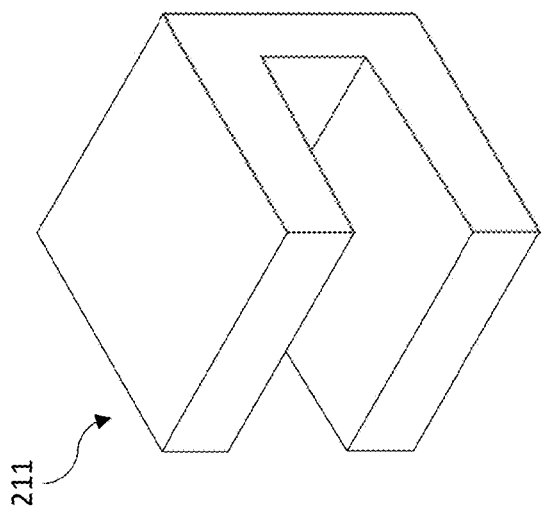
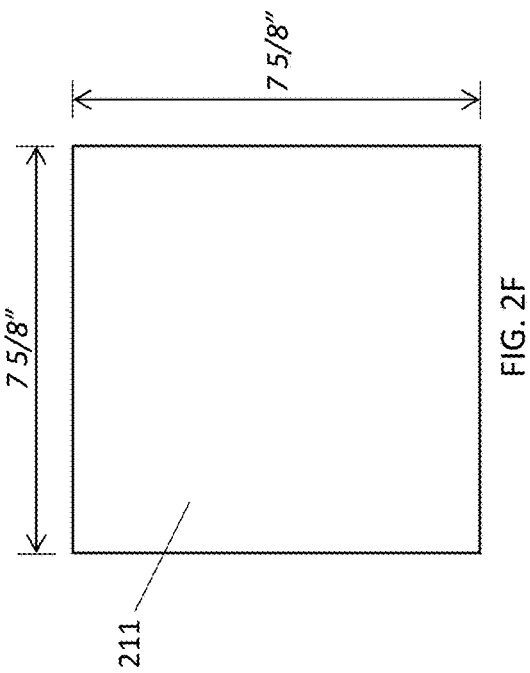
FIG. 2E
FIG. 2D
FIG. 2F

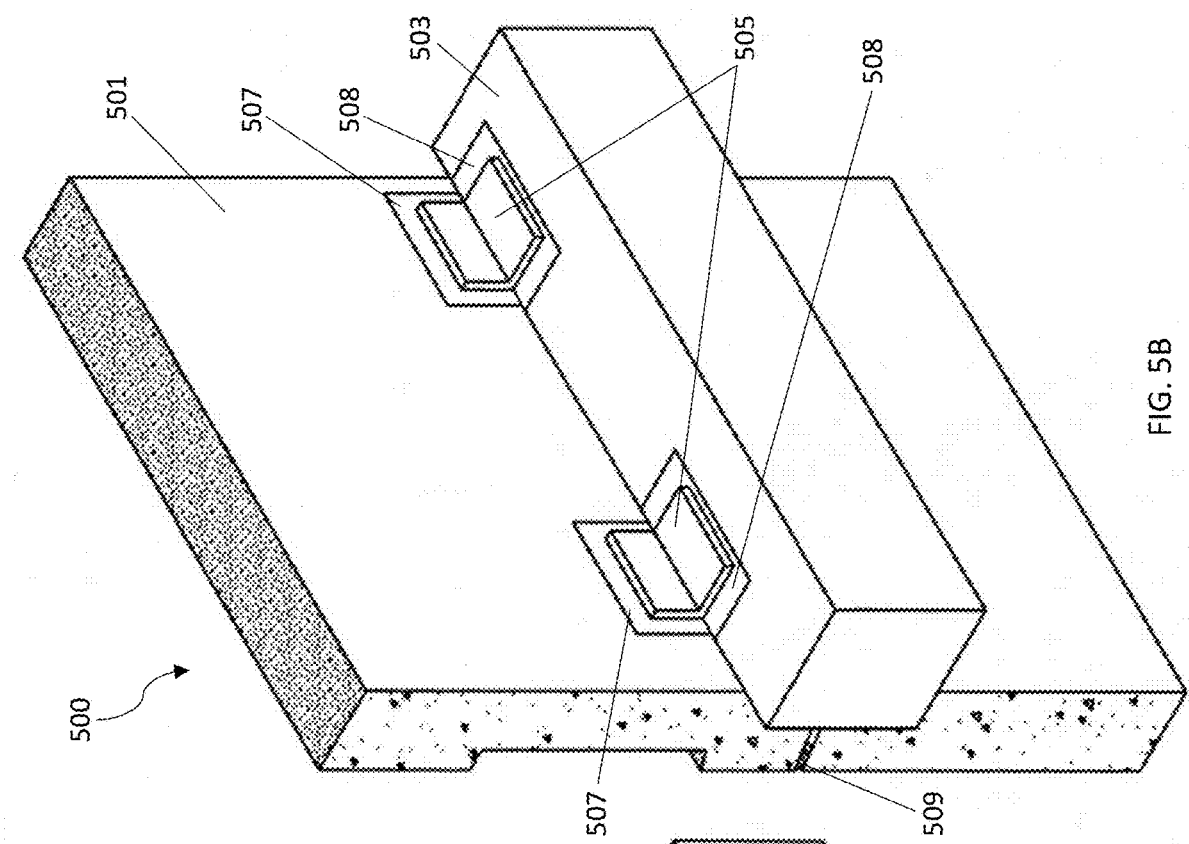
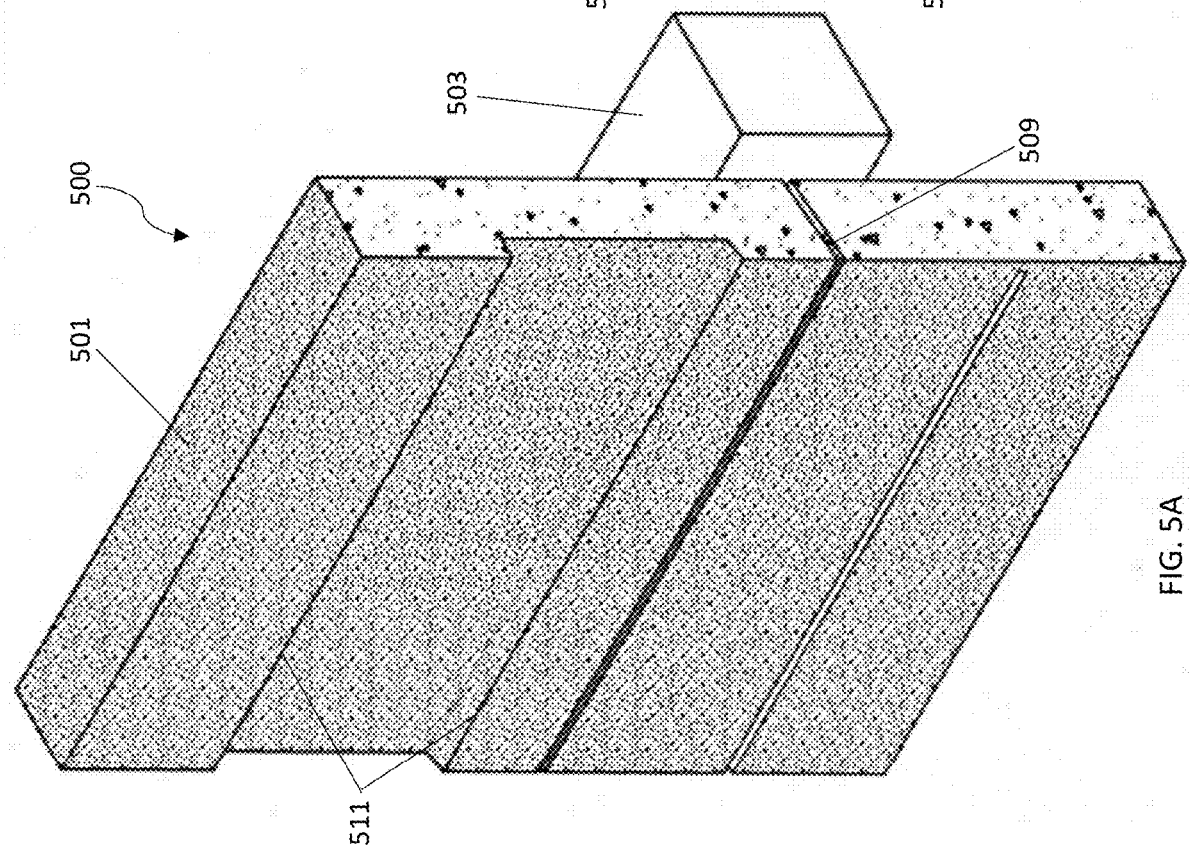

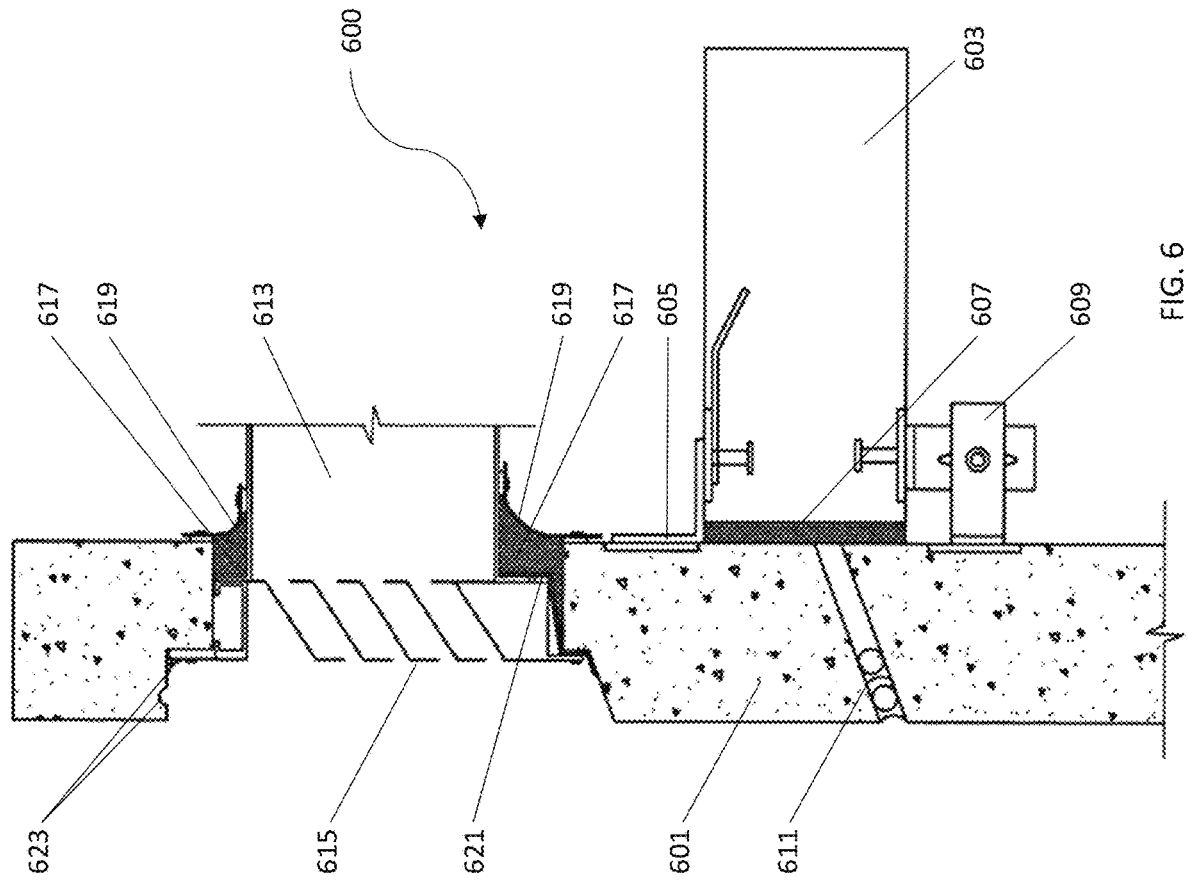

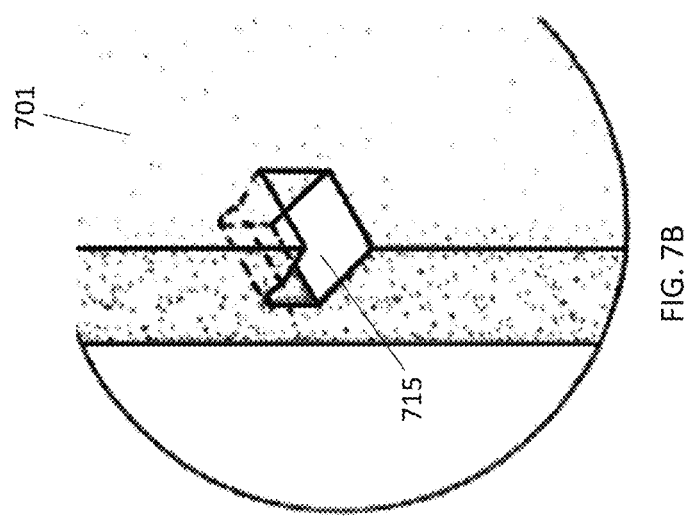
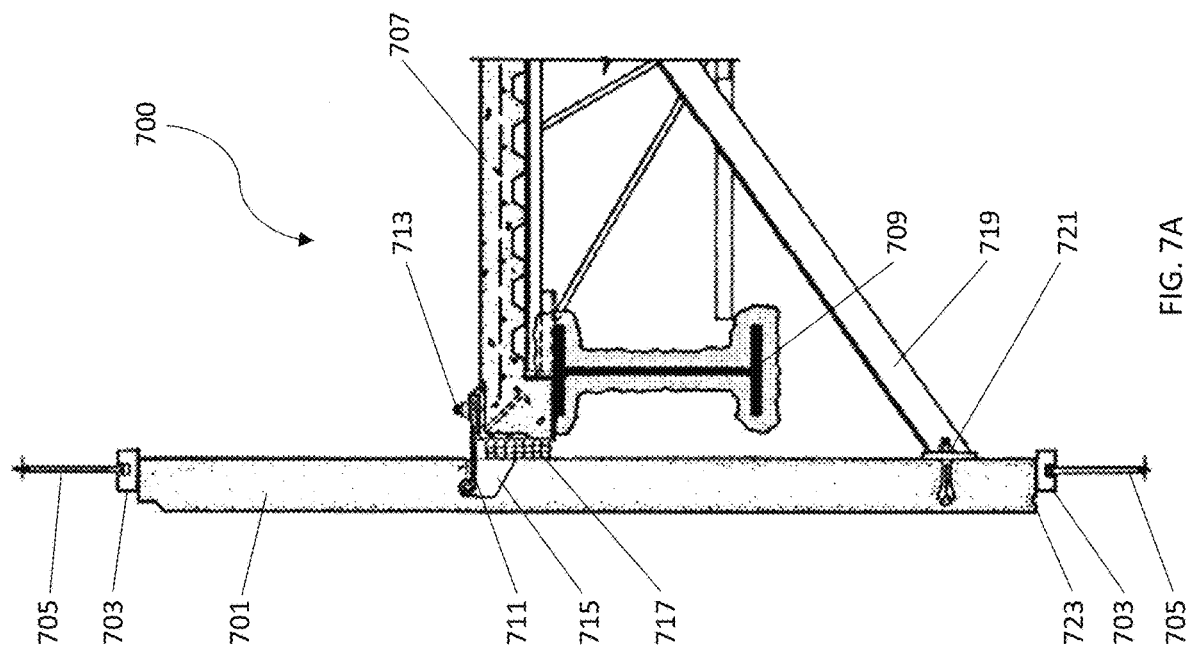
FIG. 7B
FIG. 7A

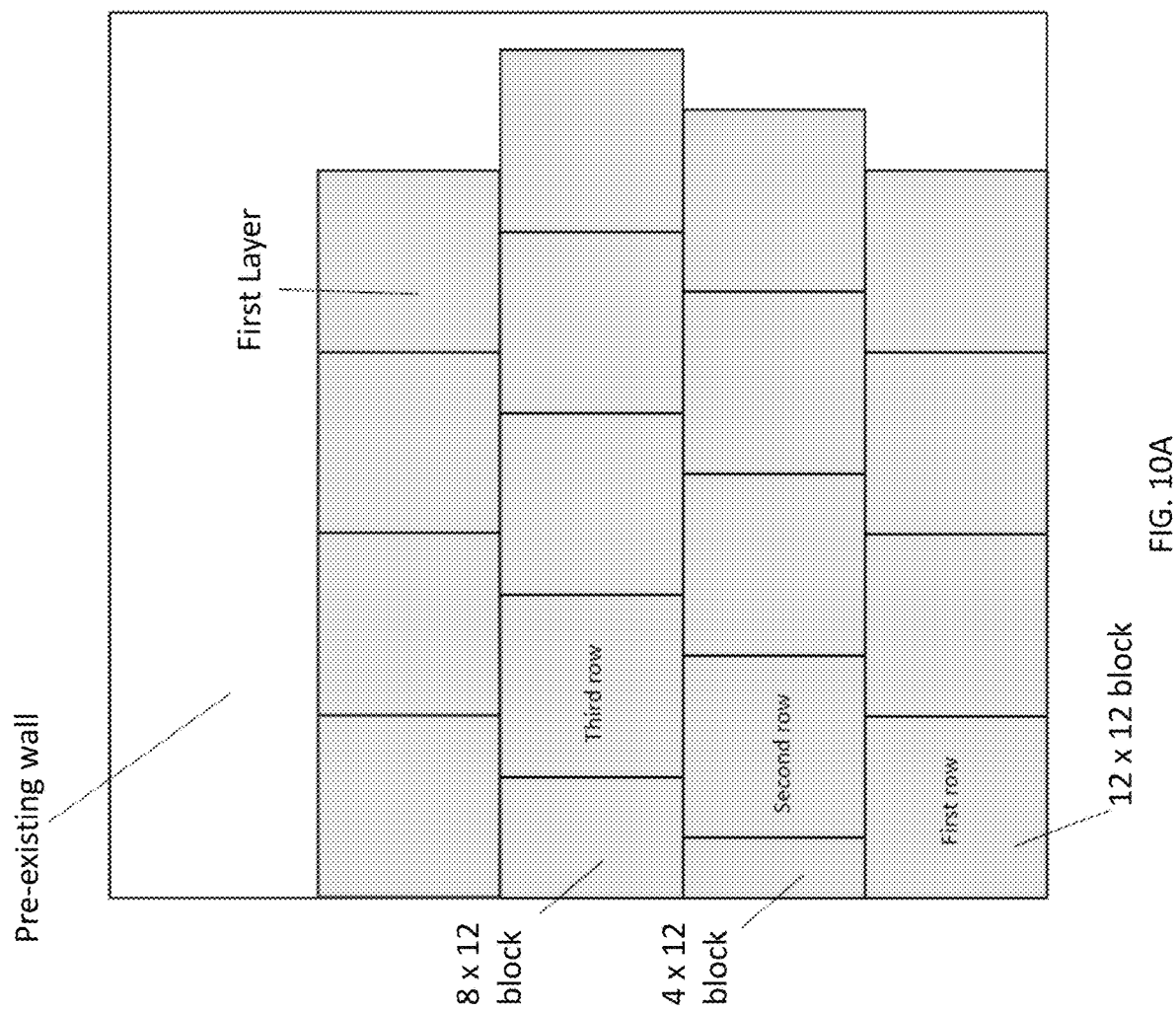

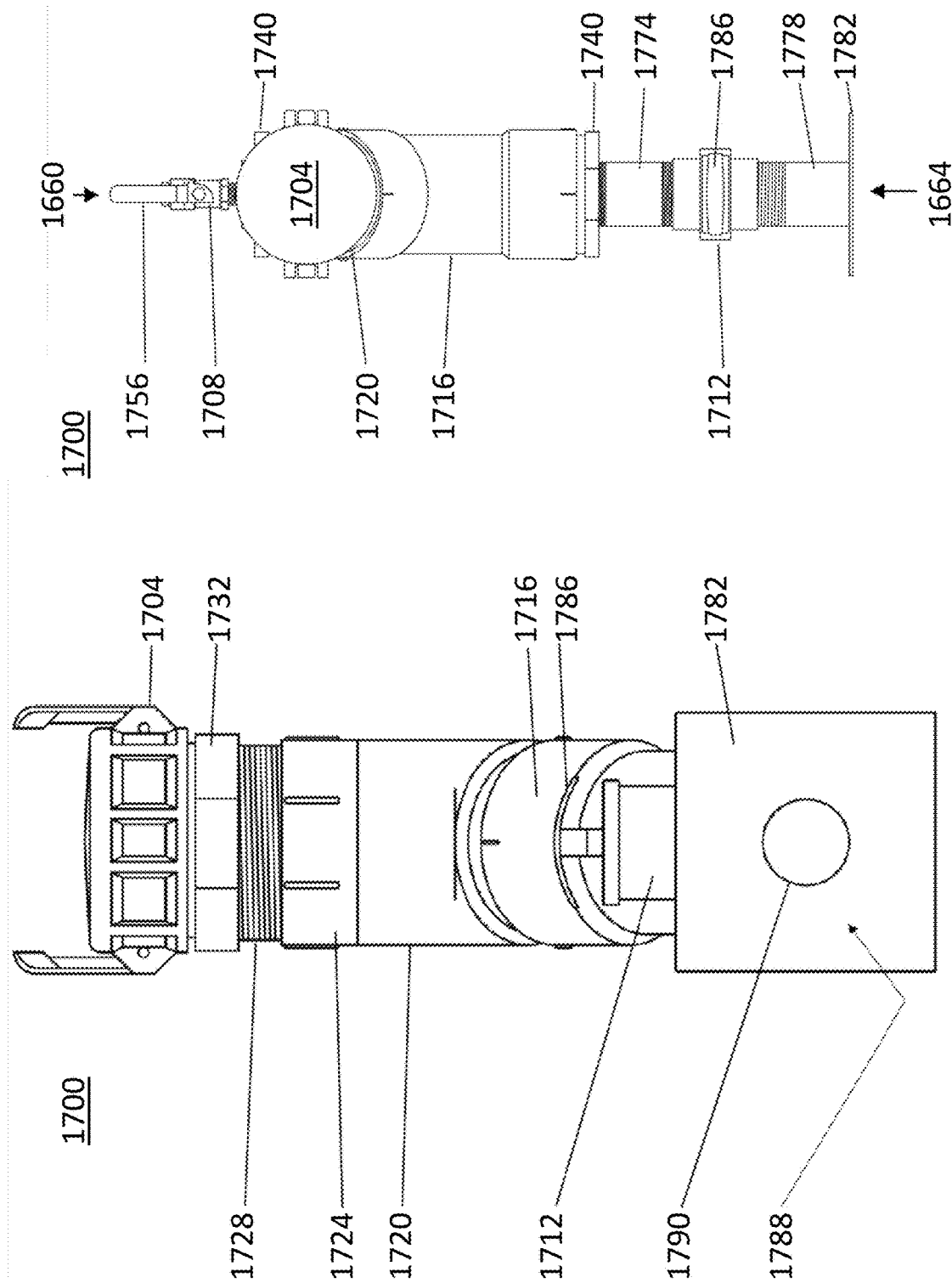

BARRIER FOR ABSORBING VERY HIGH POWER BULLETS AND USES THEREOF

CROSS REFERENCE TO RELATED APPLICATIONS

This application is related to and claims priority to the following US applications. This application is a continuation of U.S. application Ser. No. 17/557,510, filed Dec. 21, 2021, which is a continuation of U.S. application Ser. No. 16/869,142, filed May 7, 2020, which is a continuation-in-part of U.S. application Ser. No. 15/583,545, filed May 1, 2017, which is a continuation of U.S. application Ser. No. 13/449,420, filed Apr. 18, 2012, which claims the benefit of U.S. Provisional Application No. 61/476,491, filed Apr. 18, 2011, each of which is hereby incorporated by reference in its entirety. U.S. application Ser. No. 16/869,142, filed May 7, 2020 is also a continuation-in-part of U.S. application Ser. No. 15/434,847, filed Feb. 16, 2017, which is a continuation-in-part of U.S. application Ser. No. 14/268,435, filed May 2, 2014, which claims the benefit of U.S. Provisional Application No. 61/818,873, filed May 2, 2013, each of which is hereby incorporated by reference in its entirety. U.S. application Ser. No. 16/869,142 is also a continuation-in-part of U.S. application Ser. No. 15/440,126, filed Feb. 2, 2017, which claims priority to U.S. Provisional Application No. 62/352,700, filed Jun. 21, 2016, and is also a continuation-in-part of U.S. application Ser. No. 14/268,435, filed May 2, 2014, which claims the benefit of U.S. Provisional Application No. 61/818,873, filed May 2, 2013, each of which is hereby incorporated by reference in its entirety.

BACKGROUND OF THE INVENTION

1. Field of the Disclosure

This disclosure relates to an improved ballistic concrete barrier and methods of using the barrier for training with very high power weapons such as those that fire fifty caliber bullets. Training facilities need backstops or other components which are able to safely absorb very high power live ammunition.

2. Background of the Invention

Fifty Caliber Arms

The fifty caliber weapons as they are currently known were developed just prior to World War I and became well-known through the fifty caliber Browning Machine Gun (.50 BMG). These weapons fire fifty caliber bullets that weigh from 600-800 grains (40-50 g) and have a diameter of 0.51 inches (12.95 mm). The standard military issue ball is 665 grains. The typical muzzle velocity of 2800-3100 feet/sec (850-950 m/s). Because of the large mass of the bullet and high velocity, the kinetic energies are very high 12,000-15,000 foot-pounds (17-21 kJ). In contrast, a .30-06 bullet shot by hunting rifle or a standard issue weapon for soldiers during World War II has a muzzle energy of 2000-3000 foot-pounds (3-4 kJ). Thus, a fifty caliber bullet impacts a target with many times the kinetic energy of conventional small arms.

Historically, fifty caliber arms would be mounted on a vehicle or set up in a bunker for use as anti-aircraft weapon. However, since the 1980's portable versions of fifty caliber arms have become widely used by military snipers. Fifty caliber advantages include a high mass and kinetic energy making them resistant to wind drift. The high kinetic energy makes them particularly lethal. Thus, fifty caliber weapons may be used effectively by a sniper for a target more than a mile away. Examples of such portable weapons are the single shot A15 or the semi-automatic Barrett M82. In addition to military uses they are used by the coast guard and some police forces, e.g., New York City, because a single shot landed in an engine block effectively disables a vehicle or speedboat. Police forces also have used fifty caliber weapons because they will penetrate most commercial brick walls and cinder blocks.

3. Description of the Prior Art

Shock Absorbing Concrete (SACON®)

Training is essential for both the military and civilian police forces. However, designing adequate backstops for military training, police, or civilian target practice, has been difficult. There are many difficulties associated with preparing such backstops. For example, a material must be strong enough to stop bullets, yet also must not cause ricochets because of risk to a shooter or bystander and must minimize the creation of lead dust from bullets spalling or fragmenting on impact. Wood backstops are problematic because insect or vermin infestation often leads to degradation and breakdown. Chemical treatment of wood creates additional environmental hazards associated with biocides or other toxins. Earthen barriers are difficult to move and stage in different settings, such as different lighting conditions. Over time earthen barriers erode or wash away. Historically, fiber reinforced foamed concrete provided some benefits for training structures as a material that (1) resisted breakdown, (2) stopped bullets, and (3) prevented ricochets.

Lead from bullets is another fundamental problem. Lead is a heavy metal neurotoxin that accumulates over time in soft tissues, blood and bone. Exposures to extremely low concentrations of lead have been documented to cause learning disabilities and other neurological damage. Thus, lead is hazard with a potential for long-term harm. Lead from bullets often enters the environment as either elemental lead dust generated from the impact of bullets with the backstop or lead salts which leach from the backstop into water supplies.

To address many of these concerns, researchers at the U.S. Army Engineer Research and Development Center (ERDC) invented SACON®, a low-leaching, foamed concrete. SACON® is effective absorbing low power projectiles and eliminating ricochets. As currently formulated it is a fiber-reinforced concrete with high concentrations of calcium phosphate and aluminum hydroxide to prevent leaching of lead fragments. U.S. Pat. No. 6,264,735 (Bean et al., "the '735 patent") describes SACON® and the reduced lead-leaching from the SACON® blocks. U.S. Pat. No. 6,620,236 (Huntsman et al., "the '236 patent") describes an improvement of the '735 patent formulation that includes an aluminum hydroxide additive to reduce or eliminate the erosion of heavy metals such as lead from the foamed concrete. The contents of both the '735 and the '236 patents are hereby incorporated by reference in its entirety.

SACON® is prepared using an air compressor by adding a wet foam that contains a foaming agent and a foam stabilizing agent such as hydroxypropyl methyl cellulose. The wet foam is added to the concrete mixture to achieve the appropriate density required by the military specifications. SACON® has been widely used by the military on bases in the U.S. and abroad. It has been used by other government agencies, e.g., police forces or the Drug Enforcement Agency. It is effective in stopping bullets from conventional small arms such as rifles (0.22 caliber, M16 (5.56 mm)) or pistols (0.38 caliber, 0.45 caliber, 9 mm). The reported penetration depths range from 1 inch (25 mm) for a 0.38 caliber pistol to 2.55 inches (63 mm) for 5.56 mm (M16 rifle), see Hudson et al., Final Report Demonstration of Shock-Absorbing Concrete (SACON) Bullet Trap Technology, August 1999.

While SACON® barriers are effective for conventional low power arms, e.g., 9 mm or 5.56 mm, they are ineffective for very high power bullets such as fifty caliber bullets. Fifty caliber bullets have been reported to penetrate SACON® to a depth of 18 inches or more. Given that the SACON® barriers, are often approximately two feet thick and sometimes receive impacts from either side of the barrier, 18 inches of penetration (to the trailing edge of the bullet) is too deep. The military has a long felt need for a barrier that would be effective for very high power weapons such as the fifty caliber so they are able to have more flexibility in the layout and design for their fifty caliber training exercises. Anecdotal reports from military bases indicate that stray bullets from fifty caliber weapons are occasionally found in the small caliber arms ranges, indicating that conventional backstops are not 100% effective. Thus, there is a need for more reliable backstops for use with fifty caliber training exercises. In addition, trainers would like to be able to have live-fire exercises using fifty caliber weapons in combination with other small arms or grenades. An example of such a drill would be live-fire from a fifty-caliber weapon on a Humvee while soldiers use conventional arms to attack a mock enclave. The disclosure described herein addresses this long-felt need for improved barriers capable of stopping very high power bullets.

Prior art patent documents include the following:

U.S. Pat. No. 7,562,613 for protective structure and protective system by inventor Ahmad, filed Nov. 30, 2005 and issued Jul. 21, 2009, is directed to a protective structure for protecting buildings, bridges, roads and other areas from explosive devices such as car bombs and the like which comprises: (a) a mesh structure having an outer surface and an inner surface, wherein the inner surface defines an annular space; (b) a plurality of structural steel cables in contact with the mesh structure; (c) a composite fill material which resides within the annular space of the mesh structure and within the mesh structure; (d) at least one reinforcement member which resides within the composite fill material; and (e) a composite face material which resides upon the outer surface of the mesh structure. The mesh structure may be made up of, for example, steel wire. A protective system for protecting buildings, bridges, roads and other areas from explosive devices such as car bombs and the like comprises a plurality of the above described protective structures and a plurality of support members, wherein the support members provide interlocking engagement of the protective structures to the support members.

U.S. Pat. No. 7,677,151 for protective structure and protective system by inventor Ahmad, filed Jul. 7, 2009 and issued Mar. 16, 2010, is directed to a protective structure for protecting buildings, bridges, roads and other areas from explosive devices such as car bombs and the like which comprises: (a) a mesh structure having an outer surface and an inner surface, wherein the inner surface defines an annular space; (b) a plurality of structural steel cables in contact with the mesh structure; (c) a composite fill material which resides within the annular space of the mesh structure and within the mesh structure; (d) at least one reinforcement member which resides within the composite fill material; and (e) a composite face material which resides upon the outer surface of the mesh structure. The mesh structure may be made up of, for example, steel wire. A protective system for protecting buildings, bridges, roads and other areas from explosive devices such as car bombs and the like comprises a plurality of the above described protective structures and a plurality of support members, wherein the support members provide interlocking engagement of the protective structures to the support members.

U.S. Pat. No. 7,748,307 for shielding for structural support elements by inventor Hallissy et. al., filed Aug. 4, 2006 and issued Jul. 6, 2010, is directed to a shield for shielding a structural member from an explosive blast or accidental or malicious destruction is provided. The shield includes a plurality of shield members which include cast ultra high strength concrete, wherein the shield members are capable of being assembled to enclose at least a portion of the structural member to provide protection to the enclosed portion from, for example, an explosive blast. In one embodiment, the shield members include a chassis, at least one ballistic liner disposed on the energy absorbing layer, and a concrete-integrating structure.

U.S. Pat. No. 5,976,656 for shock damper coating by inventor Giraud, filed May 15, 1997 and issued Nov. 2, 1999, is directed to the damper coating for shocks produced by a collision, or impacts produced by a shockwave, contains at least one layer of a crushing material (2) intended to cover a surface to be protected, the external layer of the crushing material (2) being, according to the present invention, covered by a skin (4) capable of providing a widening of the area affected by the shock or impact. The skin (4) contains, in particular, several layers (51; 52; 53) of scales (61; 62; 63), the scales of one layer being offset in staggered rows with respect to the scales of the following layer and being separated from the neighbouring scales of the same layer or capable of being separated from the latter on the application of the shock or impact. The structure of this damper coating is designed to dampen the impact under a reduced thickness.

U.S. Pat. No. 6,972,100 for Method and system for providing articles with rigid foamed cementitious cores by inventor Minke et al., filed Apr. 29, 2003 and issued Dec. 6, 2005, is directed to one aspect of the present invention pertains to an apparatus for forming a rigid foamed cementitious core within a plurality of article shells. In general, the apparatus can be comprised of a shell bank for retaining a plurality of article shells and comprising a sled and a plurality of reinforcement shells, a filing station for delivering a gas-entrained cementitious material, and a pump. The gas-entrained cementitious material cures to form a rigid foamed cementitious core within each article shell in the plurality of article shells.

U.S. Pat. No. 4,391,664 for process for fixing tiles in position by inventor Kramer, filed Sep. 2, 1980 and issued Jul. 5, 1983, is directed to a process for fixing wear-resistant armoring tiles to cement mortar. In accordance with the process, the back sides of the tiles are coated with a mixture of polyester epoxy resin composition including sand and quartz or sand powder, with a curing agent. A material having an affinity for the cement mortar (like quartz sand or lavalite) is dusted and rolled into the coated back side of the tiles, so as to thoroughly be mixed up with the resin mixture coating. After the hardening of the coating including the material having affinity to cement mortar, the tiles are embedded in the cement mortar. Accordingly, this process substantially eliminates the well-known poor adhesive properties of such tiles with respect to cement mortar.

U.S. Pat. No. 7,849,780 for shielding for structural support elements by inventor Hallissy et al., filed Mar. 17, 2009 and issued Dec. 14, 2010, is directed to a shield for shielding a structural member from an explosive blast or accidental or malicious destruction is provided. The shield includes a plurality of shield members which include cast ultra high strength concrete, wherein the shield members are capable of being assembled to enclose at least a portion of the structural member to provide protection to the enclosed portion from, for example, an explosive blast. In one embodiment, the shield members include a chassis, at least one ballistic liner disposed on the energy absorbing layer, and a concrete-integrating structure.

U.S. Patent Application No. 2014/0150362 for building panels and method of forming building panels by inventor Propst, filed Dec. 13, 2013 and published Jun. 5, 2010, is directed to a building panel structure is disclosed, in which building panels are used to form a structure. Roof panels and roof panel tiles are disclosed, which can be used to form the roof of the structure. The roof panels and the building panels include a core and a coating covering a portion of the core. In some embodiments the core consists of a frame and at least one insulating structural block. The insulating structural blocks can be encapsulated polystyrene (EPS) foam blocks. In some embodiments the coating includes ceramic material. In some embodiments the coating includes a first layer and a second layer. In some embodiments the coating is used to retrofit preexisting wall structures. The roof panel and the roof tile can be shaped, formed, and colored to look like traditional roof tiles such as shake roof tiles or Spanish roof tiles.

U.S. Patent Application No. 2015/0315798 for building panels and method of forming building panels by inventor Propst, filed Jun. 23, 2015 and published Nov. 5, 2015, is directed to a building panel structure is disclosed, in which building panels are used to form a structure. Roof panels and roof panel tiles are disclosed, which can be used to form the roof of the structure. The roof panels and the building panels include a core and a coating covering a portion of the core. In some embodiments the core consists of a frame and at least one insulating structural block. The insulating structural blocks can be encapsulated polystyrene (EPS) foam blocks. In some embodiments the coating includes ceramic material. In some embodiments the coating includes a first layer and a second layer. In some embodiments the coating is used to retrofit preexisting wall structures. The roof panel and the roof tile can be shaped, formed, and colored to look like traditional roof tiles such as shake roof tiles or Spanish roof tiles.

U.S. Patent Application No. 2009/0282969 for protective structure and protective system by inventor Ahmad, filed Jul. 7, 2009 and published Nov. 19, 2009, is directed to a protective structure for protecting buildings, bridges, roads and other areas from explosive devices such as car bombs and the like comprises: (a) a mesh structure having an outer surface and an inner surface, wherein the inner surface defines an annular space; (b) a plurality of structural steel cables in contact with the mesh structure; (c) a composite fill material which resides within the annular space of the mesh structure and within the mesh structure; (d) at least one reinforcement member which resides within the composite fill material; and (e) a composite face material which resides upon the outer surface of the mesh structure. The mesh structure may be made up of, for example, steel wire. A protective system for protecting buildings, bridges, roads and other areas from explosive devices such as car bombs and the like comprises a plurality of the above described protective structures and a plurality of support members, wherein the support members provide interlocking engagement of the protective structures to the support members.

U.S. Patent Application No. 2008/0092471 for protective structure and protective system by inventor Ahmad, filed Nov. 30, 2005 and published Apr. 24, 2008, directed to a protective structure for protecting buildings, bridges, roads and other areas from explosive devices such as car bombs and the like comprises: (a) a mesh structure having an outer surface and an inner surface, wherein the inner surface defines an annular space; (b) a plurality of structural steel cables in contact with the mesh structure; (c) a composite fill material which resides within the annular space of the mesh structure and within the mesh structure; (d) at least one reinforcement member which resides within the composite fill material; and (e) a composite face material which resides upon the outer surface of the mesh structure. The mesh structure may be made up of, for example, steel wire. A protective system for protecting buildings, bridges, roads and other areas from explosive devices such as car bombs and the like comprises a plurality of the above described protective structures and a plurality of support members, wherein the support members provide interlocking engagement of the protective structures to the support members.

SUMMARY OF THE INVENTION

The present invention relates to ballistic concrete barriers.

It is an object of this invention to provide an improved ballistic concrete barrier and methods of using the barrier for training with very high power weapons such as those that fire 0.22, 0.30-06, 0.50, and 7.62 NATO caliber rounds, and for providing ballistics protections on buildings and other structures.

In one embodiment, the present invention provides a method of forming bullet resistant blocks of various forms.

In another embodiment, the present invention provides a method of forming a bullet resistant wall comprising ballistic paver blocks.

In yet another embodiment, the present invention provides a method of forming a bullet resistant wall comprising ballistic paver blocks wherein the ballistic paver blocks do not contain any foam.

These and other aspects of the present invention will become apparent to those skilled in the art after a reading of the following description of the preferred embodiment when considered with the drawings, as they support the claimed invention.

BRIEF DESCRIPTION OF THE DRAWINGS

FIG. 2A illustrates a top orthogonal view of a ballistic concrete block, according to one embodiment of the present invention.

FIG. 2B illustrates a side orthogonal view of a ballistic concrete block, according to one embodiment of the present invention.

FIG. 2C illustrates a front orthogonal view of a ballistic concrete block, according to one embodiment of the present invention.

FIG. 2D illustrates a top perspective view of a ballistic concrete half-block, according to one embodiment of the present invention.

FIG. 2E illustrates a top orthogonal view of a ballistic concrete half-block, according to one embodiment of the present invention.

FIG. 2F illustrates a side orthogonal view of a ballistic concrete half-block, according to one embodiment of the present invention.

FIG. 5A illustrates a front perspective cross-sectional view of a ballistic cladding assembly, according to one embodiment of the present invention.

FIG. 5B illustrates a rear perspective cross-sectional view of a ballistic cladding assembly, according to one embodiment of the present invention.

FIG. 6 illustrates a side orthogonal cross-sectional view of a ballistic cladding assembly, according to one embodiment of the present invention.

FIG. 7A illustrates a side orthogonal cross-sectional view of a ballistic cladding assembly, according to one embodiment of the present invention.

FIG. 7B illustrates a detail view of the ballistic cladding assembly of FIG. 7A, according to one embodiment of the present invention.

FIG. 10A illustrates a front orthogonal view of a wall with a first layer of ballistic paver blocks according to one embodiment of the present invention.

FIG. 18 illustrates a front orthogonal view of an injector assembly, according to one embodiment of the present invention.

FIG. 19 illustrates a top orthogonal view of an injector assembly, according to one embodiment of the present invention.

DETAILED DESCRIPTION

Figure 1A:
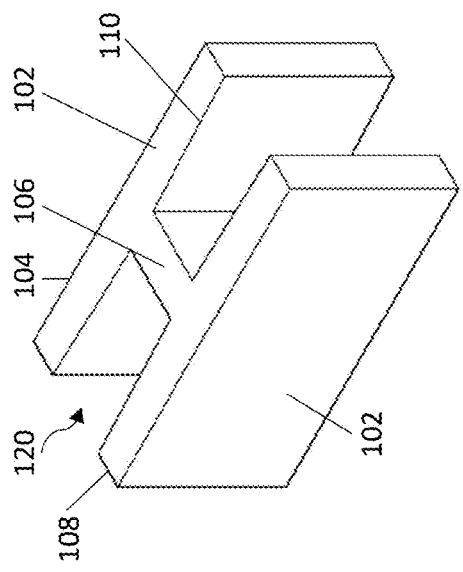
FIG. 1A illustrates a top perspective view of a ballistic concrete block, according to one embodiment of the present invention.

The present invention is generally directed to improved ballistic concrete barriers and methods of using the barriers for training with very high power weapons such as those that fire fifty caliber bullets, and for providing ballistics protections on buildings and other structures.

In one embodiment, the present invention provides a method of forming bullet resistant blocks of various forms.

In another embodiment, the present invention provides a method of forming a bullet resistant wall comprising ballistic paver blocks.

In yet another embodiment, the present invention provides a method of forming a bullet resistant wall comprising ballistic paver blocks wherein the ballistic paver blocks do not contain any foam.

Definitions

The term "very high power" means bullets with a combination of muzzle velocity or mass such that the muzzle energy, $KE=½ mv^2$, is 5,000 foot-pounds (7 kJ) or greater. In some embodiments, the muzzle energy is 10,000 foot-pounds (14 kJ) or greater. In other embodiments, the muzzle energy is between 10,000 foot-pounds (14 kJ) and 15,000 foot-pounds (18 kJ). Non-limiting examples of such bullets include: 647 gr (41.9 g) Speer with a velocity of 3,044 ft/s (928 m/s) and a muzzle energy of 13,144 ft-lb (17,821 J); 655 gr (42.4 g) ADI with a velocity of 3,029 ft/s, energy of 13,350 ft-lbf (18,100 J); or 800 gr (52 g) Barnes with a velocity of 2,820 ft/s and energy of 13,241 ft-lbs (17,952 J). Very high power bullets include the military standard fifty caliber (.50) bullet used in the Browning machine gun. The bullet would typically be lead, but is not limited to lead. Alternative, non-limiting embodiments include bullets with tracers; internal circuitry for drift correction; explosives; other metals; or metal alloys.

The term "fine aggregate" means natural sand (including quartz, chert, igneous rock and shell fragments), limestone (calcium carbonate), manufactured sand (crushed stone, recycled concrete, slag) ranging from mesh size #8 to #200 (2.4 mm to 0.07 mm). In preferred, non-limiting embodiments the fine aggregate is masonry sand (ASTM C 144) or general concrete sand (ASTM C 33) meeting the size criteria. In one non-limiting embodiment the fine aggregate is saturated surface dry (SSD) material, see ASTM C 128.

The term "fiber" means concrete additives to reinforce the concrete with which includes steel, alkali-resistant glass strands, or synthetic polymers. In preferred, non-limiting embodiments the fiber is a polyolefin, a polyester, a polyamide, (e.g., Kevlar®, nylon, polyester, polyethylene, polypropylene) or a mixture thereof, which is operable to be a monofilament, fibrillated, or structured fibers (macrofibers). In one embodiment, the fibers meet ASTM C 1116 standards, such as ASTM C 1116 Type III requirements for polypropylene or ASTM C 1116 Type I for steel. Non-limiting examples include Grace Fibers™ (W.R. Grace & Co., Cambridge, MA); Nylon—N6600, Polyester—PE7, Polypropylene—CFP1000, Polypropylene—PP7 (Concrete Fibers Inc., Dallas, TX); Nycon-MM, NYCON-PVA, Nycon-RECS100, Nycon-RF4000, Nycon-RSC15, Nycon-XL (Nycon Corp., Fairless Hills, PA); ENDURO® 600, Fibercast® 500 for Precast, Fibercast® 510, Fibermesh® 150, Fibermesh® 300, Fibermesh® 650, Novocon® 1050, Novocon® XR, Novomesh® 850, Novomesh® 950 (Propex Concrete Systems Corp., Chattanooga, TN); PSI Fibers™ (PSI Packaging, LaFayette, GA). Additional examples of suitable fibers include fibers described in U.S. Pat. No. 5,456,752 (Hogan); U.S. Pat. No. 6,423,134 (Trottier et al.); U.S. Pat. No. 6,582,511 (Velpari); or U.S. Pat. No. 6,758,897 (Rieder et al.), the contents of which are hereby incorporated by reference in their entirety.

The term "air entrainment additive" means admixtures that are part of the concrete mix to incorporate air bubbles of controlled sizes in the concrete matrix. These admixtures stabilize the air bubbles entrained during the mechanical mixing of concrete by the mixer blades. Examples of air entrainment additives include, but are not limited to, Dara-Fill® Dry or wet DaraFill formulations (W.R. Grace & Co.), Rheocell® Rheofill™ (BASF Construction Chemicals, Cleveland, OH), Micro Air® (BASF Construction Chemicals), EUCON EASY FILL (Euclid Chemical Co., Cleveland, OH), Fritz-Pak Fill Flow (Fritz-Pak, Dallas, TX). Additional examples of air entrainment additives are found in U.S. Pat. No. 4,488,910 (Nicholson et al.); U.S. Pat. No. 4,737,193 (Gutmann et al.); U.S. Pat. No. 4,249,948 (Okada et al.); U.S. Pat. No. 4,046,582 (Kawamura et al.); or the Portland Cement Association publication entitled "Manual on Control of Air Content in Concrete" (PCA EB116), the contents of which are hereby incorporated by reference in their entirety.

Air Entrainment Additives

Air entrainment additives generally include a surfactant. The surfactant is operable to be rosin-based or non-rosin-based. Other air-entraining materials, such as perlite, are also operable to be used. In one embodiment, the air entrainment additive is comprised of a mixture of fatty alkanolamide, diethanolamine, perlite, and quartz dust. For example, the composition of some common air entraining additives follow:

DARAFILL—fatty alkanolamide 60% w/w, diethanolamine 4% w/w, perlite 60% w/w, quartz (crystalline silica) 0.50% w/w.

RHEOCELL RHEOFILL—Sulfonic acids, C14-16-alkane hydroxy and C14-16-alkene, sodium salts 75-100%; Benzenesulfonic acid, dimethyl-, sodium salt 5.0-15.0%.

Micro Air (hazardous ingredients only)—Alpha-olefin sulfonate 1-5% w/w; potassium hydroxide 1-5% w/w, rosin 0-1.0% w/w.

EUCON EASY FILL—Sodium (C14-16) Olefin Sulfonate 125-50% w/w

The term "depth of penetration" with respect to a bullet penetration into a barrier is measured by inserting a measuring implement into the hole formed by the bullet and measuring from the point of entry to the trailing end of the bullet. Thus, the maximum penetration is actually a bit deeper than the measured penetration as the bullet, while altered in shape from the impact has a non-zero length. The depth of penetration of bullets into the absorbing material is operable to be measured using alternative methods known to those skilled in the art. Laser based tools such as a laser range finder are also used.

In particular non-limiting embodiments, the present disclosure provides a method for training an operator with a very high power live ammunition in a facility. The facility comprises a bullet absorbing component comprising (a)

about 1 part by mass cement; (b) about 0.5 to 1.5 part by mass fine aggregate; (c) about 0.005 to 0.15 part by mass fiber; (d) about 0.005 to 0.05 part by mass calcium phosphate; (e) about 0.005 to 0.05 part by mass aluminum hydroxide; and (f) about 0.0005 to 0.05 part by mass air entrainment additive, such that the bullet absorbing component is capable of stopping a fifty caliber bullet in less than 10 inches from a point of entry into the structural component. In one embodiment of the present invention, the cement is Portland cement. In one non-limiting embodiment, the bullet absorbing component comprises (b) about 0.8 to 1.2 part by mass fine aggregate; (c) about 0.008 to 0.012 part by mass fiber; (d) about 0.008 to 0.012 part by mass calcium phosphate; (e) about 0.008 to 0.012 part by mass aluminum hydroxide; and (f) about 0.0008 to 0.002 part by mass air entrainment additive. In another non-limiting embodiment, the bullet absorbing component comprises (b) about 0.9 to 1.1 part by mass fine aggregate; (c) about 0.009 to 0.011 part by mass fiber; (d) about 0.009 to 0.011 part by mass calcium phosphate; (e) about 0.009 to 0.011 part by mass aluminum hydroxide; and (f) about 0.0009 to 0.0015 part by mass air entrainment additive.

The mixture comprising the cement, the fine aggregate, the fiber, the calcium phosphate, the aluminum hydroxide, and the air entrainment additive is mixed until the mixture has a density less than about 90.8 pounds per cubic foot. In one embodiment, the cement is Portland cement. In one embodiment of the present invention, the compressive strength of the ballistic concrete to between about 2,000 pounds per square inch (psi) and about 3,000 psi as tested 28 days after pouring in accordance with ASTM C 39 (2001). In another embodiment, the compressive strength of the ballistic concrete to between about 1,500 pounds per square inch (psi) and about 5,000 psi. In yet another embodiment, the compressive strength of the ballistic concrete to between about 1,000 pounds per square inch (psi) and about 10,000 psi.

The very high power live ammunition is operable to be fifty caliber live ammunition having a muzzle energy of about 10,000 to 15,000 foot-pounds or about 13,000 to 14,500 foot-pounds. The very high power live ammunition has a mass of about 500 to 900 grains or about 600 to 700 grains.

In one non-limiting embodiment, the fiber is operable to be a polyolefin fiber, which is or is not be fibrillated. In another embodiment the air entrainment additive is Dara-Fill® Dry. The bullet absorbing component is operable to have air bubbles resulting from the air entrainment additive that are less than about 0.04 inches (1 mm) in diameter. Alternatively, the bullet absorbing component is operable to have air bubbles resulting from the air entrainment additive that are greater than 0.0004 inches (10 µm) in diameter. In another non-limiting embodiment, the bullet absorbing component has air bubbles resulting from the air entrainment additive that are less than about 0.04 inches (1 mm) in diameter and greater than 0.0004 inches (10 µm) in diameter.

Training with the very high power live ammunition is also performed in the same session with training using a 0.22 caliber weapon, a 0.38 caliber weapon, a 0.40 caliber weapon, a 0.45 caliber weapon, a 5.56 mm weapon, a 6.8 mm weapon, a 7.62 mm weapon, or a 9 mm weapon. Alternatively, the training with the very high power live ammunition is also performed in the same facility with training using a 0.22 caliber weapon, a 0.38 caliber weapon, a 0.40 caliber weapon, a 0.45 caliber weapon, a 5.56 mm weapon, a 6.8 mm weapon, a 7.62 mm weapon, or a 9 mm weapon. In addition, the training with the very high power live ammunition is also performed with a training using a grenade or other fragmentation device.

The facility is operable to be a training village, an assault house, a shoot house, a mock cave, or a .50 caliber live-fire practice range. The bullet absorbing component is also operable to be a backstop. Moreover, the bullet absorbing components is able to be made on site at the facility.

Preparations of Bullet Absorbing Components

In a non-limiting formulation, the bullet absorbing components are prepared by mixing cement, fine aggregate, and water to form a grout. In one embodiment, the grout is obtained from a ready mix concrete supplier.

Next an air entrainment additive is mixed into the grout. Then calcium phosphate, aluminum hydroxide and fiber are added. After mixing for a number of minutes the density is checked.

If the mixture is above the optimal density, additional mixing adds additional entrained air bubbles to reduce the density. The process of measuring density and providing additional mixing is repeated until the measured density is within a target range of the optimal density.

When the density is deemed appropriate, the concrete is poured into molds to form the component. Typically, the concrete is allowed to harden and cure for at least 4 weeks. Batching, mixing, transporting, testing, curing and placing the concrete would preferably meet the standards described in the Army Corp. of Engineers guidelines "Technical Specification for Shock Absorbing Concrete (SACON®)":

AMERICAN CONCRETE INSTITUTE (ACI) STANDARDS

ACI 117 (1990) Standard Specifications for Tolerances for Concrete Construction and Materials ACI 301 (1999) Standard Specification for Structural Concrete ACI 304R (2000) Guide for Measuring, Mixing, Transporting, and Placing Concrete ACI 305R (1999) Hot Weather Concreting ACI 306R (1997) Cold Weather Concreting ACI 544.1R (1996) State-of-the-Art Report in Fiber Reinforced Concrete ACI 544.2R (1999) Measurement of Properties of Fiber Reinforced Concrete

AMERICAN SOCIETY FOR TESTING AND MATERIALS

ASTM C 33 (2001) Standard Specification for Concrete Aggregate

ASTM C 39 (2001) Standard Test Method for Compressive Strength of Cylindrical Concrete Specimens ASTM C 94 (2000) Standard Specifications for Ready-Mixed Concrete ASTM C 138 (2001) Standard Test Method for Density (Unit Weight), Yield, and Air Content (Gravimetric) of Concrete ASTM C 144 (2002) Standard Specification for Aggregate for Masonry Mortar ASTM C 150 (2002) Standard Specification for Portland Cement ASTM C 171 (1997) Standard Specification for Sheet Materials for Curing Concrete ASTM C 172 (1999) Standard Practice for Sampling Freshly Mixed Concrete ASTM C 567 (2000) Standard Test Method for Unit Weight of Structural Lightweight Concrete ASTM C 1116 (2002) Standard Specification for Fiber-reinforced Concrete and Shotcrete

US ARMY CORPS OF ENGINEERS HANDBOOK FOR CONCRETE AND CEMENT (CRD)

CRD-C 400 (1963) Requirements for Water for Use in Mixing or Curing Concrete NATIONAL READY-MIXED CONCRETE ASSOCIATION (NRMCA)

NRMCA QC 3 (January 1990; 9th Rev) Quality Control Manual: Section 3, Plant Certifications Checklist: Certification of Ready-Mixed Concrete Production Facilities NRMCA CPMB 100 (January 1990; 9th Rev) Concrete Plant Standards NRMCA TMMB 1 (1989; 13th Rev) Truck Mixer and Agitator Standards The Portland cement used would preferably be ASTM C 150 Type 1-II. The fine aggregate is operable to be masonry sand (ASTM C 144), or general concrete sand (ASTM C 33).

The calcium phosphate is operable to be granulated bone meal, bone ash, or precipitated calcium phosphate. In one non-limiting embodiment, it is technical grade or higher. The aluminum phosphate is operable to be metakaolinite or precipitated aluminum hydroxide. In one non-limiting embodiment, it is technical grade or higher. In one embodiment, color pigments are added to create the appearance rocks, trees, buildings, etc. Suppliers of concrete pigments include Scofield Co. (Douglasville, GA) or Lambert Corp. (Orlando, FL). Thus, the present disclosure teaches the option of pigmented bullet absorbing components.

The present disclosure teaches the creation of components made from wet concrete prepared without an addition of preformed foam.

One of skill in the art of concrete manufacturing would recognize that these materials are prepared on industrial scale and accordingly quantities and proportions vary in accordance with industry norms. In addition, one skilled in concrete manufacturing would recognize that materials are operable to be measured by volume or by timed delivery from a storage container.

The following Examples further illustrate the various teachings of the disclosure and are not intended to limit the scope of the claimed invention.

Preparation of Components Capable of Absorbing Very High Power Bullets

The ingredients for making the very high power bullet absorbing components are as follows:

| Ingredient | Cubic Meter | Cubic Yard |
| --- | --- | --- |
| Cement | 577 kg (1272 lbs) | 972 lbs (441 kg) |
| Fine Aggregate (SSD) | 577 kg (1272 lbs) | 972 lbs (441 kg) |
| Water | 277 kg (611 lbs) | 466 lbs (211 kg) |
| Calcium Phosphate | 5.78 kg (12.7 lbs) | 9.72 lbs (4.4 kg) |
| Aluminum Hydroxide | 5.78 kg (12.7 lbs) | 9.72 lbs (4.4 kg) |
| DaraFill ® Dry | 423.36 g (14.93 oz) | 11.4 oz (323.16 g) |
| Grace Fibers ™ | 8.8 kg (19.4 lbs) | 14.8 lbs (6.7 kg) |

More generally, the bullet absorbing structural component made with ballistic concrete comprises:

(a) about 1 part by mass cement;

(b) about 0.5 to 1.5 part by mass fine aggregate;

(c) about 0.005 to 0.15 part by mass fiber;

(d) about 0.005 to 0.05 part by mass calcium phosphate;

(e) about 0.005 to 0.05 part by mass aluminum hydroxide; and (f) about 0.0005 to 0.05 part by mass air entrainment additive, such that the bullet absorbing component is capable of passing the penetration test described above.

In one non-limiting embodiment, the bullet absorbing component comprises (a) about 0.8 to 1.2 part by mass fine aggregate;

(b) about 0.008 to 0.012 part by mass fiber;

(c) about 0.008 to 0.012 part by mass calcium phosphate;

(d) about 0.008 to 0.012 part by mass aluminum hydroxide; and (e) about 0.0008 to 0.002 part by mass air entrainment additive.

In another non-limiting embodiment, the bullet absorbing component comprises (a) about 0.9 to 1.1 part by mass fine aggregate;

(b) about 0.009 to 0.011 part by mass fiber;

(c) about 0.009 to 0.011 part by mass calcium phosphate;

(d) about 0.009 to 0.011 part by mass aluminum hydroxide; and (e) about 0.0009 to 0.0015 part by mass air entrainment additive.

The process for making very high power bullet absorbing components is as follows:

Create or obtain a grout of cement, such as Portland cement, fine aggregate, and water in a mixer in accordance with ACI standard 304R and/or ASTM standard C 94.

Add a chemical air entrainment additive (DaraFill® Dry, W. R. Grace & Co.), and mix thoroughly into the grout. Following the addition of the additive, mix the product for five minutes. In one embodiment, mixing is achieved by rotating the drum on a cement mixer truck.

Add Calcium Phosphate, Aluminum Hydroxide and Grace Fibers™. Mix for ten minutes.

Note that in testing for the product, adding the fiber was necessary to achieve the required densities. Check density by weighing using a ¼ cubic foot testing pot. Target weight is 22.7 lbs (90.8 lbs per cubic foot). Additional mixing lowers the density. Continue to mix, checking frequently, until target density is achieved. Pour material into molds.

After filling the molds, the material is operable to be tapped down with a rod to eliminate voids around embedments in the casting forms. Not all components will be poured into molds with embedments. In one embodiment, molds without embedments do not need a rod to eliminate any voids, but a form with an embedment such as a window cutout does need a treatment with a rod to eliminate voids.

The target wet density material when poured into components is 1458 kg/m$^3$ (91-pcf 0.3 pounds per cubic foot (pcf)).

While traditionally, SACON components have been left in the molds for fourteen days, an alternative process is to remove the sides of the forms within 24 hours and remove the bottom of the form after at least three days. The component is wrapped in plastic to assure adequate hydration during curing. One of skill in the art will recognize that the timing of these steps is operable to be adjusted based on weather conditions, particularly temperature but also factoring humidity. The components are allowed to harden and dry and are ready for use and/or testing after 28 days.

One of skill in the art will recognize that the fibers enhance the strength and resilience of the components and ability of the molded components to withstand a bullet entry without spalling. Spalls are flakes of material that are broken off a larger solid body such as the result of projectile impact, weathering, or other causes. It is desired that the molded components retain their structural integrity with the exception of the trail formed by the bullet entry. Thus while the fibers are important, one of skill in the art is able to identify and substitute other fibers that are suitable for the task. The choice of fibers will impact the overall density of the wet material as the weight of the fibers impact the density calculation.

Traditional SACON®

Traditional SACON® is prepared following ERDC specifications,

ERDC Specifications require the following ingredients:

| Ingredient | Cubic Meter | Cubic Yard |
|---|---|---|
| Portland Cement | 577 kg (1272 lbs) | 972 lbs (441 kg) |
| Fine Aggregate (SSD) | 577 kg (1272 lbs) | 972 lbs (441 kg) |
| Water | 277 kg (611 lbs) | 466 lbs (211 kg) |
| Calcium Phosphate | 5.78 kg (12.7 lbs) | 9.72 lbs (4.4 kg) |
| Aluminum Hydroxide | 5.78 kg (12.7 lbs) | 9.72 lbs (4.4 kg) |
| Foam Stabilizer | 0.15 kg (0.33 lb) | 0.25 lbs (0.11 kg) |
| Foam (Void System) | 0.33 m$^3$ (11.7 cu ft) | 9.0 cu ft (0.25 m$^3$) |
| Fiber (choice of) | 8.8 kg (19.4 lbs) | 14.8 lbs (6.7 kg) |
| Polypropylene | | |
| Steel | 115 kg (254 lbs) | 193 lbs (88 kg) |

ERDC requires the use of a foaming agent and foam stabilizing agents. Specifically they require:

Section 2.4.1 Foaming Agents: Foaming agent shall comply with ASTM C 869, tested in accordance with ASTM 796; and Section 2.4.2 Foam Stabilizing Agents: The stabilizing agent shall contain hydroxypropyl methylcellulose powder limited to 19.0 to 24.0% methoxyl and 7.0 to 12.0% hydroxypropoxyl, similar to Dow Chemical Co. K100M.

Traditional SACON® uses an air compressor and water to generate pre-formed foam.

Traditional SACON® specifications require meeting the following density standards:
Density
(Without fibers) 1442 kg/m$^3$ (90-pcf)
(With polypropylene fibers) 1458 kg/m$^3$ (91-pcf)
(With steel fibers) 1554 kg/m$^3$ (97-pcf)

The foam is added to the mix, as follows using the ERDC specifications. The void material, pre-formed foam shall be added to the cement slurry to obtain the required density. The material shall be added in increments to reduce the possibility of exceeding the SACON® density tolerances. The recommended procedure is to add the foam in half increments, i.e., add half of the foam initially by time of insertion and calculate the density. If the density remains above the upper tolerance, add half of the remaining foam and re-calculate the density. If the density continues to remain above the upper tolerance, then add half of remaining foam until the density tolerance of +48 kg/m$^3$ (3-pcf) relative to the target density (based on fiber use) has been achieved.

Benefits of the Improved Bullet Absorbing Components

The improved components, prepared as described above, is able to stop a fifty caliber bullet in 4-8 inches based on probes inserted into the bullet holes. The Army Corps of Engineers has reported that they have not been able to stop a fifty caliber bullet in less than 18 inches of traditional SACON®. A 5.56 mm (M855) bullet weighs 62 grains, travels at 2300 ft/sec, and has a muzzle energy of 750 foot-pounds (1.0 kJ). The average stopping distance for a 5.56 mm fired from an M16 into the improved bullet absorbing component is 3.48 inches (88.4 mm). A fifty caliber bullet weighs 660 grains, travels at 3100 ft/sec, and has a muzzle energy of 14,000 foot-pounds (13.8 kJ). Thus, a fifty caliber bullet has nearly fourteen times the kinetic energy of a 5.56 mm bullet, yet the improved components is able to stop both types of bullets within a relatively similar stopping distance.

Traditional SACON® is capable of stopping the 5.56 mm, but cannot stop the fifty caliber bullet in an acceptable stopping distance. The improved stopping power opens the possibility of construction of multi-use ranges with the improved components. SACON® is traditionally installed in modular panels that are typically 24" to 30" thick. Panels are considered compromised when they have been penetrated by greater than 50% of the thickness of the panel, both because of the danger of collapse of the panel and because of the danger of shoot through if the panel is hit at the same point a second time. A traditional SACON® panel will be quickly compromised and unusable even at a thickness of 36" when a fifty caliber round is used because the round is operable to penetrate 18 inches or more. The improved material alleviates this problem.

Changes in Order and Additives.

In one embodiment, the step of adding the calcium phosphate and aluminum hydroxide is done at the same time as adding the chemical air entrainment additive.

Importantly, the calcium phosphate and aluminum hydroxide are added to reduce lead-leaching from ballistic concrete blocks which have absorbed ammunition with lead components; these chemicals are not central to the ballistic properties of the ballistic concrete. Thus, in applications where the need to reduce lead-leaching is not important (because of local rules, post use disposal plans, a movement to ammunition with minimal or no lead, etc.), the ballistic concrete is operable to be made in accordance with the teachings of the present disclosure without addition of calcium phosphate or aluminum hydroxide.

In one embodiment, the fiber is added at the same time as the chemical air entrainment additive (and in some embodiments at the same time as the calcium phosphate and aluminum hydroxide) as this process does not require achieving a pre-fiber density before adding the fiber. When the process is modified so that there is not a need to add material after five minutes of mixing, simply mix for fifteen minutes before checking density. In one embodiment, additional mixing is required to reduce density.

Less Restrictions on Pouring.

Unlike traditional SACON type ballistic material with fragile foam bubbles, ballistic material made in accordance with the teachings of the present disclosure is not limited to a 2 foot maximum drop during pouring or a 2 foot maximum depth of a pour. Thus, unlike traditional SACON type ballistic material, ballistic material made in accordance with the teachings of the present disclosure is operable to be poured into wall panels oriented in their final vertical orientation. Accordingly, ballistic material made in accordance with the teachings of the present disclosure is operable to be poured into voids with pour heights well in excess of 2 feet tall. Pours of greater than 3 feet in height are obtainable. Pours of greater than 6 feet in height are obtainable. Pours of greater than eight feet in height from bottom to top of a void are obtainable. Pour structures of full height walls of eight feet or more are operable to be made as well.

A quicker turn-around on use of the molded ballistic components is also possible. SACON ballistic concrete components must be left in their molds for fourteen days; the sides are able to be removed after three days, but the components cannot be moved or removed from the molds until fourteen days passes. The ballistic concrete components of the present invention allows for removal from the molds 24 hours after pouring and to complete the curing process out of the mold. Advantageously, this allows for one mold to be used 14 times to form a component using the ballistic concrete of the present invention in the same timer period that one mold was able to be used only once to form ballistic components from SACON. Thus, less money needs to be tied up in molds, transportation and storage of molds.

The molded ballistic component is wrapped in plastic to assure adequate hydration during curing. Notably, the time which the molded ballistic components must be left in a mold is operable to be adjusted based on weather conditions, particularly in the case of temperature and humidity. For example, the components are allowed to harden and dry and are ready for use and/or testing after 14 days.

The fibers incorporated into the ballistic concrete of the present invention enhance the strength and resilience of the ballistic concrete and the ability of the repaired components to withstand a bullet entry without spalling. Spalls are flakes of material that are broken off a larger solid body such as the result of projectile impact, weathering, or other causes. It is desired that the repaired components retain their structural integrity with the exception of the trail formed by the bullet entry. Thus while the fibers are important, one of skill in the art is able to identify and substitute other fibers that are suitable for the task. The choice of fibers will impact the overall density of the wet material as the weight of the fibers impact the density calculation.

Benefits of the Improved Bullet Absorbing Components

To date, the improved bullet absorbing components have consistently performed well in ballistic testing. Anecdotal evidence suggests significantly higher failure rates for traditional SACON® than with the improved production process. These failure rates are likely due to a lack of consistency of the product using traditional SACON®. The improved production process produces a very consistent material with an extremely low (less than 1%) failure rate.

Other benefits for the improved ballistic concrete are the predictable and uniform results in ballistic performance when the mix falls within the target density range. By uniform results, it is meant that penetration tests on different parts of a panel made with the improved ballistic panel will all pass the penetration test.

The process is sufficiently predictable that when a sample falls outside of the target range for density after the prescribed mixing period, this aberrant result is a strong indicator that the sand used in the mix is out of specifications, perhaps because of inclusion of clay or another contaminant.

Cross-Sectional Characteristics

The bullet absorbing component is operable to have air bubbles resulting from the air entrainment additive that are less than about 0.04 inches (1 mm) in diameter. Alternatively, the bullet absorbing component is operable to have air bubbles resulting from the air entrainment additive that are greater than 0.0004 inches (10 microns) in diameter. In another non-limiting embodiment, the bullet absorbing component has air bubbles resulting from the air entrainment additive that are less than about 0.04 inches (1 mm) in diameter and greater than 0.0004 inches (10 microns) in diameter.

Ballistic Concrete Wall

The present invention provides for a ballistic concrete wall made with the ballistic concrete as herein described. Unlike traditional SACON type ballistic material with fragile foam bubbles, ballistic material made in accordance with the teachings of the present disclosure is not limited to a 2 foot maximum drop during pouring or a 2 foot maximum depth of a pour. Thus, unlike traditional SACON type ballistic material, ballistic material made in accordance with the teachings of the present disclosure is operable to be poured into wall panels oriented in their final vertical orientation. Optionally, ballistic material made in accordance with the teachings of the present disclosure is operable to be poured into molds with pour heights well in excess of 2 feet tall. Pours of greater than 3 feet in height are obtainable. Pours of greater than 6 feet in height are obtainable. Pours of greater than 8 feet in height from bottom to top of mold are obtainable. Pour structures of full height walls of 8 feet or more is operable to be done. Thus, the present invention provides for an integral ballistic concrete barrier much taller than possible with prior art ballistic cement compositions.

Cement sets when mixed with water by way of a complex series of chemical reactions still only partly understood. The different constituents slowly crystallize and the interlocking of their crystals gives cement its strength. When fresh cement is poured over cement that has already hardened, the crystal cannot interlock as thoroughly as a single pour. Thus, the present invention provides for taller barriers that are stronger because they are integrally-formed in a single pour.

The walls thus formed are operable to be designed and configured to capture low- and high-velocity rounds, as previously described. Thus, a wall with density about 70 lb/cu.ft. that is about 20 cm (8 inches) thick is able to capture both low- and high-velocity rounds.

Modification for Slower Projectiles

Those of skill in the art, recognize that the muzzle velocities for different types of ammunition differs a considerable amount. For example, within pistols, the muzzle velocity of a 9 mm handgun is significantly higher than the muzzle velocity of a 45 caliber pistol. The muzzle velocity for a given type of ammunition will actually depend on part on the length of the barrel of the gun.

In order to design a ballistic barrier for a lower velocity projectile than used in the standard penetration test described above, the ballistic barrier must be made easier to penetrate so that the back end of the projectile penetrates more than one inch into the ballistic barrier. Increasing the amount of chemical air entrainment additive and or increasing the mix time to downwardly adjust the density target for the ballistic material will enable the ballistic panel to be tuned for use with a particular lower velocity projectile. Density of the ballistic concrete is operable to be dropped by simply mixing longer without changing the amount of air entrainment additive, however, additional air entrainment additive is operable to be used to create a severe change in density.

Modifications for Other Bullet Depth Ranges.

One of skill in the art could modify the teachings of the present disclosure to tune the ballistic concrete to capture a bullet from a prescribed round, firearm, and firing distance within a depth range that is different from the 1 to 5 inch range referenced above. Thus, a ballistic concrete component could be tuned to capture bullets in a depth range of 2 to 6 inches of depth as measured to the part of the bullet closest to the entry point, or 0.5 inches to 3 inches of depth as measure to the part of the bullet closest to the entry point.

Thus, in an example embodiment, a ballistic panel is formed with the ballistic material herein described, the panel including a filled void, wherein the filled void is filled with a ballistic replacement material; and the filled void exhibits ballistic properties equivalent to the original ballistic panel formed with the ballistic material.

The repaired ballistic panel has a uniform density of between about 1121 kg/cubic meter (about 70 pounds per cubic foot) and about 1442 kg/cubic meter (about 90 pounds per cubic foot). The ballistic replacement material does not delaminate from adherence to the ballistic panel.

The ballistic panel with ballistic replacement material is shatter-resistant when struck with a bullet of between about 4 mm (0.172 caliber) with muzzle velocity about 120 m/s (390 ft/s) and about 12.7 mm weighing 600-800 grains (40-50 g) (50 caliber) with muzzle velocity of 2800-3100 feet/sec (850-950 m/s) and kinetic energy of 12,000-15,000 foot-pounds (17-21 kJ).

Retrofit of Existing Structures

In one embodiment, the present invention provides a method of retrofitting a preexisting wall for bullet resistance comprising the steps of: acquiring ballistic paver blocks; selecting a preexisting wall to be augmented; selecting a side of the preexisting wall to be augmented; applying a row of the ballistic paver blocks in the first layer; applying subsequent rows of the ballistic paver blocks in the first layer; applying subsequent layers of the ballistic paver blocks.

In another embodiment, the present invention provides a bullet resistant wall comprising: ballistic paver blocks; wherein the ballistic paver blocks are arranged so as to create a wall with multiple layers; wherein the multiple layers are formed through multiple rows of the ballistic paver blocks.

In yet another embodiment, the present invention provides a bullet resistant wall comprising: ballistic paver blocks; wherein the bullet resistant wall does not contain any metal shielding or metal mesh.

The creation of stand-alone bullet resistant walls utilizing ballistic concrete wall panels twenty-four to thirty inches thick for use in a live-fire training facility is well known in the art. These large structures are appropriate as the walls need to withstand repeated exposure to live fire while retaining an adequate ability to stop bullets from getting from one side of the ballistic concrete panel to the other. However, such massive components require heavy equipment to move and take up a large amount of space. Large concrete wall panels would not be a convenient or practical solution for hardening a school or office building against penetration from a limited number of bullets.

In contrast, traditional building construction using steel stud frames or concrete masonry units (cinder blocks) will not stop a NATO M80 round (7.62 NATO) and the revised round known as the Enhanced Performance Round (EPR) is able to penetrate concrete masonry unit walls from forty to eighty meters depending on the rifle used. Filling a cinderblock wall with mortar adds to the stability of the wall, but mortar does not have stopping power for bullets or other projectiles. Additionally, solid filling the cinderblock walls with concrete would be expensive and require deconstruction of sections of wall. Thus, most buildings are vulnerable to bullets. In light of highly publicized attacks upon schools with a shooter armed with an assault rifle, there is an unmet need to be able to harden preexisting walls in buildings.

Referring now to the drawings in general, the illustrations are for the purpose of describing a preferred embodiment of the invention and are not intended to limit the invention thereto.

Figure 1C:
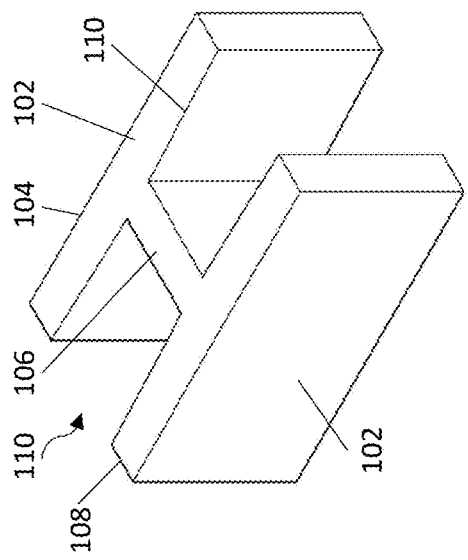
FIG. 1C illustrates a top perspective view of a ballistic concrete block, according to one embodiment of the present invention.
Figure 1E:
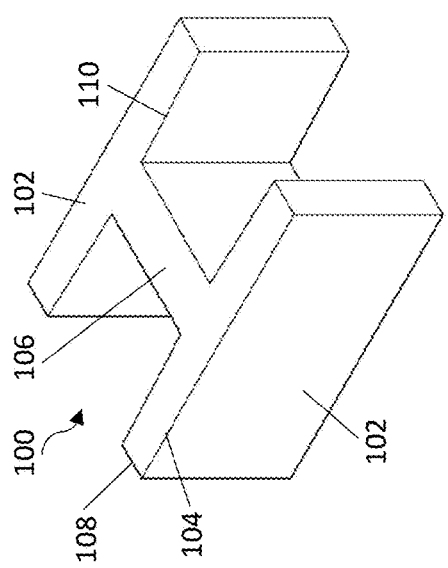
FIG. 1E illustrates a top perspective view of a ballistic concrete block, according to one embodiment of the present invention.
Figure 1B:
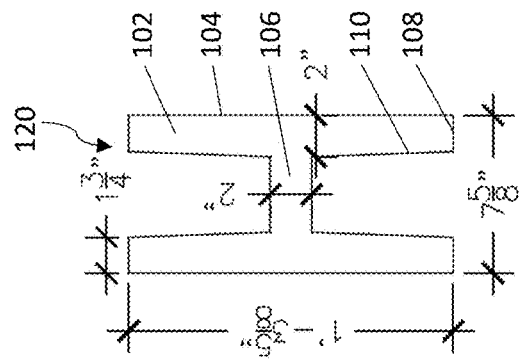
FIG. 1B illustrates a top orthogonal view of a ballistic concrete block, according to one embodiment of the present invention.
Figure 1D:
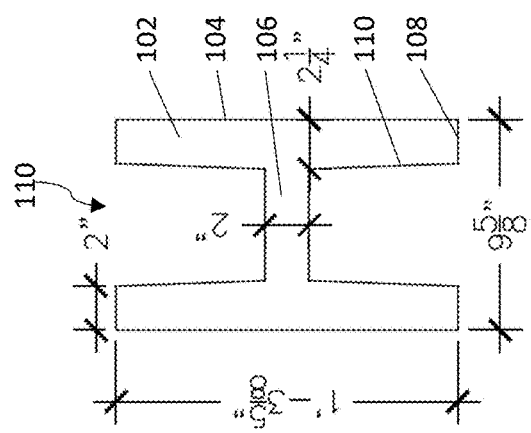
FIG. 1D illustrates a top orthogonal view of a ballistic concrete block, according to one embodiment of the present invention.
Figure 1F:
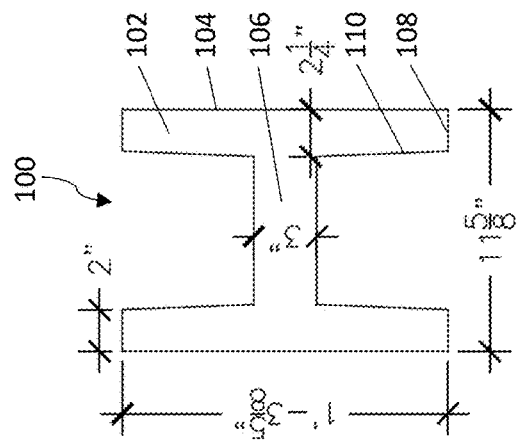
FIG. 1F illustrates a top orthogonal view of a ballistic concrete block, according to one embodiment of the present invention.

In one embodiment of the present invention, the ballistic concrete is formed into blocks which are easy to transport and place while still providing increased ballistic security. FIGS. 1A to 1F illustrate varying embodiments of H-blocks of the ballistic concrete. H-blocks are easily laid up by a mason to create new structures with bullet resistance or to retrofit existing structures in order to provide increased bullet resisting. Each H-block includes two arms 102 which are parallel at the outer edges of the arms 104 and a center stem 106 connecting the arms 102 in the center of the arms or approximately the center of the arms. The outer edges of the arms 104 are flat or substantially flat and perpendicular or substantially perpendicular to the ends of the arms 108. The inner edges of the arms 110 are angled relative to the ends of the arms 108 such that they are not perpendicular with the ends of the arms 108 and not perpendicular to the center stem 106 of the H-blocks. The inner edges of the arms 110 are angled in order to be removed from molds more easily. FIGS. 1A and 1B illustrate one embodiment of an H-block 100 which is about 11 and five eighths inches wide, about 15 and five eighths inches long, has ends of the arms 108 that are about 2 inches thick, and a center stem 106 that is about 3 inches thick. FIGS. 1C and 1D illustrate another embodiment of an H-block 110 which is narrower and is about 9 and five eighths inches wide, about 15 and five eighths inches long, has ends of the arms 108 that are about 2 inches thick, and a center stem 106 that is about 2 inches thick. FIGS. 1E and 1F illustrate another embodiment of an H-block 120 which is narrower and is about 7 and five eighths inches wide, about 15 and five eighths inches long, has ends of the arms 108 that are about 1 and three quarters inches thick, and a center stem 106 that is about 2 inches thick. In an alternative embodiment, the H-block is about 10 inches wide. In yet another embodiment, the H-block is between about 8 inches and 12 inches wide. In yet another embodiment, the H-block is between about 6 inches and about 24 inches wide. In an alternative embodiment, the H-block is made in a different size that satisfies the requirements of the situation for its use in order to provide bullet and ballistic resistance, or a block is formed of a different shape. It is also understood that the H-block is operable to be formed in a different shape. In one embodiment, the H-block has two or more arms 102 and one or more center stems 106. In another embodiment, the H-block has four or more arms 102 and one or more center stems 106. In yet another embodiment, the H-block has one or more arms 102 and one or more center stems 106.

In use, the H-blocks are laid up in the same manner as any other masonry block. The overall shape of the H-block minimizes the mass of the H-block and makes it easy for individuals to maneuver the H-block themselves. Once H-blocks are positioned for use, such as in the form of a wall, the spaces between them are filled with ballistic concrete according to the present invention. Notably, any ballistic concrete described in the present application is operable to be utilized to fill the spaces in the H-blocks and between H-blocks. Once the ballistic concrete hardens, a seamless solid ballistic concrete wall is formed which has no seams that would allow penetration of a projectile. In one embodiment, one or more surfaces of the H-block based wall are operable to be covered by other materials such as sheetrock, laminate, plaster, wallpaper, or plywood in order to provide an aesthetic finish.

FIGS. 2A to 2C illustrate further details of the H-block 110 of FIGS. 1C and 1D. FIG. 2A is a top orthogonal view of the H-block which includes four arms 201 and a center stem 203, indicating its length of about 15 and five eighths inches, width of about 9 and five eighths inches, external thickness of each arm 201 of about 2 inches, internal thickness of each arm 201 of about 2 and one quarter inches, thickness of the center stem 203 of about 2 inches, and width of the center stem 203 of about 5 and one eighth inches. FIG. 2B is a side orthogonal view of the same H-block 110, illustrating the width of about 9 and five eighths inches and height of about 7 and five eighths inches. FIG. 2C is a front orthogonal view of the same H-block 110, illustrating the length of about 15 and five eighths inches and height of about 7 and five eighths inches. In an alternative embodiment, the H-block is between about 6 inches and about 10 inches tall. In yet another embodiment, the H-block is between about 4 inches and about 18 inches tall. In yet another embodiment, the H-block is between about 2 inches and about 36 inches tall. In an alternative embodiment, the H-block is between about 12 inches and about 18 inches long. In yet another embodiment, the H-block is between about 8 inches and about 24 inches long. In yet another embodiment, the H-block is between about 2 inches and about 48 inches long. In another embodiment, the H-block is a full end block. In yet another embodiment, the H-block is an end half-block. FIGS. 2D, 2E, and 2F illustrate an end half-block 211 according to one embodiment of the present invention. End half-blocks are operable to be used to construction to form the ends of walls, doorways, and other elements of a building which required ballistic protection. Similar to an H-block, end half-blocks are shaped to be easily formed and contain a center space which is able to be filled with more ballistic concrete once set in place. FIG. 2D illustrates a perspective view of an end half-block 211 which is made of a center span 213 and two arms 215, where each arm has a narrow end 217 and a wide end 219, where the wide end 219 is connected to the center span, and such that the end half-block 211 is substantially shaped as a "U." FIG. 2E illustrates a top orthogonal view of an end half-block 211, highlighting the difference in size between the narrow end 217 and wide end 219 of the arms 215. FIG. 2F illustrates a side orthogonal view of an end half-block 211. In the present embodiment, the end half-block 211 is about 7 and ⅝ths inches tall, about 7 and ⅝ths inches wide, and about 7 and ⅝ths inches wide. The center span 213 is about 1 and ½ inches wide. The arms 215 are about 2 inches wide at the narrow end 217 and about 2 and ¼th inches wide at the wide end 219. In an alternative embodiment, the end half-block 211 is between about 7 inches and about 8 inches long. In another embodiment, the end half-block 211 is between about 9 inches and about 10 inches long. In another embodiment, the end half-block 211 is between about 11 inches and about 12 inches long. In yet another embodiment, the end half-block 211 is between about 5 inches and about 24 inches long. In another embodiment, the end half-block 211 is between about 2 inches and about 36 inches long. In an alternative embodiment, the end half-block 211 is between about 6 inches and about 10 inches tall. In yet another embodiment, the end half-block 211 is between about 4 inches and about 18 inches tall. In yet another embodiment, the end half-block 211 is between about 2 inches and about 36 inches tall. In an alternative embodiment, the end half-block 211 is between about 6 inches and about 10 inches wide. In yet another embodiment, the end half-block 211 is between about 4 inches and about 18 inches wide. In yet another embodiment, the end half-block 211 is between about 2 inches and about 36 inches wide. In an alternative embodiment, the H-block is made in a different size that satisfies the requirements of the situation for its use in order to provide bullet and ballistic resistance.

Figure 3A:
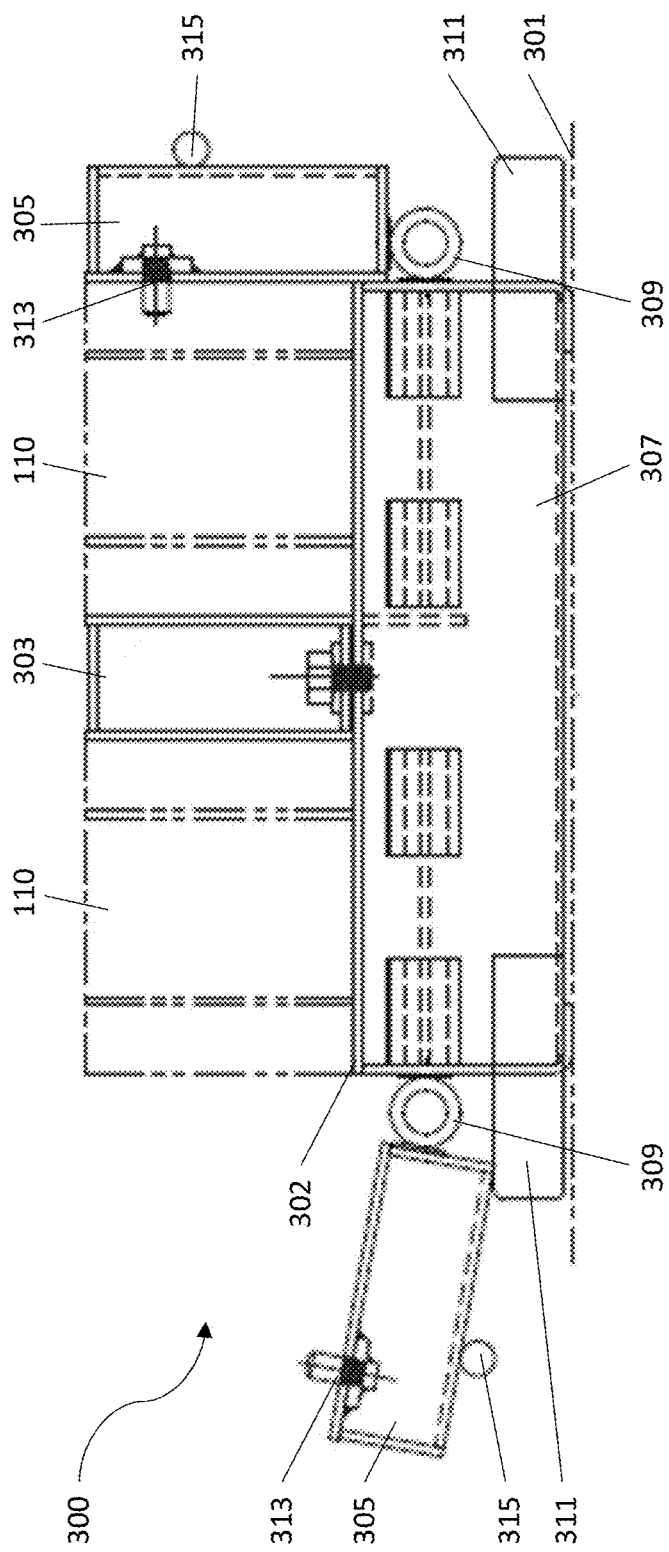
FIG. 3A illustrates a front orthogonal cross-sectional view of a ballistic concrete block production form, according to one embodiment of the present invention.
Figure 3B:
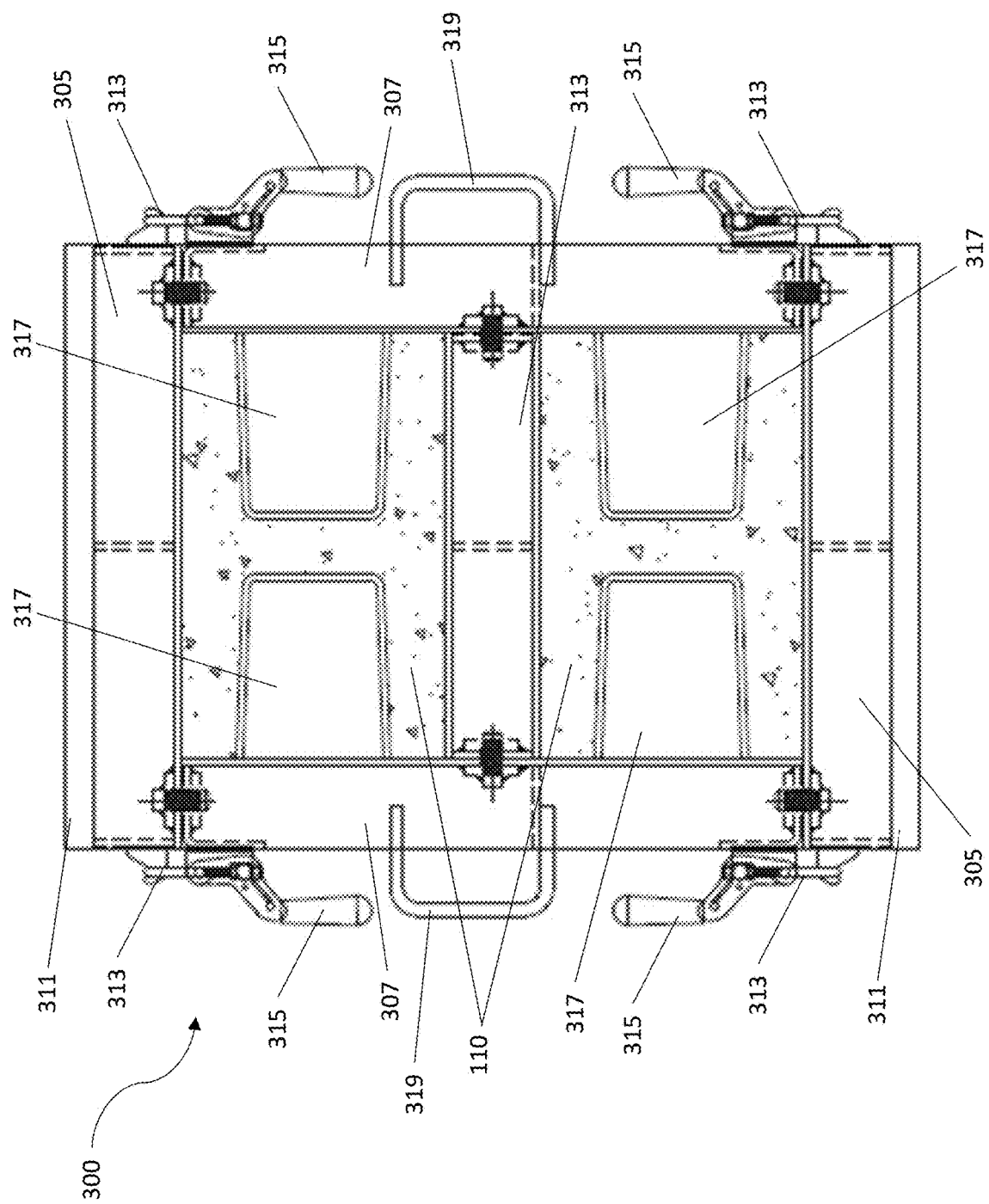
FIG. 3B illustrates a top orthogonal view of a ballistic concrete block production form, according to one embodiment of the present invention.
Figure 3C:
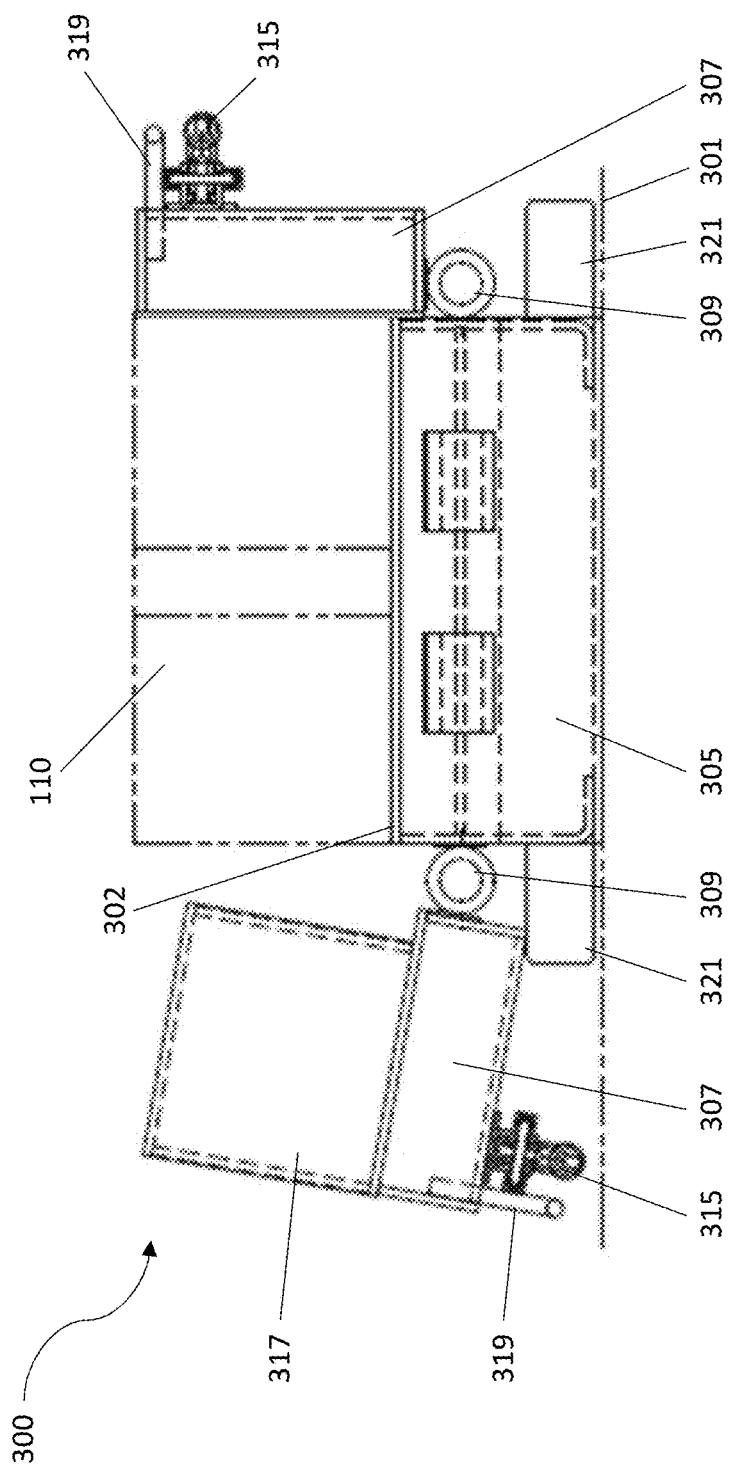
FIG. 3C illustrates a side orthogonal cross-sectional view of a ballistic concrete block production form, according to one embodiment of the present invention.

FIGS. 3A to 3C illustrate one embodiment of a production form 300 for the casting of ballistic concrete H-blocks, according to one embodiment of the present invention. These figures illustrate a form of a sufficient size to produce the H-block 110 described in FIGS. 1C, 1D, and 2A to 2C, but it is understood that the forms are operable to be modified for the production of ballistic H-blocks of any size, as well as ballistic concrete blocks of different shapes.

FIG. 3A illustrates a side orthogonal cross-section view of a ballistic block production form 300 which is operable to be used for the casting of two H-blocks 110 at one time. In one embodiment, the form 300 sits on a flat casting surface 301, such as, but not limited to, a cleared space at a job site, in a factory, or in a warehouse. Form 300 includes a casting surface 302. In the center of the casting surface 300 is a center wall 303, which is fixed. Center wall 303 divides the two H-blocks 110 when being casted. Long side forms 305 and short side forms 307 are mounted to the casting surface 302 by hinges 309 such that the side forms 305 and 307 are operable to rotate away from the casting surface 302 to release the cast H-blocks 110. Form 300 further includes short side stops 311 which are operable to limit the rotation of side forms 305 and 307 to prevent them from hitting the ground or another surface and being damaged. Form 300 is also operable to include toggle clamps 313 and clamp handles 315 which lock the components of the form 300 together during casting of the H-blocks. In this illustration, long side form 307 has been rotatably lowered, and one of the short side forms 305 has been rotated away from the H-block 110 and is resting on short side stop 311.

FIG. 3B further illustrates the form 300 from above, and visible are two formed H-blocks 110. H-blocks 110 receive their shape due to internal forms 317 which are attached to long side forms 307 in order to create the H shape of the H-blocks 110 and therefore reduce the overall volume and mass of the formed ballistic concrete blocks. Form 300 also includes form handles 319 in order to more easily manipulate the long side forms 307. In one embodiment, handles 319 are attached to about the center and about the top of the long side forms 307. FIG. 3C also illustrates a cross-sectional view of the form 300, this time from the side of the short form 305. In this illustration, short form 305 has been lowered, and one of the long forms 307 has been rotated away from the H-block 110, revealing internal form 317 and resting on long side stop 321. In another embodiment of the form 300, three or more H-blocks 110 are operable to be poured at once in the same row. In yet another embodiment of the form 300, ten or more H-blocks 110 are operable to be poured at once in the same row. In yet another embodiment of the form 300, twenty or more H-blocks 110 are operable to be poured at once in the same row. In an alternative embodiment of the form 300, two or more rows of blocks are operable to be poured at once, wherein each row of blocks includes one or more H-block 110.

Figure 4A:
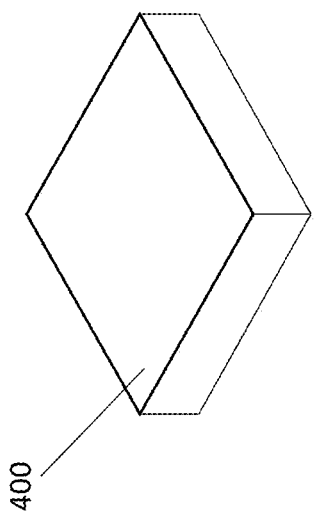
FIG. 4A illustrates a top perspective view of a ballistic concrete block, according to one embodiment of the present invention.
Figure 4C:
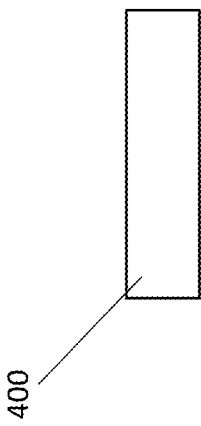
FIG. 4C illustrates a side orthogonal view of a ballistic concrete block, according to one embodiment of the present invention.
Figure 4B:
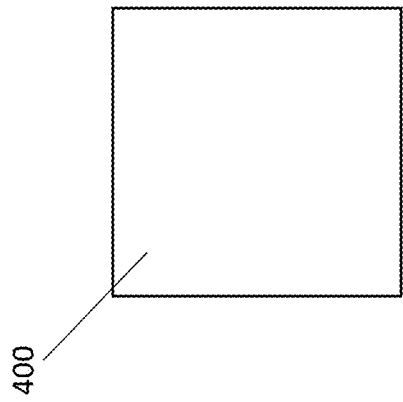
FIG. 4B illustrates a top orthogonal view of a ballistic concrete block, according to one embodiment of the present invention.

FIGS. 4A-4C illustrate wall protection blocks 400, according to one embodiment of the present invention. The disclosed ballistic concrete is operable to be formed into blocks which are used to build or reinforce walls, and serve in other ballistics protection capacities such as in firing ranges and outside buildings. FIG. 4A illustrates a top perspective view of a wall protection block 400, FIG. 4B illustrates a top orthogonal view of a wall protection block 400, and FIG. 4C illustrates a side orthogonal view of a wall protection block 400. In one embodiment, the block 400 is about 12 inches long by about 12 inches wide by about 3 inches tall, having a volume of about 432 square inches. In an alternative embodiment, the block 400 is between about 6 inches and 18 inches long by between about 6 inches and 18 inches wide by between about 2 inches and about 6 inches tall, having a volume of between about 72 square inches and about 1,944 square inches. In yet another embodiment, the block 400 is between about 3 inches and 36 inches long by between about 3 inches and 36 inches wide by between about 1 inch and about 12 inches tall, having a volume of between about 9 square inches and about 15,552 square inches.

Wall protection blocks 400 are operable to be used in many ways in order to provide ballistics resistance. In one embodiment, wall protection blocks 400 are layered in an overlapping manner such that no through seams are present. In another embodiment, wall protection blocks 400 are stacked and secured in such a way that they provide a safe wall behind drywall, such as to provide a safe room in a building. In an alternative embodiment, wall protection blocks 400 are layered on the outside of an existing concrete wall in order to provide ballistics resistance. In another embodiment, wall protection blocks 400 are cemented or glued to the exterior or an existing building. Because of the size and versatility of the wall protection blocks 400, no concrete pouring has to be done on site, reducing the amount of skilled labor needed to install.

In another embodiment of the present invention, the ballistic concrete is formed into cladding panels, which are also often referred to in the art as curtain panels. Cladding panels are used to form exterior walls of buildings, such as skyscrapers, and are fastened directly to the frame of the building, which is often made of metal I-beams. The cladding panel essentially hangs off the side of the building and its weight is transferred to support plates by way of edge pockets which are cut or formed into the panel. In some cases, an angle strut is utilized to stabilize the cladding panel. Joints between panels and other structural components are sealed, such as by backer rods and a sealant compound. Cladding panels are advantageous because they allow for the rapid erection of buildings, wherein the panels are formed away from the construction site and brought to the site when needed, and due to the hanging of the panels, the exterior surfaces of the building are not load bearing. Ballistic concrete, when used to form cladding panels, becomes an easy to install exterior protection for buildings.

FIGS. 5A and 5B illustrate a cladding assembly 500 according to one embodiment of the present invention. Cladding assembly 500 includes a ballistic panel 501 which is mounted to a slab 503, wherein the slab 503 is a part of the frame of a building. Panel 501 is mounted to slab 503 by way of support plates 505 which are mounted within the panel recess 507 and stud recess 508. In an alternative embodiment, recesses 507 and 508 are not present. Inclusion of recesses allows for easier finishing of the interior, such as the laying of flooring, wall panels, electrical components, and insulation. In one embodiment, the ballistic panel 501 is also formed with a two-stage sealant joint 509 which is useful for draining of water and other environmental conditions. In another embodiment, ballistic panel 501 is formed with drip recesses 511 for further precipitation control. FIG. 5A is a front perspective view of a cutaway of a cladding assembly 500, whereas FIG. 5B is a rear perspective view of a cutaway of a cladding assembly, as would be seen from the inside of a building as it is under construction.

FIG. 6 provides a side orthogonal cross-sectional view of an alternative version of a cladding assembly 600 which includes increased ventilation and a different mounting mechanism. Cladding assembly 600 includes a ballistic panel 601 which is mounted to slab 603, wherein the slab 603 is part of the frame of a building. Panel 601 is mounted to slab 603 by way of support plate 605. In one embodiment, firestop 607 is placed between panel 601 and slab 603, which is common practice in the art due to applicable building and/or fire codes. Support mount 609 is fixed to the underside of slab 603 and provides another connection point to ballistic panel 601. In one embodiment, support mount 609 includes a joint that allows for flexing of the ballistic panel 601 in order to prevent structural damage. Support plate 605 and support mount 609 are operable to be connected to the ballistic panel 601 and slab 603 by way of mechanical or chemical means, such as, but not limited to, bolts or welding. In one embodiment, the ballistic panel 601 is also formed with a two-stage sealant joint 611 which is useful for draining of water and other environmental conditions. A duct 613 is also operable to be incorporated into ballistic panel 601. Duct 613 is operable to include flange louvers 615 on the outside portion, and includes expanding urethane foam 617 to provide an air seal around the duct 613, as well as a sheet meal closure 619 around all sides of the duct. In one embodiment, sill plan flashing 621 is present below the flange louver and below the connection between the duct and louver connection. In yet another embodiment, the ballistic panel 601 is also operable to include drip recesses 623 for further precipitation control.

FIG. 7A illustrates a side orthogonal cross-sectional view of an alternative version of a cladding assembly 700. Cladding assembly 700 includes a ballistic panel 701 and aluminum window sills 703 and windows 705 on the top and bottom of the ballistic panel 701. The ballistic panel 701 is mounted to slab 707, wherein the slab 707 is fixed to an I-beam 709 which is part of the frame of a building. The ballistic panel 701 is mounted to the slab 707 by way of support plate 711, wherein support plate 711 is mounted to the slab 701 via a bolt 713 or other permanent or removable fixation means. Ballistic panel 701 sits on the support plate 711 within the edge pocket 715, an area of material removed from the ballistic panel 701 to make room for the support plate 711. A detail view of one embodiment of the edge pocket 715 of the ballistic panel 701 is shown in FIG. 7B. In one embodiment, the end of the support plate 711 which contacts the ballistic panel 701 is rounded or angled or otherwise shaped, and the upper surface of the edge pocket 715 which rests on the support plate 711 has the corresponding shape. Cladding assembly 700 is also operable to include an insulating material 717, such as a compression fit mineral wool firestopping insulation (e.g. THEMAFIBER SAFING), to provide fire protection between the ballistic panel 701 and the slab 707. To provide increased strength, cladding assembly 700 is also operable to include an angle strut 719 to further secure the ballistic panel 701 to a building. In a preferred embodiment, angle strut 719 is made out of steel, but it is understood that angle strut 719 could be made of other suitable metals, alloys, natural materials, or synthetic materials. Angle strut 719 is connected to ballistic panel 701 by way of an expansion anchor 721.

Figure 8:
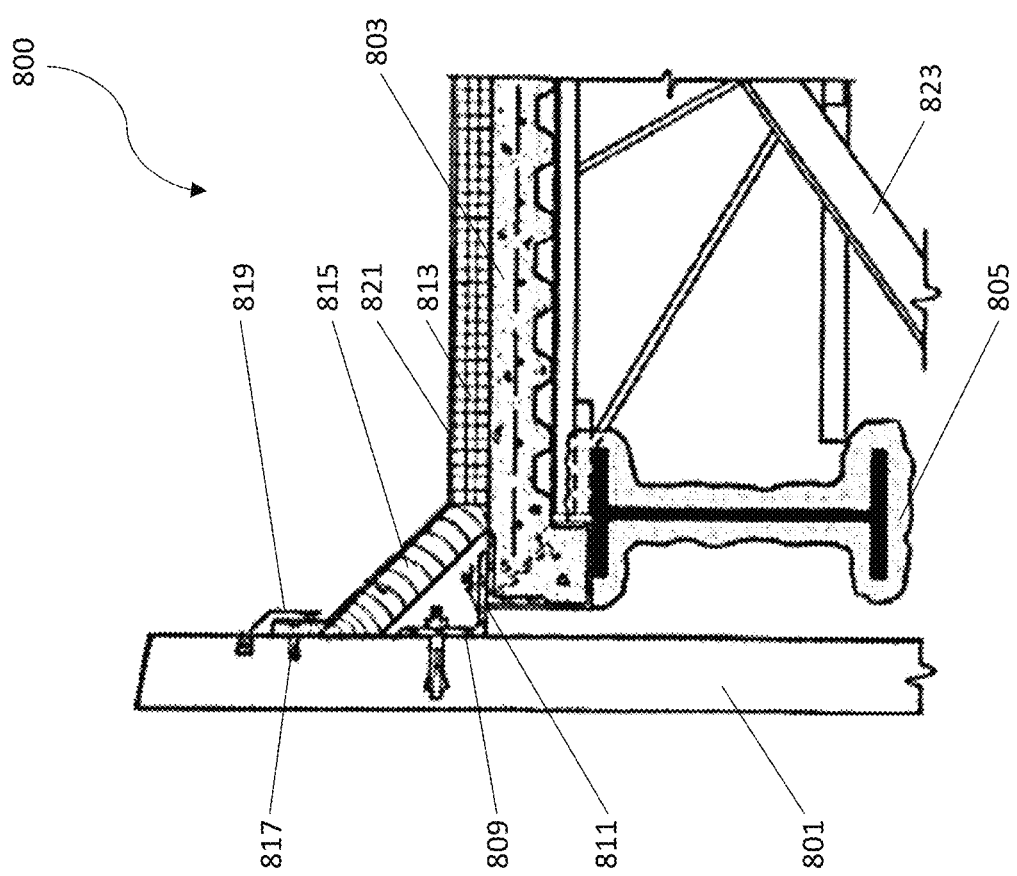
FIG. 8 illustrates a side orthogonal cross-sectional view of a ballistic cladding assembly, according to one embodiment of the present invention.

FIG. 8 provides a side orthogonal cross-sectional view of an alternative version of a cladding assembly 800 which includes a different mounting mechanism and further is the highest assembly on a building, providing a means to attach a panel near the roof line of the building. Cladding assembly 800 includes a ballistic panel 801 which is mounted to slab 803, wherein the slab 803 is fixed to an I-beam 805 which is part of the frame of a building. Panel 801 is mounted to slab 803 by way of support plate 809, wherein support plate 809 is mounted to the slab 803 via a bolt or other permanent or removable fixation means. In one embodiment, support plate 809 is connected to the slab 803 by way of a welded stud 811. In one embodiment, cladding assembly 800 includes insulation 813, which is operable to be rigid, placed on top of the slab 803. Cladding assembly 800 further includes a cant strip 815 which connects the slab 803 to the ballistic panel 801, and assists in preventing sharp bending of components. Cant strip 815 is secured to the ballistic panel 801 by an expansion anchor 817, which is covered by flashing 819 to protect the expansion anchor 817 from environmental conditions. The insulation 813 and cant strip 815 are covered by a roofing membrane 821 to provide protection from environmental conditions. To provide increased strength, cladding assembly 800 is also operable to include an angle strut 823 to further secure the ballistic panel 801 to a building. In a preferred embodiment, angle strut 823 is made out of steel, but it is understood that angle strut 823 could be made of other suitable metals, alloys, natural materials, or synthetic materials. Angle strut 823 is connected to ballistic panel 801 by way of an expansion anchor.

In yet another embodiment, the ballistic concrete of the present invention is mixed and prepared without water. The mixed ballistic concrete without water is packaged such that it is operable to be sold and used in any application where a ballistic concrete is necessary or useful. As such, once the mixed ballistic concrete is combined with water and mixed by a customer, it is operable to be poured into any form, whether the form is a normal form such as a wall or a custom form, in order to suit the needs of the customer. For example, the customer is able to use the mixed ballistic concrete to create structures for a live fire training range that requires specific styles or types of buildings to mimic specific scenarios. The mixed ballistic concrete without water is operable to be packaged in order to produce any volume of hardened ballistic concrete, such as, but not limited to, about one cubic yard, about one cubic meter, between about one cubic yard and about ten cubic yards, between about one cubic meter and about ten cubic meters, greater than about ten cubic yards, or greater than about ten cubic meters.

In one embodiment of the present invention, the ballistic concrete further comprises a larger aggregate which increases the resistance of the ballistic concrete to penetrative rounds. In one embodiment, the ballistic concrete includes larger aggregate which is ⅜ths of an inch common aggregate. In another embodiment, the ballistic concrete includes larger aggregate which is between about 0.25-inch and 0.5-inch aggregate. In yet another embodiment, the ballistic concrete includes larger aggregate which is less than one-inch aggregate. The larger aggregate is combined with the cement and fine aggregate (such as sand) prior to adding and mixing the other ingredients. The inclusion of this larger aggregate, such as ⅜ths inch aggregate, increases the density of the ballistic concrete and provides resistance sufficient to stop penetrator rounds. Penetrator rounds include a thing tungsten pin in the middle of the round that is able to punch through body armor, and are available in many calibers including, but not limited to, 0.22, 0.30-06, 0.50, and 7.62 NATO caliber rounds. In one embodiment of the present invention, the addition of the larger aggregate gives the ballistic concrete a density of between about 50 pcf and about 150 pcf. In another embodiment, the addition of the larger aggregate gives the ballistic concrete a density of between about 25 pcf and about 200 pcf. In yet another embodiment of the present invention, the larger aggregate increases the compressive strength of the ballistic concrete to between about 3,000 pounds per square inch (psi) and about 5,000 psi as tested 28 days after pouring in accordance with ASTM C 39 (2001). In another embodiment, the larger aggregate increases the compressive strength of the ballistic concrete to between about 2,500 pounds per square inch (psi) and about 7,500 psi. In yet another embodiment, the larger aggregate increases the compressive strength of the ballistic concrete to between about 2,000 pounds per square inch (psi) and about 10,000 psi.

In one embodiment, the present invention provides a method of retrofitting a preexisting wall for bullet resistance including the steps of: acquiring ballistic paver blocks; selecting a preexisting wall to be augmented; selecting a side of the preexisting wall to be augmented; applying a row of the ballistic paver blocks in the first layer; applying subsequent rows of the ballistic paver blocks in the first layer; applying subsequent layers of the ballistic paver blocks.

In another embodiment, the present invention provides a bullet resistant wall including: ballistic paver blocks; wherein the ballistic paver blocks are constructed, configured and arranged to create a wall with multiple layers; wherein the multiple layers are formed through multiple rows of the ballistic paver blocks, wherein seams formed by abutting edges of the ballistic paver blocks are offset to avoid overlapping seams, i.e., no abutting edges of a first layer are aligned with abutting edges of a second or subsequent layer. In an alternative embodiment, the ballistic paver blocks and the bullet resistant wall do not contain any metal shielding or metal mesh. In yet another embodiment, the ballistic paver blocks and the bullet resistant wall do not contain any foam.

Figure 9:
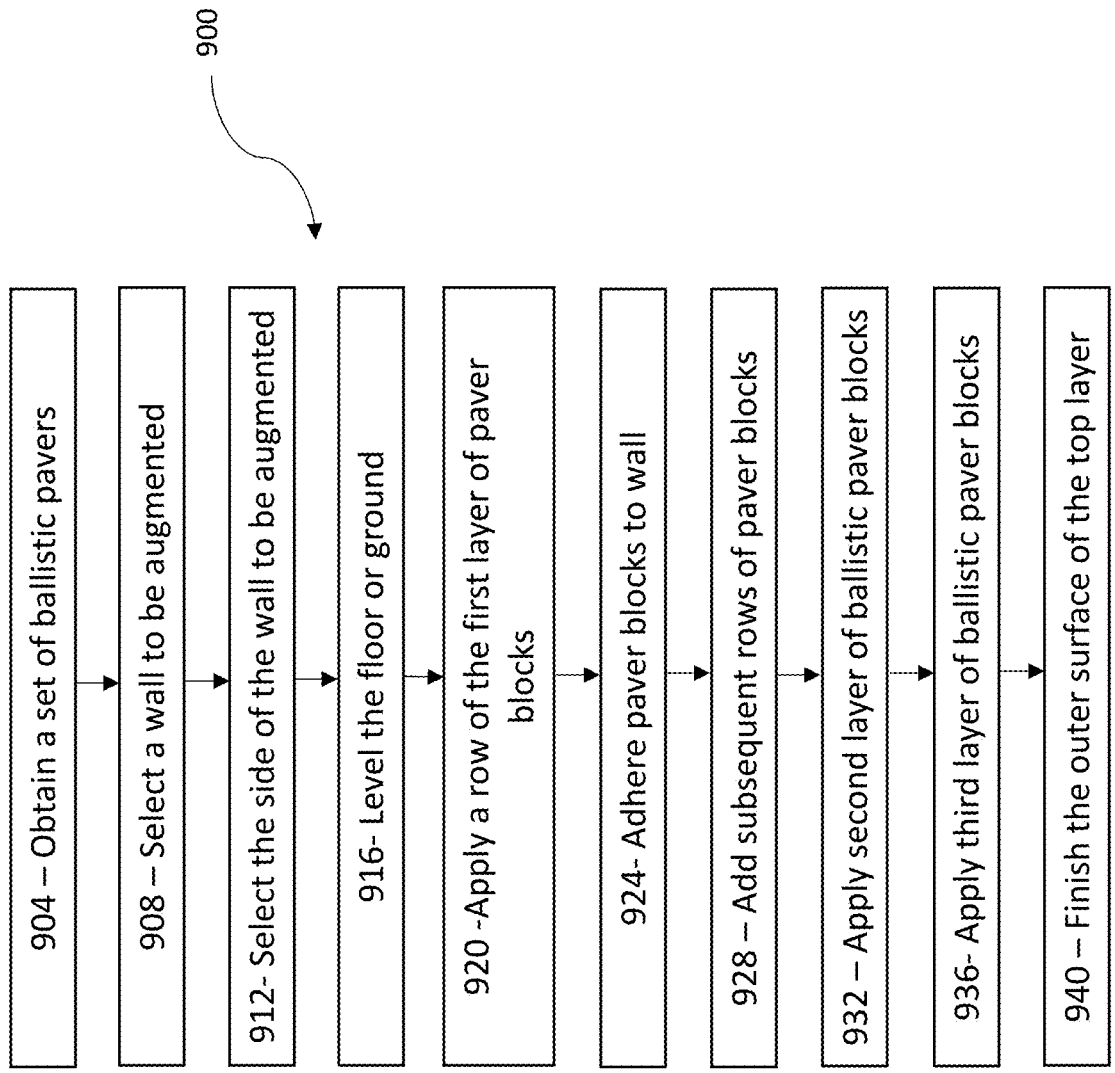
FIG. 9 illustrates a sequence of steps associated with retrofitting a preexisting wall to provide bullet resistance, according to one embodiment of the present invention.

FIG. 9 illustrates a sequence of steps 900 associated with retrofitting a preexisting wall to provide bullet resistance, according to one embodiment of the present invention.

STEP 904—Obtain a set of ballistic paver blocks for use in the project. In one embodiment of the present invention, the dimension of the ballistic paver blocks is 12 inches by 12 inches by 3 inches. In an alternative embodiment, the ballistic paver blocks have a surface face of between 144 and 324 square inches. In an alternative embodiment, the ballistic paver blocks have a surface face of between 16 and 64 square inches. In an alternative embodiment, the ballistic paver blocks have a surface face of between 64 and 144 square inches. In one embodiment of the present invention, the ballistic paver blocks are square. Alternatively the ballistic paver blocks are rectangular. In a preferred embodiment of the present invention the ballistic paver blocks will be as large as is convenient for the application. Using larger paver blocks means fewer blocks to move and adhere to the wall. Additionally, larger ballistic paver blocks create fewer seams and are desirable because a bullet that happens to hit a seam is able to penetrate through the seam more easily than penetrating through a non-seam section of the ballistic paver block.

In a preferred embodiment of the present invention, the ballistic paver blocks are made using ballistic concrete in accordance with the process set forth above by the present invention. Alternatively, the ballistic paver blocks are made with SACON® ballistic concrete prepared following the specifications set forth in the "Technical Specification for Shock Absorbing Concrete (SACON®)—Shock Absorbing Concrete for Constructing Live-Fire Training Facilities" which is described above. Alternatively, the ballistic paver blocks are made with ballistic concrete prepared in some other manner where the ballistic concrete is used to allow bullets to be captured rather than ricochet off of the ballistic paver block when striking the paver block substantially perpendicularly.

Step 908—Select a preexisting wall to be augmented. In one embodiment of the present invention the preexisting wall is an interior wall. Alternatively the preexisting wall is an exterior wall. In one embodiment of the present invention the preexisting wall is made from conventional steel studs with drywall. Alternatively the preexisting wall is operable to be made of concrete masonry units (CMUs—sometimes called cinder blocks). Alternatively the preexisting wall is made using any other conventional building technique.

Step 912—Select the side of the preexisting wall to be augmented. In one embodiment of the present invention the preexisting wall is an exterior wall. When determining which side of the wall is to be augmented, many factors are considered. By way of example and not limitation, factors include the need to maintain interior square footage. In another embodiment of the present invention the ballistic paver blocks are placed against the face of the preexisting wall anticipated to be closer to the shooter. Alternatively, the ballistic paver blocks are placed against the face of the preexisting wall anticipated to be farther away from the shooter.

Step 916—Level the floor or ground in the region that will receive ballistic paver blocks. This is an optional step as some buildings have walls that are flat and level by the edge of the wall to be enhanced. By way of example and not limitation, a user is operable to snap a line to mark what is level, then shim or use some other methods known to those skilled in the art to get a level base for the ballistic paver blocks.

Step 920—Apply a row of the first layer of ballistic paver blocks. FIG. 10A illustrates a front view of a wall with a first layer of ballistic paver blocks according to one embodiment of the present invention. In one embodiment of the present invention the ballistic paver blocks are 12 inches square and 3 inches thick. Alternatively the ballistic paver blocks are operable to be in a different dimensional configuration depending on requirements of the final product and the limitations associated with the work space. In one embodiment of the present invention the row is premeasured so that custom ballistic paver blocks fit flush against the abutting wall. In another embodiment of the present invention the wall is built with standard sized ballistic paver blocks and the last ballistic paver block before the end of the wall is cut with a saw. The ballistic paver blocks are readily field cut with a tile saw or other saw used to cut analogous material.

For a wall that is to be protected that will abut another wall to be protected in an inside corner, run the first row of the first layer of the first wall to be protected to the corner. Run the first row of the first layer of the second wall to be protected until making contact with the first wall.

In a preferred embodiment of the present invention, the seams between adjacent ballistic paver blocks do not need to be filled with traditional mortar as the flat edges of the ballistic paver blocks will fit together. This is advantageous as traditional mortar does not have bullet resistance characteristics, and thereby eliminating mortar reduces the surface of the wall that is not resistant to bullets. Additionally, any gaps in the seams for one layer of ballistic paver blocks will be covered by subsequent offset layers of ballistic paver blocks, thereby ensuring sufficient bullet resistance across the entire augmented wall face. In another embodiment the gaps between ballistic paver blocks is filled in with traditional mortar. It is advantageous to modify ballistic paver block spacing, thereby ensuring subsequent ballistic paver block layers are offset from previous ballistic paver block layers.

Step 924—Adhere the ballistic paver block to the wall using a mastic such as a landscaping mastic used for attaching stone or masonry elements in hardscaping. In one embodiment of the present invention the ballistic paver blocks are adhered to the preexisting wall using a construction mastic. In another embodiment the ballistic paver blocks are adhered to the preexisting wall using an alternative adhesive appropriate for the work environment. By way of example and not limitation, a taller wall consisting of ballistic paver blocks requires a stronger adhesive to ensure the stability of the augmented wall and safety of those in its proximity. Those of skill in the art will be able to select an appropriate construction adhesive for use with the present disclosure.

In one embodiment of the present invention the adhesive is placed only on the singular face of each individual ballistic paver block that contacts the preexisting wall or previous layers of ballistic paver blocks. In this configuration the adhesive is used to ensure the ballistic paver blocks do not slip away from the wall. The combined weight of the ballistic paver blocks is transferred down to the floor and therefore no adhesive on the bottom of the ballistic paver blocks is required. In another embodiment of the present invention, where the shape of the augmented wall warrants it, adhesive is operable to be applied to every side of the ballistic paver blocks.

Step 928—Add the subsequent rows to the first row of the first layer of ballistic paver blocks. In a preferred embodiment each row of ballistic paver blocks is offset from the row below (closer to the floor). By way of example and not limitation, the first row starts with a 12 inch wide ballistic paver block, the second row starts with a 4 inch wide ballistic paver block, and the third row starts with an 8 inch ballistic paver block, as illustrated in FIG. 10A. The pattern then repeats until the top of the preexisting wall. Alternatively, the offset is 2 inches. Alternatively the offset is 3 inches. Alternatively the offset is 5 inches. Alternatively the offset is the width of the ballistic paver blocks divided by the number of layers in the augmented wall. In a preferred embodiment of the present invention, the magnitude of the offset from one row to the next is utilized in every layer of the augmented wall, thereby preventing overlapping seams.

Figure 10B:
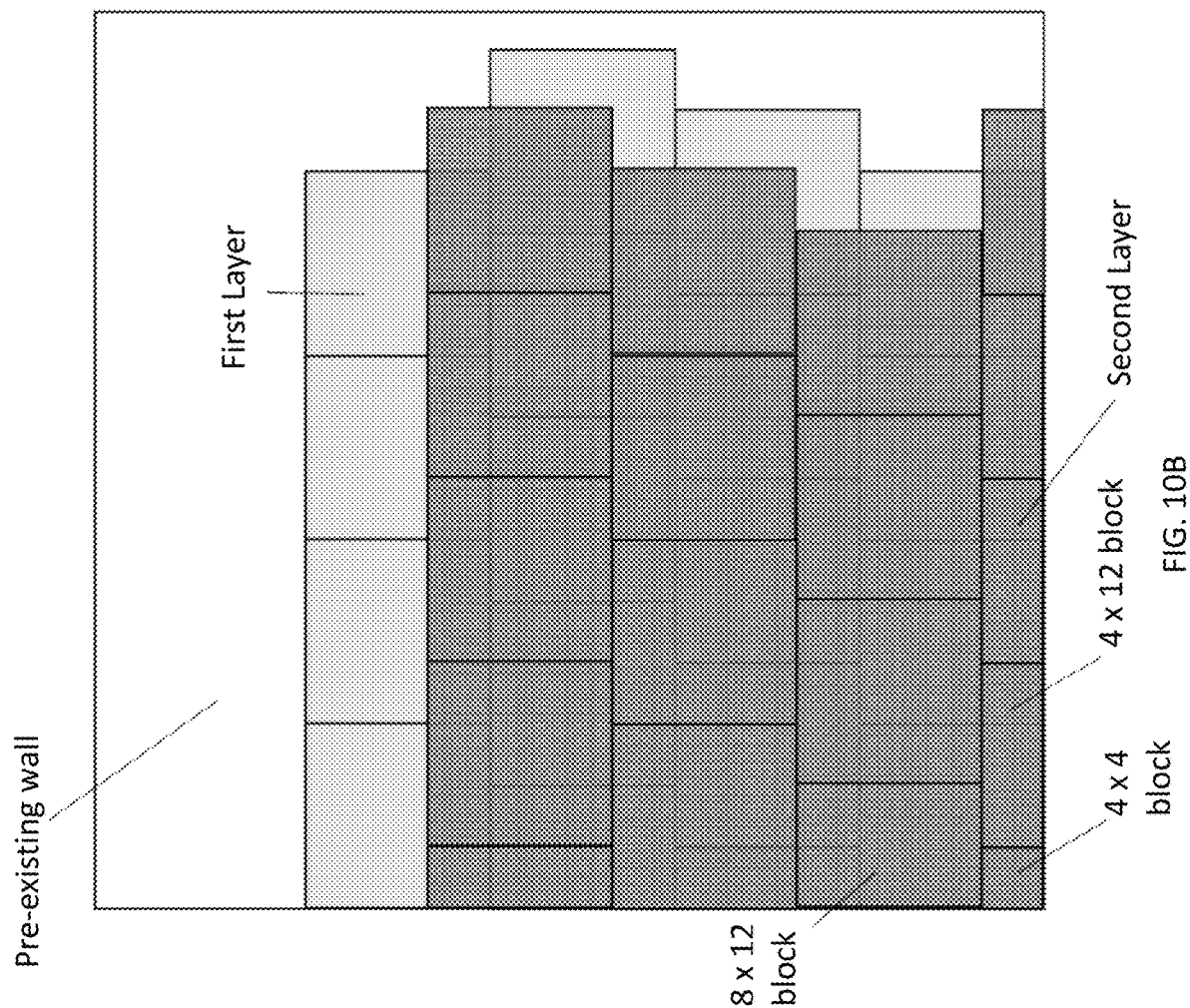
FIG. 10B illustrates a front orthogonal view of a wall with a first and second layer of ballistic paver blocks, according to one embodiment of the present invention.

Step 932—Apply a second layer of ballistic paver blocks. In a preferred embodiment of the present invention, the second layer of ballistic paver blocks are offset from the first layer of ballistic paver blocks so that none of the horizontal seams of the second layer of ballistic paver blocks align with the horizontal seams of the first layer of ballistic paver blocks FIG. 10B illustrates a front view of a wall with a first and second layer of ballistic paver blocks according to one embodiment of the present invention. By way of example and not limitation, the first row of the second layer consists of ballistic paver blocks that are 4 inches by 12 inches by 3 inches rather than the ballistic paver blocks measuring 12 by 12 by 3 used in the first layer. This offsets the horizontal seams by 4 inches.

Additionally, the ballistic paver blocks are placed so that none of the vertical seams on the second layer of ballistic paver blocks matches up with the vertical seams of the first layer of ballistic paver blocks. In one embodiment of the present invention, a first ballistic paver block of 4 by 4 by 3 inches is used and 4 by 12 by 3 inch ballistic paver blocks are used for the remainder of the first row across the floor. The second layer is shown semi-transparent in FIG. 10B. The next row is offset a different amount than the second row of the first layer. Therefore the second row of the second layer is offset 8 inches rather than the 4 inch lateral offset of the second row of the first layer. For example, an 8×12 inch first block is used, with subsequent blocks being 12×12. This process continues with ballistic paver blocks of the second layer being adhered to the first layer of ballistic paver blocks and the last ballistic paver block in each row being field cut to fill the remaining space. The top row of ballistic paver blocks is field cut to fit the gap between the second to last row and the ceiling. One skilled in the art will realize that there are many variations of the present invention depending on the number of ballistic paver blocks available, size of wall, level of bullet protection needed, etc.

Figure 10C:
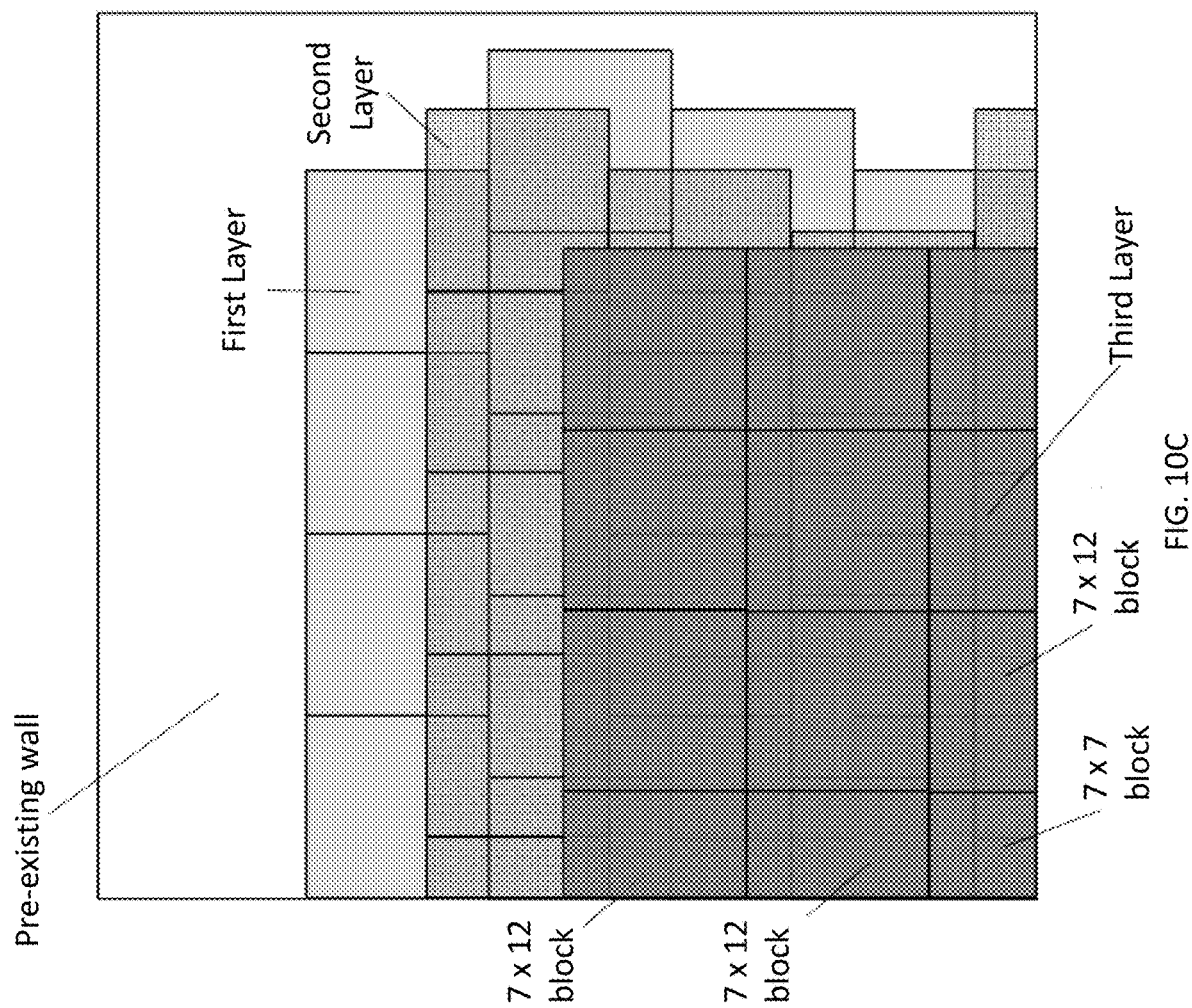
FIG. 10C illustrates a front orthogonal view of a wall with three layers of ballistic paver blocks according, to one embodiment of the present invention.

Step 936—Apply the third layer of ballistic paver blocks. In a preferred embodiment of the present invention, the ballistic paver blocks of the third layer are arranged so that the vertical and horizontal seams for the third row of ballistic paver blocks do not match the vertical or horizontal seams of the second or first layers of ballistic paver blocks. By way of example and not limitation, one embodiment of the present invention consists of a 7 inch square ballistic paver block at the start edge on the floor and then completing the first row with 7 inch by 12 inch ballistic paver blocks laid with the 12 inch side parallel to the floor. FIG. 10C illustrates a front view of a wall with three layers of ballistic paver blocks according to one embodiment of the present invention. The third layer is shown semi-transparent in FIG. 10C. The subsequent rows of ballistic paver blocks on the third layer all start with a 7×12 inch ballistic paver block. One skilled in the art will realize that there are many variations of the present invention depending on the number of ballistic paver blocks available, size of wall, level of bullet protection needed, etc.

One of skill in the art will recognize that the offsets used to start the second or third layer are operable to be used for the first layer. The sequence of layer offsets is not important so the repeating pattern of offsets from vertical row to vertical row could be (0, 4, 8) (4, 8, 0); (8, 0, 4) (8, 4, 0) (4, 0, 8) or (0, 8, 4).

Figure 11:
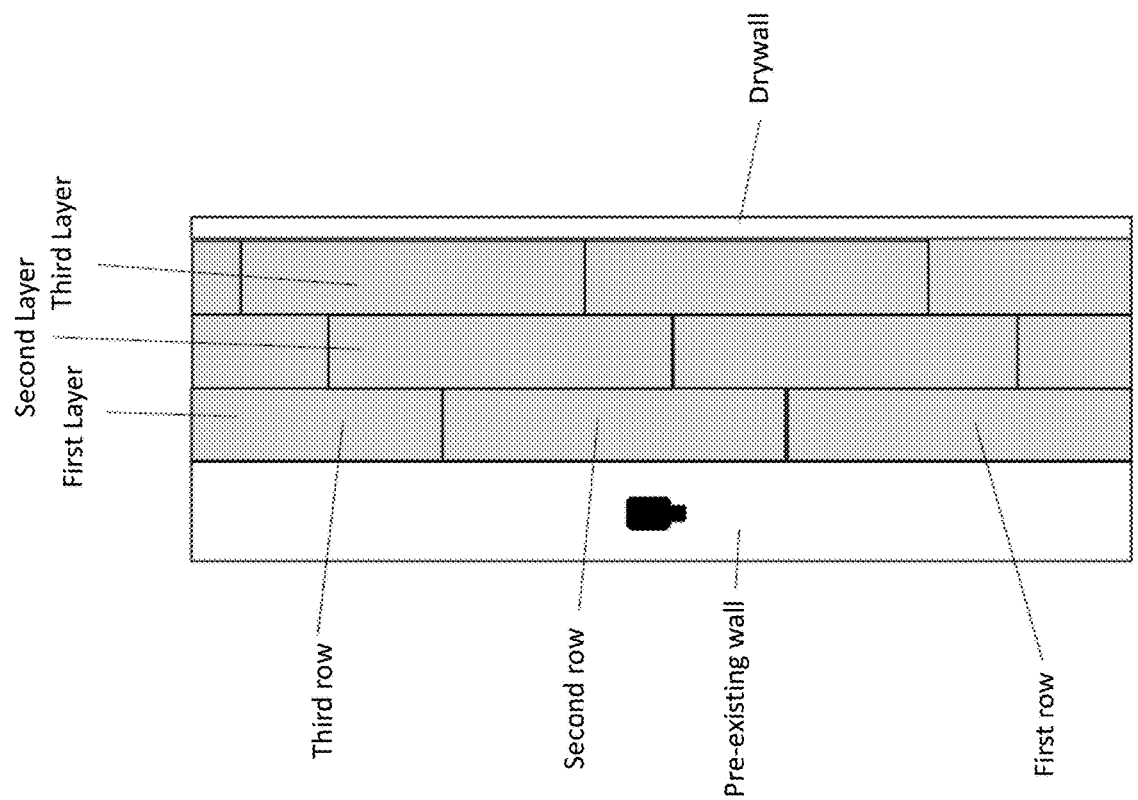
FIG. 11 illustrates a side orthogonal view of a wall with three layers of ballistic paver blocks and drywall according to one embodiment of the present invention.

Step 940—Finish the outer surface of the top layer of pavers. In one embodiment of the present invention the wall is finished with drywall. The drywall is attached to the top layer of ballistic paver blocks using masonry screws. Alternatively the drywall is operable to be attached using other methods. By way of example and not limitation, the drywall is attached with adhesives. In another embodiment of the present invention the wall is finished with other surface treatments. By way of example and not limitation, the wall is finished with paint. FIG. 11 is a side view of a finished wall with three layers of ballistic paver blocks and drywall.

Alternate embodiments of the present invention include augmenting the exterior face of walls. In one embodiment of the present invention, ballistic paver blocks on exterior side of an exterior wall are covered with conventional facades including, by way of example and not limitation, brick, stucco, or masonry board. In another embodiment the exterior ballistic paver blocks are covered for ornamental appearance. Alternatively the ballistic paver blocks are covered to tactically conceal the location of augmented walls.

Ballistic Wall Test Results

A bullet resistant wall with three layers of 12 inch by 12 inch by 3 inch ballistic paver blocks with offsetting vertical and horizontal seams, according to one embodiment of the present invention, was shot repeatedly with a NATO M80 round (7.62 NATO) using an Armalite AR-10 rifle with a 20 inch barrel. The shots were filed substantially perpendicular to the augmented wall. The distance from the gun to the wall was well under 82 feet and is thus unimportant as the velocity of such a bullet is constant for the first 82 feet. The depths of penetration of the bullets measured from the outermost ballistic paver block to the trailing end of the projectile were in the range of 2.5 to 3 inches. This is a small fraction of the 9 inch total depth of ballistic paver blocks according to this embodiment of the present invention, so a second shot that hit the same bullet hole would not be able to traverse the ballistic paver blocks.

Ballistic Wall Alternatives and Variations

In an alternate embodiment of the present invention, the ballistic paver blocks are applied to numerous walls to create a safe room. A safe room is a place where staff and visitors or students retreat when there is an active shooter situation. It is preferred that the safe room have a door that is itself resistant to bullets or other projectiles such as from a grenade. In one embodiment, rooms are built out of walls of the ballistic concrete of the present invention which are resistant to grenades, such as for use in close quarters and breach training exercises.

While this disclosure has described a system that uses three layers of 3 inch thick ballistic paver blocks, other combinations are possible. Those of skill in the art will recognize that not all three layers of ballistic paver blocks need be the same thickness. A designer is able to choose to use two layers of ballistic paver blocks that are 4 inches thick and one layer of ballistic paver blocks that is 2 inches thick. The total of the layers does not have to add up to 9 inches. Depending on the type of anticipated threat, the budget for the project, and the practical constraints of how much space is able to be consumed in a preexisting space, 9 inches do not have to be the selected choice. An area that is only seeking to be hardened against hand guns as it is unlikely that a rifle could be carried to that location in one embodiment requires a lower level of bullet resistance to add to interior walls.

A location seeking to harden exterior walls for a possible threat from a 50 caliber sniper round might seek a larger total depth for the set of layers. A location that is operable to receive a number of bullets in a small area of wall such as from a fully automatic weapon or a machine gun in one embodiment seeks to have a larger total depth for the set of layers.

An alternative embodiment includes a wall wherein some of the layers are ballistic concrete and some of the layers are normal or non-ballistic concrete. For example, in a wall composed of three layers, the outer two layers are ballistic concrete and the third, inner layer is normal concrete. In this manner, the outer two layers will absorb the round and, should the round have enough kinetic energy to penetrate these two layers, the normal concrete layer will offer more potential to stop the round than if it were ballistic cement.

In yet another embodiment, the layers have different densities. For example, the middle layer is a higher density to better stop high-kinetic energy projectiles. The lower-density inner and outer layers prevent spalling. Alternatively, the densities are operable to increase from front to back.

The current disclosure expresses that a preferred embodiment has three or more layers of ballistic paver blocks. Specifically, there is an advantage to having three layers rather than two layers. Because a bullet that happens to hit a seam is operable to penetrate through the barrier more easily than had the bullet not hit the seam, by using at least 3 layers and configuring the blocks so none of the seams overlap, a bullet that goes into a seam only travels through one third (⅓) of the barrier through that seam. In contrast, in a barrier with only two layers, a bullet that goes into a seam will go through one half (½) of the barrier through that seam. Thus, a 2-layer barrier must be larger relative to a 3-layer barrier to provide the same protection.

In a preferred embodiment of the present invention, the augmented wall contains no additional metal in the form of metal plates or shielding. While it is well known in the prior art references to incorporate metal for adding projectile resistance to structures, this is expensive and labor intensive. Additionally, the added metal increases the weight of the final product. The present invention achieves the same, or better, level of protection from bullets and projectiles without the added cost, labor, or weight associated with utilizing metal components in the wall.

While the present disclosure expresses a preferred embodiment consisting of ballistic concrete pavers for all of the multiple layers, one of skill in the art could choose to have one or more layers of non-ballistic concrete pavers with one or more layers of ballistic concrete pavers. By way of example and not limitation, the first two layers of ballistic paver blocks are followed by a non-ballistic paver block layer. Alternatively, a first layer of non-ballistic pavers is followed by one or more subsequent layers of ballistic concrete. Alternatively the non-ballistic paver is in-between two layers of ballistic paver blocks. It is of note that having the outer layers formed with ballistic concrete will reduce ricochets and spalling.

Alignment of Seams in Ballistic Walls

While the present disclosure taught the advantages of having three layers with the ballistic paving blocks on each layer offset from one another so that the vertical seams and horizontal seams on any one layer did not overlap a different layer, this is not absolutely required in order to obtain many of the benefits of the present disclosure.

If the vertical and horizontal offsets are one third of the dimension of an uncut square ballistic panel block, then embodiments of the present invention which incorporate four layers of ballistic paver blocks is going to repeat the seam pattern in two layers.

A user is able to choose to have offsets of one half of an uncut square block so that the third layer repeats the seam pattern of the first layer. While this is not preferred embodiment, the chances of a bullet going through the seam on the outermost layer, passing through the middle layer where there is no seam and hitting exactly the seam on the bottom layer is low.

Use of Tongue and Groove Pavers in Ballistic Walls

The use of tongue and groove could be used with ballistic paver blocks but is not preferred. Adding tongue and groove complicates the molding process with a ballistic paver block that is only a few inches thick. Specifically, the thin sections of tongue or grooves would be at risk of breaking. Additionally, tongue and groove would be more sensitive to imperfections from walls and floors that are imperfectly aligned. Tongue and groove would add complications when field cutting the pieces to create the seam offsets from layer to layer. However, especially if thicker ballistic panel blocks were used, tongue and groove might have appeal to some users.

Figure 12:
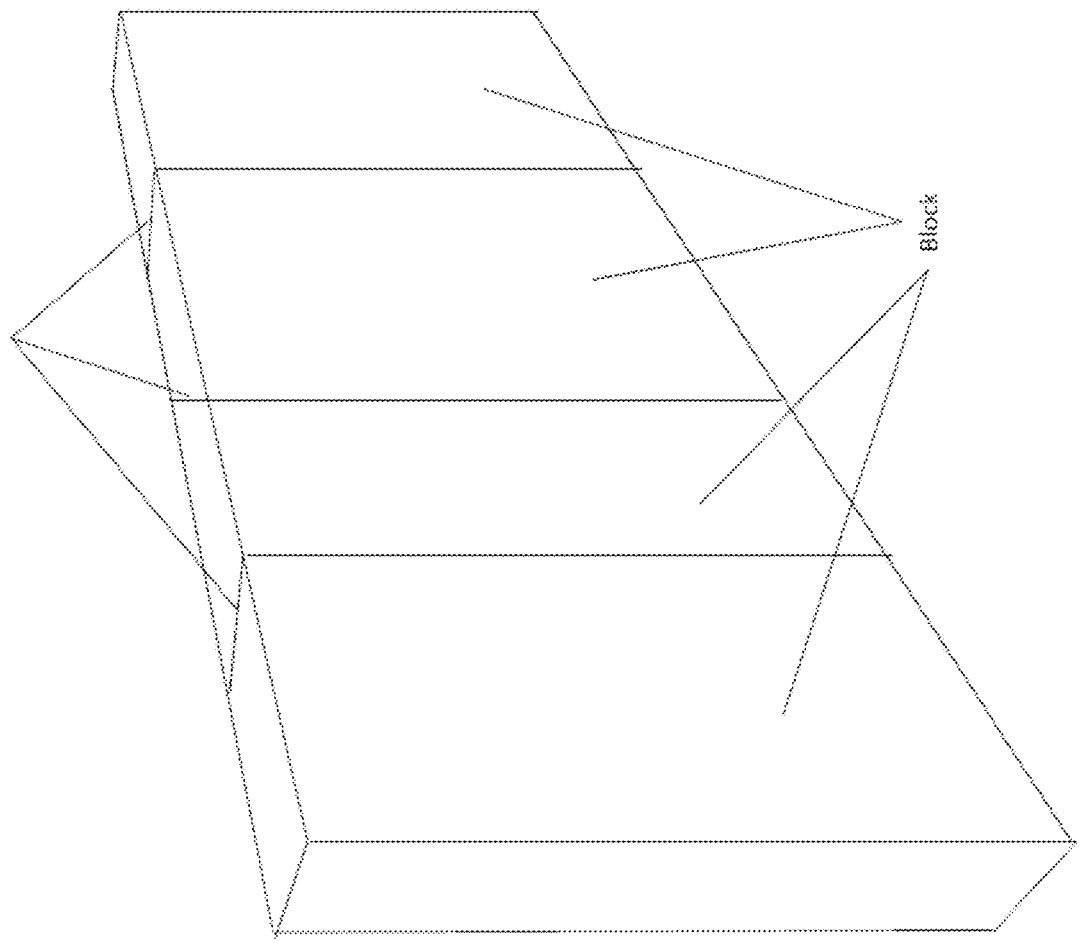
FIG. 12 illustrates a side perspective view of a wall made from blocks with two beveled edges, according to one embodiment of the present invention.

In another embodiment of the present invention, the edges of the ballistic paver blocks are beveled. By way of example and not limitation, the vertical edges of the ballistic paver blocks are cut at a 45 degree angle to form beveled edges. Blocks are juxtaposed with alternating bevels to form a bevel joint, in order to eliminate gaps. FIG. 12 illustrates an example embodiment of blocks with two beveled edges fitted together according to the present invention. When the layers are configured as specified hereinabove using non-bevel block, the wall has no non-pinpoint seam overlaps, but still has pinpoint seam overlaps. Adding this bevel joint eliminates orthogonal pinpoint seam overlaps, which is operable to exist with orthogonal blocks where vertical and horizontal edges cross.

Thus, the ballistic paver blocks are constructed, configured, and arranged to form a wall having at least three adjacent individual layers; wherein the blocks have beveled, juxtaposed vertical edges; and the layers are configured to provide no alignment of abutting edges between layers. This reduces the assembly and manufacturing difficulties associated with tongue and groove blocks while providing enhanced protection from bullets or projectiles that hit the seam.

Ballistic Concrete Masonry Unit

A ballistic concrete masonry unit is also provided for by the present invention. The masonry unit is made using the ballistic concrete as described hereinabove. The ballistic concrete is operable to be any density capable of performing the necessary absorption of rounds. In one embodiment, the ballistic concrete used is a lower density (about 70 lb/cu ft) to capture slower-moving projectiles. This embodiment is further designed and configured to stop faster-moving projectiles. This range of functionality is achieved by configuring the thickness of the block to also stop the high-velocity rounds. To stop a high-velocity round, which is traveling at about 3300 ft/sec, the masonry unit needs to be at least about 20 cm (8 inches) inches thick. More preferably, the masonry unit is about 25 cm (10 inches) thick. Thus, using a combination of low density and appropriate thickness, the masonry unit is able to absorb and stop a wide range of projectiles.

Figure 13:
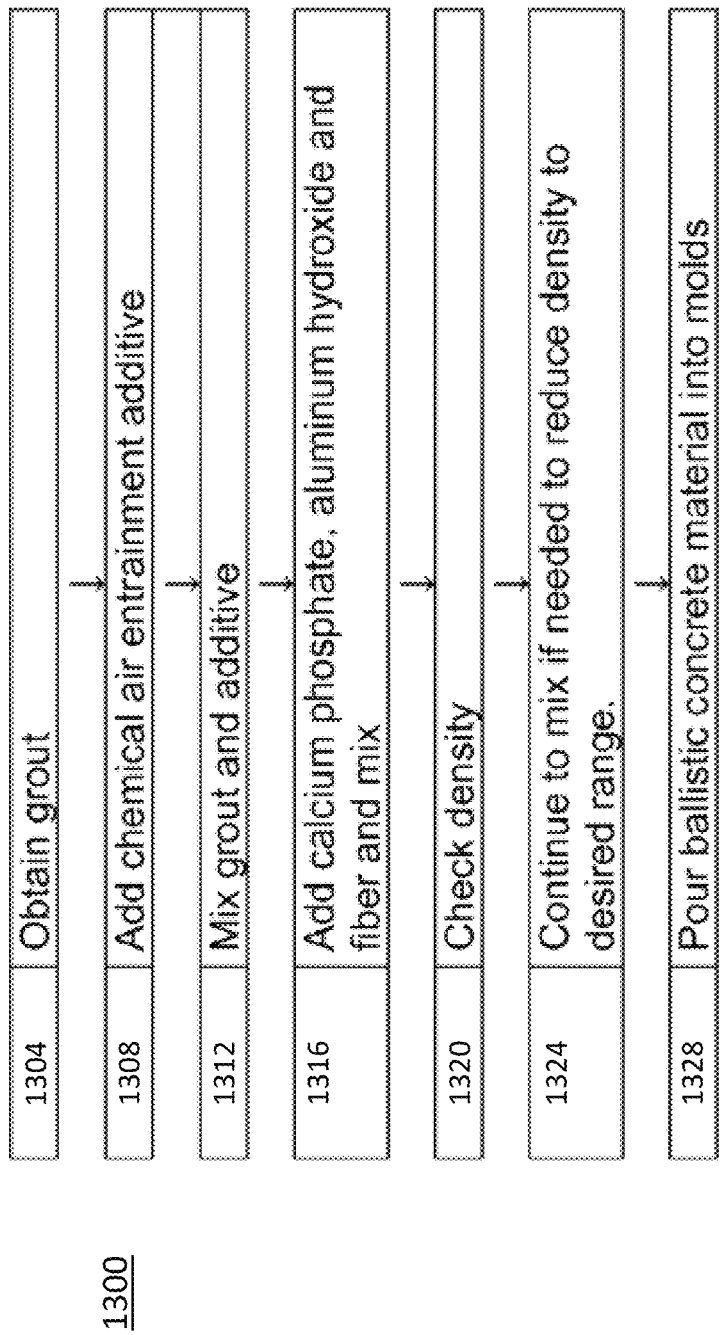
FIG. 13 summarizes a process for making bullet absorbing components using ballistic concrete made with chemical air entrainment additive rather than foam, according to one embodiment of the present invention.

FIG. 13 summarizes a process 1300 for making bullet absorbing components such as ballistic concrete masonry units. As noted below, some of the steps are operable to be performed in slightly different orders but for sake of clarity, it is useful to introduce one sequence of steps for discussion rather than muddy the water with premature digressions on alternatives. The steps are summarized as follows:

Step 1304—Obtain a grout of cement, fine aggregate, and water in a mixer in accordance with ACI standard 304R and/or ASTM standard C 94. The act of obtaining includes creating the grout or obtaining the grout from some third party.

Step 1308—Add a chemical air entrainment additive (DARAFILL Dry, W. R. Grace & Co.).

Step 1312—Following the addition of the additive, mix the grout for five minutes. Mixing is operable to be achieved by rotating the drum on a cement mixer truck.

Step 1316—Add Calcium Phosphate, Aluminum Hydroxide, and fiber. One suitable fiber is GRACE FIBERS. Mix for an additional ten minutes.

Step 1320—Check density such as by weighing using a ¼ cubic foot testing pot. Target weight is 22.7 pounds (approximately 91 pounds per cubic foot) as the actual target is 91 pounds per cubic foot+−.3 pounds per cubic foot.

Step 1324—Continue to mix if needed to reduce density to desired range. Additional mixing lowers the density. Continue to mix, checking frequently, until target density is achieved. The target wet density material when poured into components is 1458 kg/m.sup.3 (91-pounds per cubic foot+3 pounds per cubic foot).

Step 1328—Pour ballistic concrete material into masonry unit molds. As with traditional SACON type ballistic concrete, vibration is operable to be used with standard structural concrete is to be avoided to minimize destruction of air bubbles.

Figure 14B:
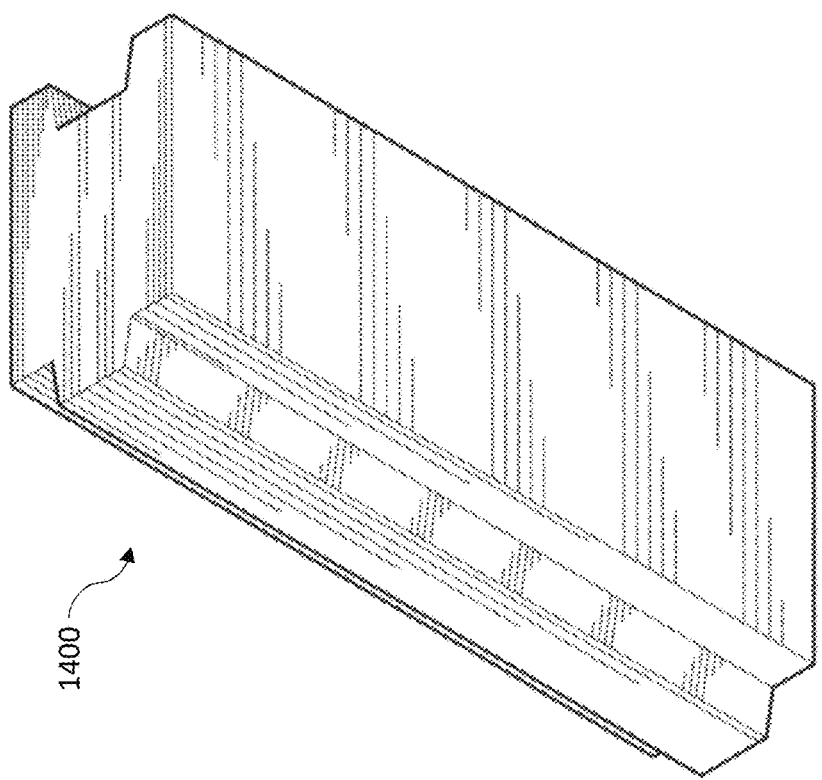
FIG. 14B illustrates another side perspective view of the ballistic concrete masonry unit of FIG. 14A, according to one embodiment of the present invention.
Figure 14A:
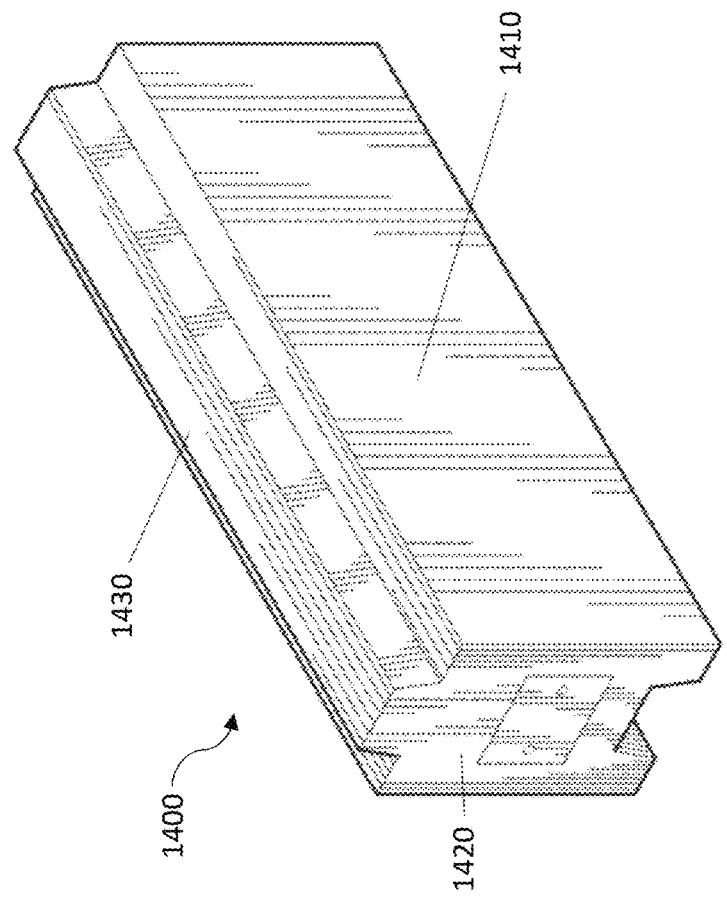
FIG. 14A illustrates a side perspective view of a ballistic concrete masonry unit, according to one embodiment of the present invention.
Figures 14D, 14E:
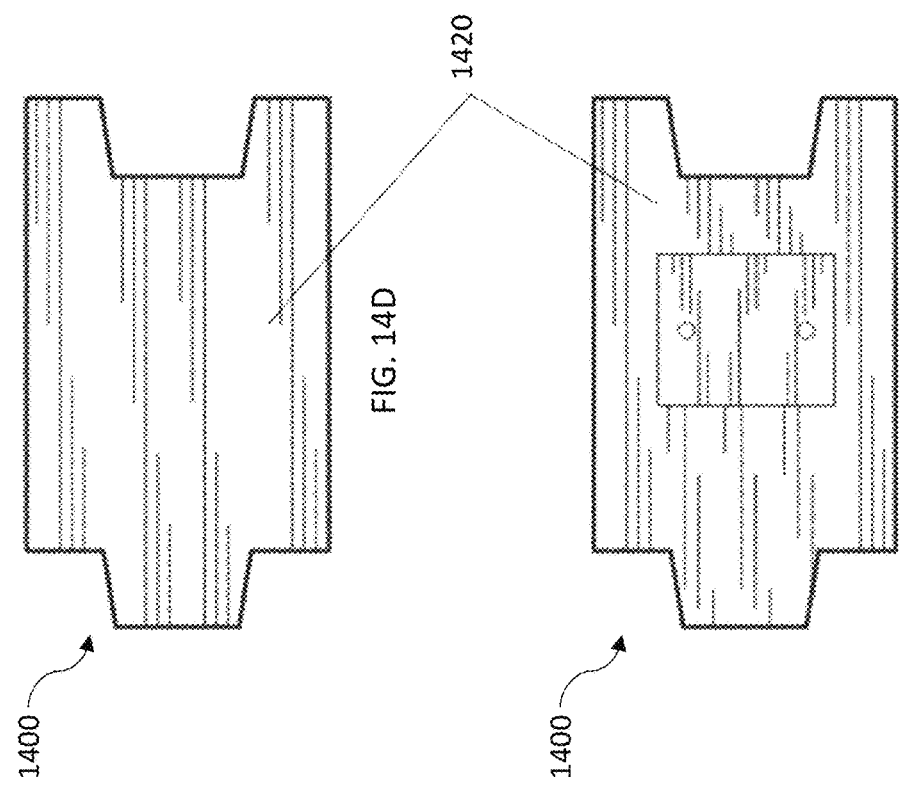
FIG. 14D illustrates an end view of the ballistic concrete masonry unit of FIG. 14A, according to one embodiment of the present invention.
FIG. 14E illustrate an end view of the ballistic concrete masonry unit of FIG. 14A, according to one embodiment of the present invention.
Figure 14C:
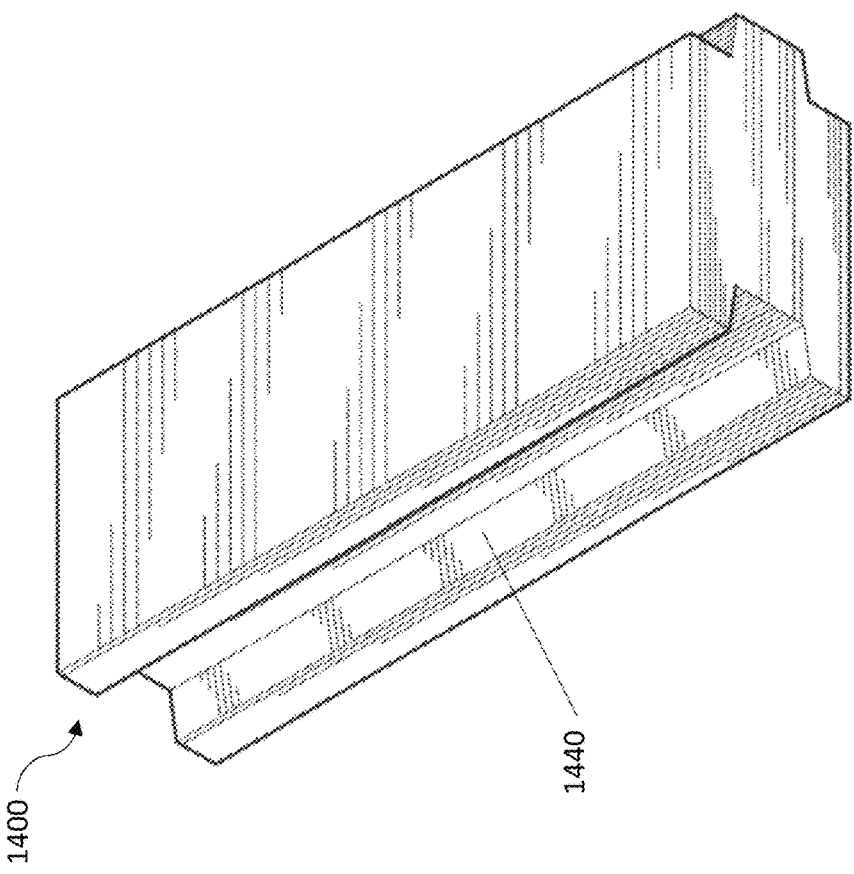
FIG. 14C illustrates a bottom perspective view of the ballistic concrete masonry unit of FIG. 14A, according to one embodiment of the present invention.
Figure 15:
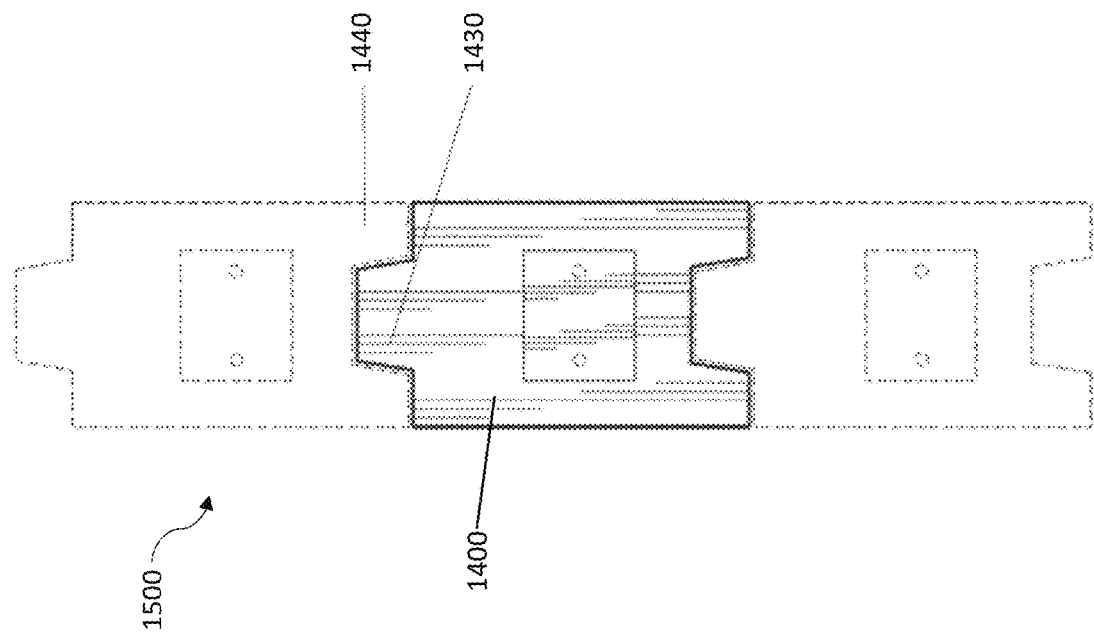
FIG. 15 is an end orthogonal view of several ballistic concrete masonry unit of FIG. 14A stacked to form a wall, according to one embodiment of the present invention.
Figure 14F:
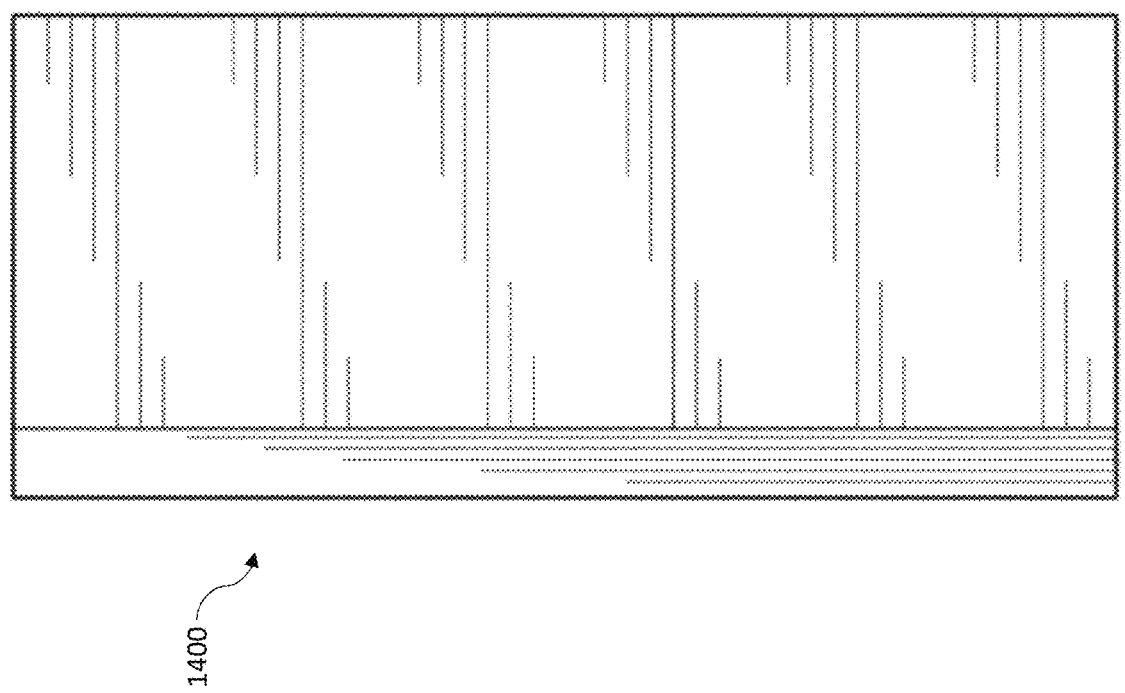
FIG. 14F is a side orthogonal view of the ballistic concrete masonry unit of FIG. 14A, according to one embodiment of the present invention.

The ballistic concrete masonry units are designed to matingly connect with tongue-and-groove edges. An example of this design is shown in U.S. Pat. No. D662225 issued Jun. 19, 2012 to Amidon et al. for a Precast Panel for Use in a Live-Fire Training Structure; incorporated herein by reference in its entirety. FIGS. 14A to 14F and FIG. 15 show the masonry unit 1400 from different views. FIG. 14A is a front perspective view of masonry unit 1400. Masonry unit 1400 includes one more long faces 1410, one or more ends 1420, and one or more tongues 1430. FIGS. 14B and 14C are also perspective views of a masonry unit 1400. Also visible in FIG. 14C is one or more grooves 1440, which is operable to receive the tongue 1430 or one or more other masonry units 1400. FIGS. 14D and 14E are orthogonal bottom views of a masonry unit 1400, highlighting the ends 1420. FIG. 14F is an orthogonal side view of a masonry unit 1400. FIG. 15 is an end view of several ballistic concrete masonry units 1400 abutted to form a wall 1500. Note that these units are operable to be oriented vertically or horizontally. Other configurations are also able to be used without departing from the scope of the invention. Thus, the present invention provides for a stackable concrete masonry unit made with ballistic cement as described herein.

Protection Against Explosive Devices by a Ballistic Wall

This disclosure has disclosed a method of creating a wall that is hardened to make it unlikely that certain types of bullets fired from guns will traverse the wall protection. Nothing in this disclosure should be interpreted as limiting the use of the ballistic paver blocks to thwart only bullets but not shrapnel from grenades and various explosive devices such as a backpack bomb, a pressure cooker bomb such as used in the 2013 attack at the Boston Marathon, or other devices which are called an improvised explosive device. The benefits of the present disclosure include hardening walls to resist penetration of the wall from materials propelled from an explosive device.

Outlets and Other Utilities in a Ballistic Wall

In some instances an interior wall to be augmented with layers of ballistic paver blocks will have outlets for electricity, telephone or computer connections, or other utilities. Alternatively, an exterior wall is operable to have a water spigot. In some instances, the choice will be made to retain these various utilities and cut the ballistic panel blocks to allow the old connections to be reached. In other instances, the utilities such as electrical or communication jacks will be extended and placed on the new inside wall. In one embodiment, the wires are placed in a conduit to reduce the opening to be left in the layers of ballistic paver blocks. Those of skill in the art will recognize that a bullet that finds the openings through the layers of ballistic panel blocks is operable to traverse the wall and cause harm. The chances of a random shooter hitting a conduit path for an outlet from the other side of the wall is limited as there is not likely to be any indication on that side of the wall where the outlet or other utilities are located on the inside of the wall. A shooter is not likely to target a spigot on the exterior of the building.

Window Height Ballistic Walls

In an augmented wall that incorporates windows, one embodiment of the present invention leaves the windows but adds layers of ballistic panel pavers to either surround the windows or to simply rise from the floor to the bottom edge of the windows. Alternatively, the ballistic paver blocks are added to the bottom 3 feet of the wall. Alternatively, the ballistic paver blocks are added to the bottom 6 feet of the wall. Alternatively the ballistic paver blocks are added to the wall at a height that coincides with the budget for the augmentation. These alternative embodiments are advantageous because persons in the room would be able to drop to the ground and be protected by the enhanced wall even while bullets striking the windows and possibly the upper non-augmented section of walls are penetrated, while also augmenting the wall in the most cost-effective way.

Injector Assembly

Figure 16:
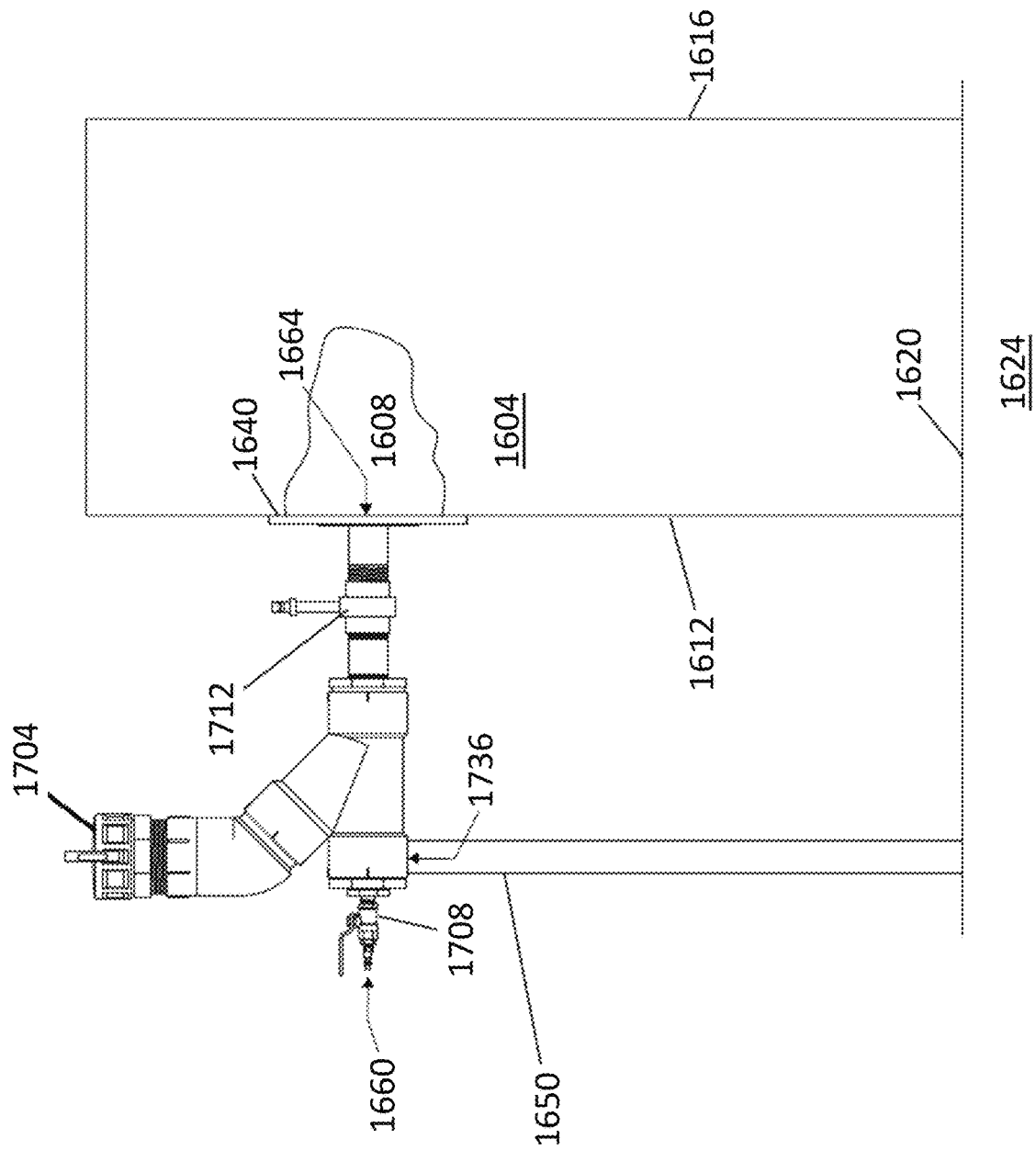
FIG. 16 illustrates a side orthogonal view of an injector assembly positioned to fill a void in a ballistic panel, according to one embodiment of the present invention.

In another embodiment of the present invention, an injector assembly is used to repair ballistic walls with ballistic concrete, such as the ballistic concrete of the present invention. FIG. 16 is a side view of an injector assembly connected to a ballistic panel with a void. In one embodiment, the void has been created in the ballistic panel by hits from projectiles, such as bullets. More specifically, FIG. 16 shows a ballistic panel 1604 with a base 1620 on the ground 1624 or some other support surface. A proximal face 1612 of the ballistic panel 1604 has a void 1608 extending from the proximal face 1612 a portion of the distance to the distal face 1616. Ballistic panels 1604 are operable to be used in live-fire training where a series of panels are used to create one or more structures such as a building or a faux tank to allow military or police personnel to train with live ammunition. The ballistic panels are designed to receive the projectile and retain the projectile so that trainees are not injured by ricochets. The ballistic panels 1604 are operable to also be used as backstops or safety barriers behind conventional targets or behind ballistic panel shoot houses or other structures.

The ballistic panels 1604 are operable to be used in a variety of sizes. The ballistic panels 1604 are operable to have a thickness between the proximal face 1612 and the distal face 1616 of approximately 24 to 30 inches. The thickness is operable to be selected based upon the properties of the ballistic concrete used for the ballistic panel 1604 and the anticipated kinetic energy of the ammunition. Thus, a ballistic panel for a backstop behind a pistol range is operable to be a different thickness from a ballistic panel intended to stop rounds from a M-16 rifle (sometimes called AR-15 rifle), or to stop rounds from a 50 caliber machine gun or sniper rifle.

Repeated hits of a ballistic panel 1604 in approximately the same location will degrade the panel and begin to create a void 1608. In order to maintain the integrity of the ballistic panel 1604 as a barrier, these voids 1608 need to be filled with material compatible with the purpose of the ballistic panel as a bullet absorbing barrier.

Figure 20:
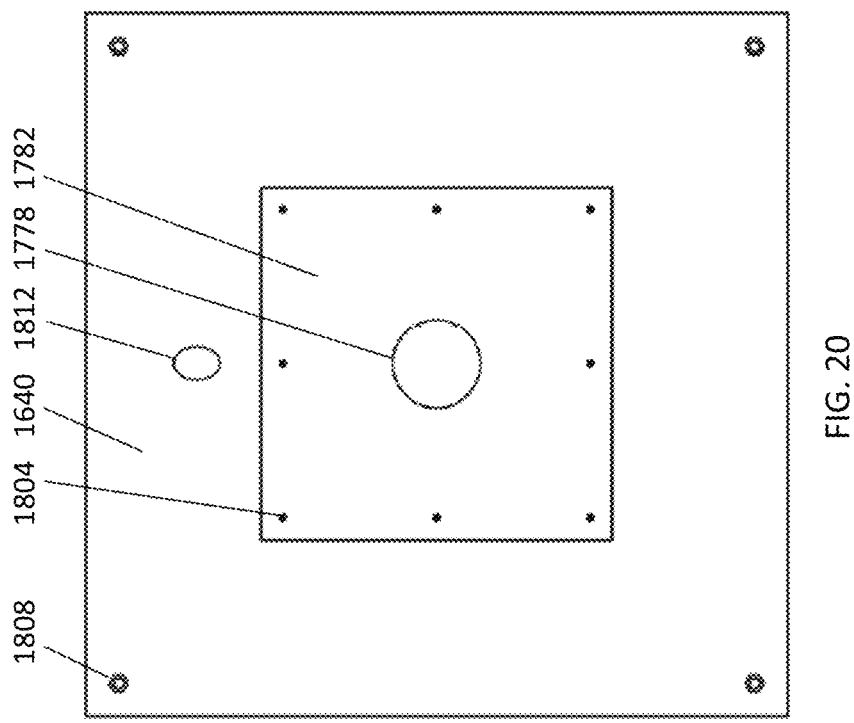
FIG. 20 illustrates a front orthogonal view of ballistic panel with a vent hole above the plywood faceplate, steel plate with connected second steel nipple, according to one embodiment of the present invention.

FIG. 16 shows an injector assembly 1700 connected to a faceplate 1640 which is removably attached to the proximal face 1612 of the ballistic panel 1604 by a set of screws 144 (See FIG. 20). The faceplate 1640 is operable to be three quarter inch birch plywood. The screws 144 are operable to be concrete anchors. Optionally, a support beam 1650 is operable to be cut to the size needed to support the injector assembly 1700 in a substantially horizontal orientation with respect to an opening in the faceplate 1640 (discussed below). The support beam 1650 helps support the injector assembly 1700 as the injector assembly 1700 will be filled with replacement material (not shown here) loaded into the injector assembly 1700 through an opening on the top end of the injector assembly 1700 that is accessible after removing a cap 1704. Once the injector assembly 1700 is at least partially filled with replacement material and the cap 1704 replaced, air pressure is operable to be used to inject the replacement material into the void through the use of inlet valve 1708 and outlet valve 1712.

Figure 17:
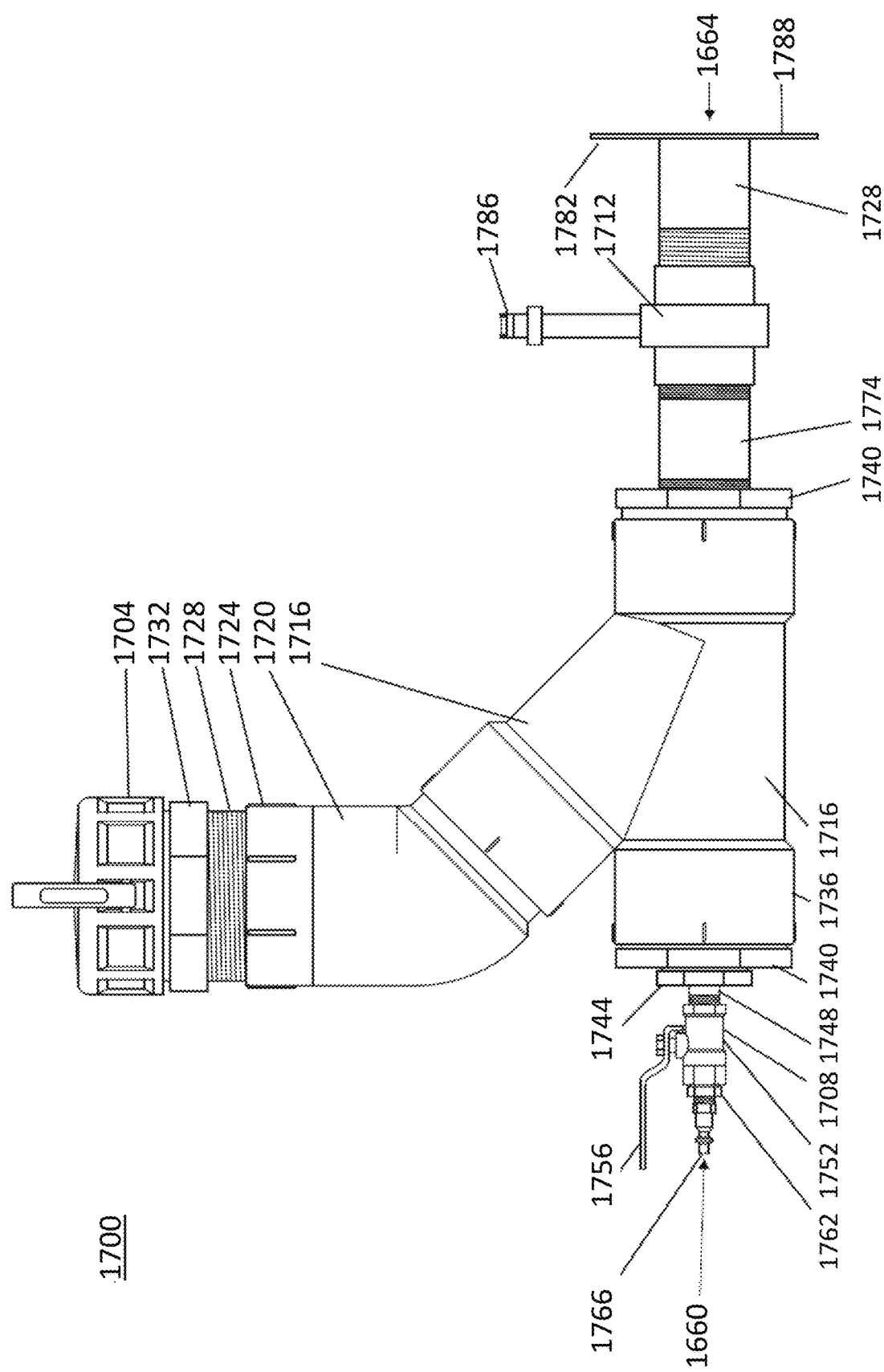
FIG. 17 illustrates a side orthogonal view of an injector assembly, according to one embodiment of the present invention.

FIG. 17 is a side view of the injector assembly 1700. The majority of the interior volume for receipt of replacement material is found within wye 1716 and forty-five degree elbow 1720 (hereinafter elbow 1720). The injector assembly 1700 shown in FIG. 17 uses PVC pipe and a variety of metallic components. One of skill in the art knows that when switching from PVC pipe materials to metal components there is often an adapter. If someone built an entire injector assembly out of brass or some other metal, the injector assembly is operable to lack certain adapters as they would not be needed.

FIG. 17 shows the use of a four inch PVC wye which is schedule 80. The nominal pipe sizes and schedules are part of the North American set of standard sizes for pipes where the pipe size is a nominal diameter and the schedule indicates wall thickness.

FIG. 17 shows an elbow 1720 that is also a four inch PVC schedule 80 component. A four inch PVC adapter 1724 (Schedule 40) attached to the upper end of the elbow 1720 (such as by gluing). A four inch PVC nipple 1728 (Schedule 80) is connected to the adapter 1724. A four inch aluminum coupling adapter 1732 is connected to the lower end of cap 1704. A cap 1704 such as a four inch aluminum dust cap along with the coupling adapter 1732 is operable to be repeatedly removed and replaced from the threaded top end of the coupling adapter 1732. A preferred way to quickly remove the cap 1704 from the injector assembly 1700 is through the use of two-piece cap with a camlock. The lower portion of the cap 1704 is threadedly engaged with the injector assembly 1700 and the top portion of the cap is connected to the bottom portion of the cap with a camlock, which is a fluid fitting known to those of skill in the art for ease of rapidly disconnecting and connecting a fitting. A threaded engagement could be used to disconnect and connect the cap 1704 to the injector assembly 1700 as the injector assembly is repeatedly filled with replacement material, but threads are operable to be fouled during the introduction of replacement material so in one embodiment, a camlock is a better choice. The combination of the cap 1704 and the coupling adapter 1732 is be called the cap assembly 1702.

The horizontal leg of the wye 1716 is shown with a pair of PVC reducer bushings 1740 (Schedule 80) that reduce the diameter from a nominal four inches to a nominal two inches. On the inlet end 1660 of the wye 1716, reducer bushing 1740 is connected to a second reducer bushing 1744 which is a PVC schedule 80 reducer bushing to reduce from a two inch nominal diameter to a one half inch nominal diameter. A one half inch brass nipple 1748 is operable to be threaded into the second reducer bushing 1744. An inlet valve 1708 is operable to be threadedly connected to the brass nipple 1748. The inlet valve 1708 is operable to have a one half inch brass ball valve 1752 with inlet valve handle 1756. The inlet end 1660 of the inlet valve 1708 is operable to have a one half inch to one quarter inch brass bushing 1762. A one quarter inch male coupler 1766 is operable to extend from the bushing 1762 to allow an air hose (not shown) from a compressed air source to be connected to the inlet valve 1708.

Connected to the reducer bushing 1740 on the outlet end 1664 of the wye 1716 is a first steel nipple 1774. A second steel nipple 1778 is connected to a steel plate 1782. The outlet valve 1712 is operable to be connected between steel nipples 1778 and 1774. The outlet valve 1712 connects by a two inch nominal diameter PVC knife valve with outlet valve handle 1786. Those of skill in the art will recognize that there are a number of different valve designs that are used with fluids but will also recognize that some valve designs are more prone to fouling from the sand and grit in the replacement material so certain valve choices will be more reliable and durable than other choices. Many of the viable choices will be types of gate valves such as knife valve, slide valve (sometimes called guillotine valve), or wedge valve. The valve is operable to be made out of brass or some other material and those of skill in the art will be able to make any required transition from PVC piping to brass.

As discussed in greater detail below, the injector assembly 1700 is operable to have a pressure regulator before the inlet valve 1708 so that the air pressure applied to the injector assembly 1700 is operable to be regulated at the inlet of the injector assembly 1700 rather than relying on the operator to properly set the compressed air source to limit output to a particular prescribed pressure limit. For example the pressure regulator is operable to be set at 25 PSIG as that pressure provides a pressure gradient to move the replacement material into the void but does not lead to applying to much pressure to the injector assembly 1700. A pressure gage used without a pressure regulator is operable to be included before the inlet valve to provide an easy to monitor indication to the operator of the pressure that will be applied to the injector assembly 1700 if the inlet valve 1708 is opened. This indication provides a warning to the operator that the compressed air source is operable to be adjusted if the pressure gage is not indicating a pressure within a prescribed range.

Alternatively, the pressure gage is operable to be used after the pressure regulator and before the inlet valve 1708 to offer a confirmation of the proper operation of the pressure regulator.

While injector assemblies are operable to be made of various sizes, an injector assembly 1700 as shown in FIG. 17 is operable to have a total length of approximately twenty-seven inches from the distal face 1788 of steel plate 1782 to the inlet end 1660 of the male coupler 1766. The end to end length is operable to be longer if a pressure regulator or pressure gage is added to the inlet end of the inlet valve 1708.

FIG. 18 is a front view of injector assembly 1700. Several components introduced during the discussion of FIG. 17 are visible from a different perspective in FIG. 18. Steel plate 1782 is shown with the distal face 1788 which would be facing the proximal face 1612 of ballistic panel 1604 (see FIG. 16). The steel plate 1782 would be separated from the proximal face 1612 of ballistic panel 1604 by faceplate 1640 which is sized to extend beyond the void 1608 in all directions. The injector assembly outlet 1790 is aligned with an opening in faceplate 1640 to allow injection of a slurry of replacement material into the void 1608.

Also visible in FIG. 18 are previously introduced components: cap 1704; coupling adapter 1732; nipple 1728; adapter 1724; elbow 1720; wye 1716; outlet valve 1712; and outlet valve handle 1786.

While injector assemblies 1700 is operable to be made of various sizes, an injector assembly 1700 as shown in FIG. 18 is operable to have a total height of approximately twenty inches from the lower end of the steel plate 1782 to the top of cap 1704.

FIG. 19 is a top view of injector assembly 1700. This view shows components previously introduced from another view. Moving from the inlet end 1660 to the outlet end 1664, the visible components are: inlet valve 1708 with inlet valve handle 1756; reducer bushing 1740; cap 1704; elbow 1720 (barely visible in this view); wye 1716; reducer bushing 1740; first steel nipple 1774; outlet valve 1712 with outlet valve handle 1786; second steel nipple 1778; and steel plate 1782.

Sequence of Repair Steps

Figure 21:
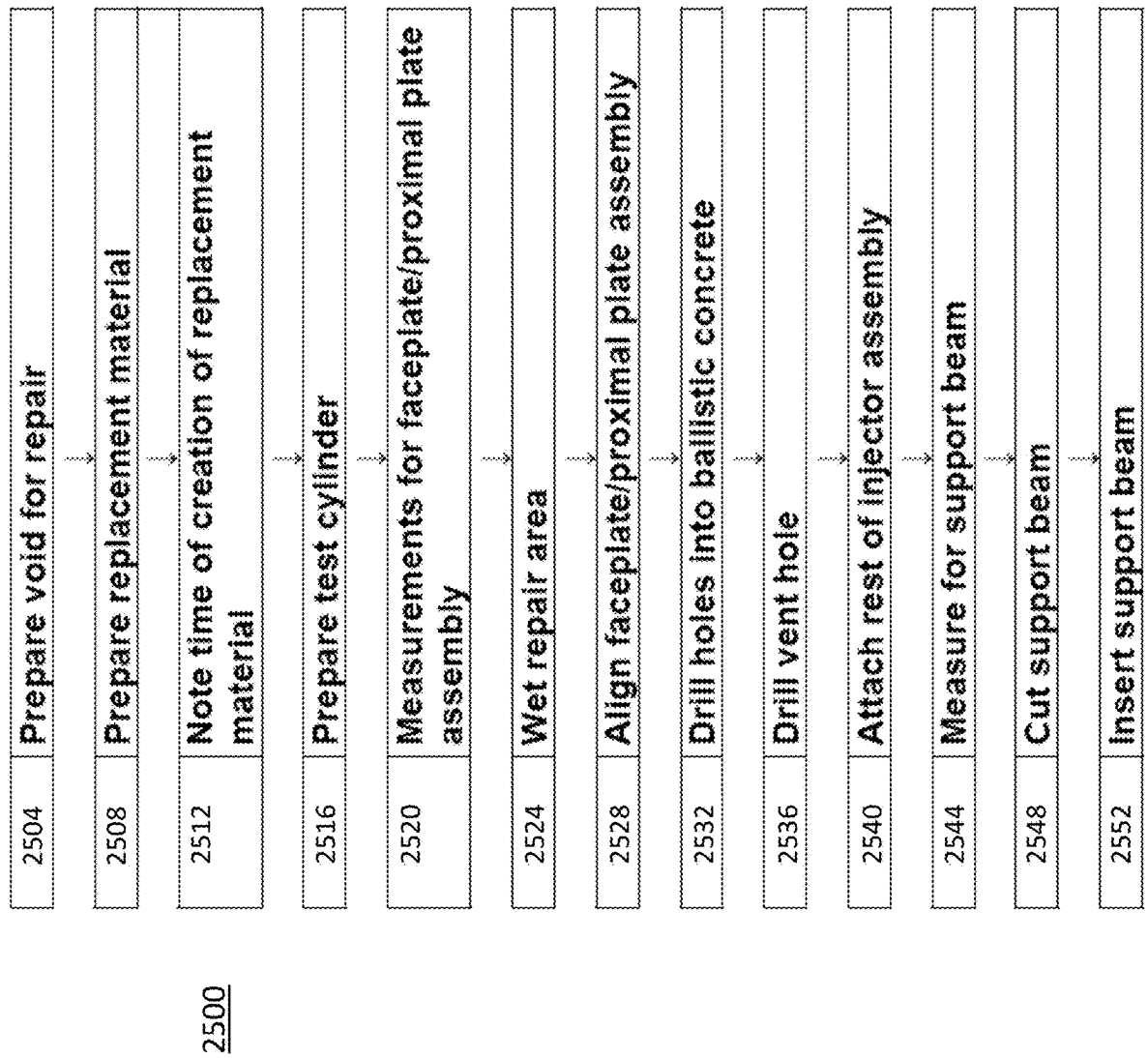
FIG. 21 illustrates a sequence of steps to prepare to deliver replacement material to repair a void, according to one embodiment of the present invention.
Figure 22:
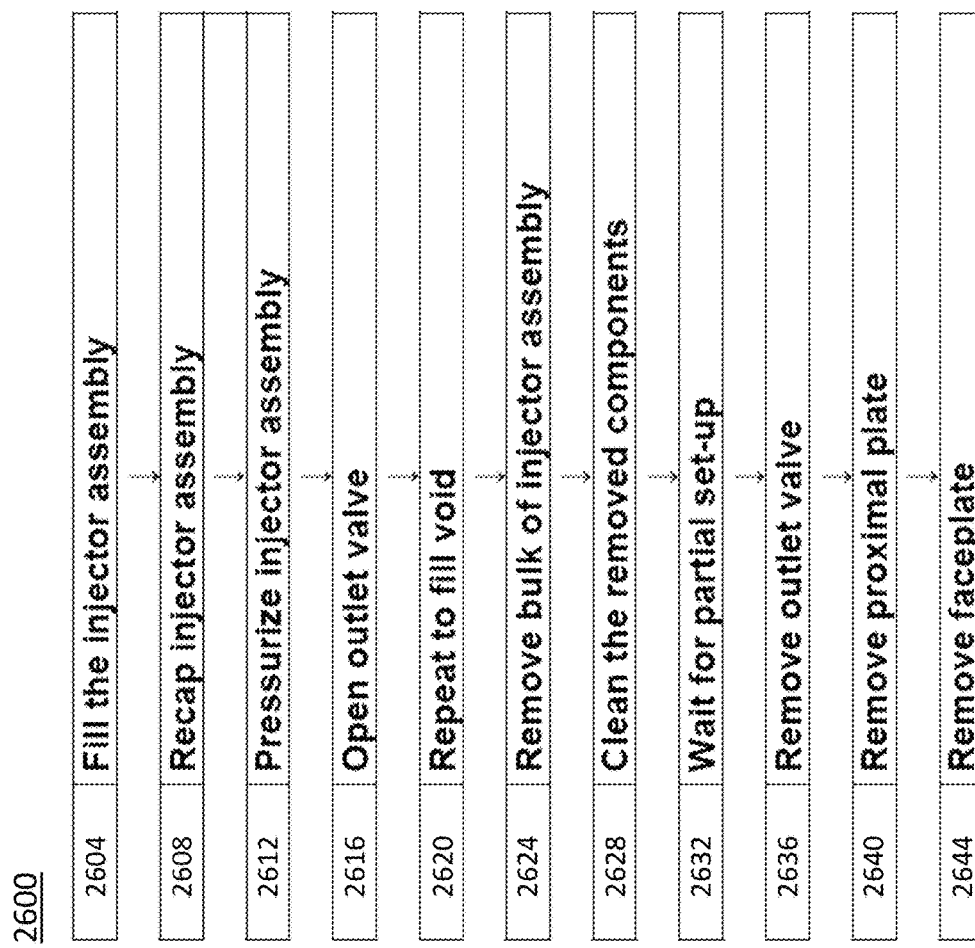
FIG. 22 illustrates a sequence of steps to fill a void, according to one embodiment of the present invention.
Figure 23:
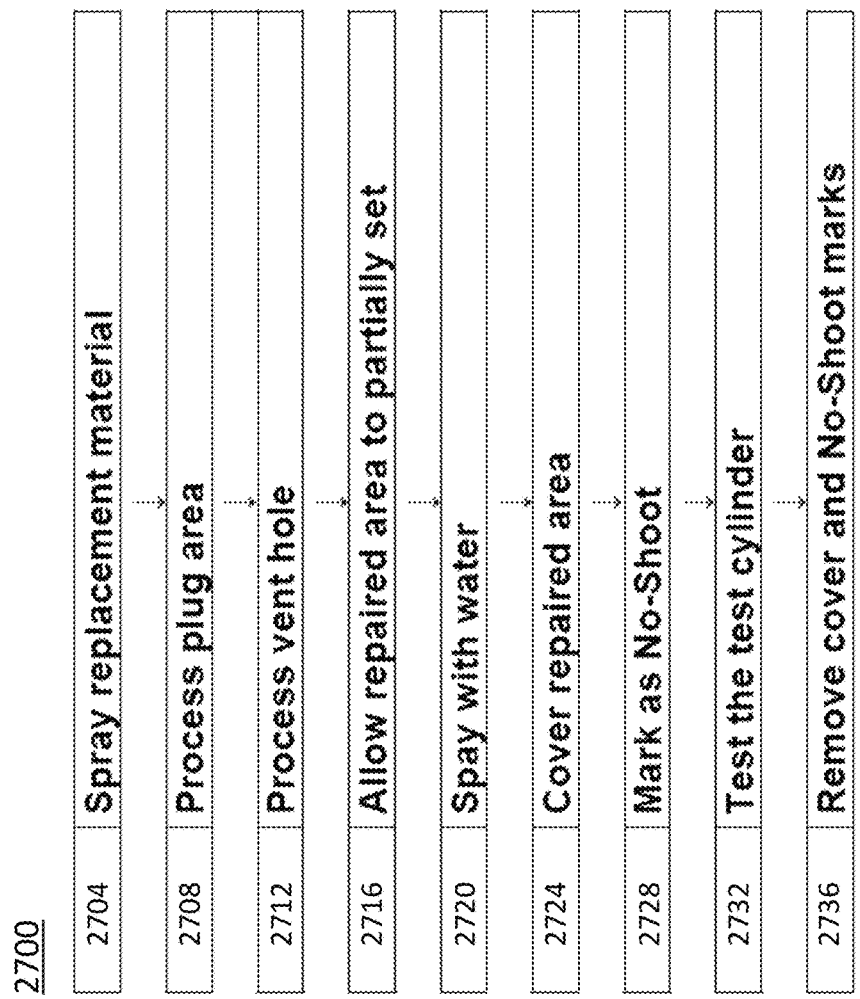
FIG. 23 illustrates a sequence of steps to process the replacement material after removal of the injector assembly, according to one embodiment of the present invention.
Figure 24:
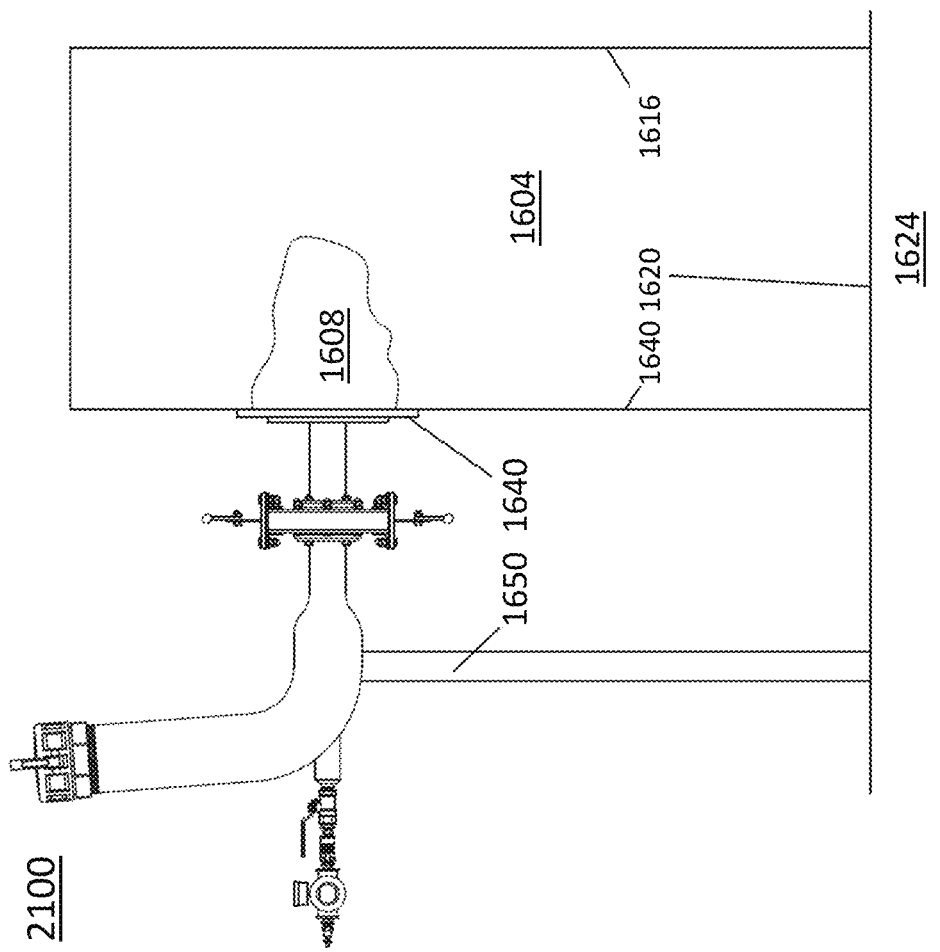
FIG. 24 illustrates a side orthogonal view of an injector assembly positioned to fill a void in a ballistic panel, according to one embodiment of the present invention.

FIG. 21 shows a sequence of steps 2500 to prepare to deliver replacement material to repair a void. FIG. 22 shows a sequence of steps 2600 to fill the void. FIG. 23 shows a sequence of steps 2700 to process the replacement material after removal of the injector assembly 1700. Those of skill in the art will recognize that some of the steps in these three figures are operable to be done in parallel or the sequence of some steps are operable to be reversed if one step does not require prior completion of another step. The order of the steps presented is not to be deemed as limiting unless the relationship between steps is specified.

Prepare to Deliver Replacement Material.

STEP 2504—Prepare the void 1608 for repair. Using rubber gloves (and trowel as appropriate), clean out the void, removing any loose material. Ballistic concrete contains fiber material and there will be fibers extending into the cleaned out void from the ballistic panel. These fibers are operable to be left as is. Fibers remaining in and around the void 1608 will help the replacement material to bind to the existing material in the ballistic panel.

STEP 2508—Prepare the replacement material in accordance with manufacturer's instructions. The process for creating suitable replacement material is operable to include periodically stopping the mixing process to weigh a sample such as a quarter cubic foot sample to check if the sample indicates that the replacement material is within a target range for weight per cubic foot. In another embodiment, additional processing is needed to decrease the weight per cubic foot of the replacement material into a suitable range.

STEP 2512—Once the replacement material is created to manufacturer's specification, note the time, as there is generally a need to use the newly made replacement material within a specified time period. For example, the newly created replacement material is operable to be used within seventy-five minutes of creation.

STEP 2516—Prepare a Test Cylinder. The test cylinder is used to confirm that the ballistic properties of the replacement material are suitable for the intended use. Ballistic properties include depth of penetration, angle of ricochet, fragmentation, delamination/detachment. The test cylinder should be of an appropriate size for the required test process. Fill test cylinder to the top, and level off using the screed tool. Snap the plastic cover on and write the date and time of mix and the location of the repair on the test cylinder. After the test cylinder passes ballistic testing after adequate curing of the replacement material, the repair is successful. For example, in one embodiment some replacement material requires testing fourteen days after filling the test cylinder.

The precise requirements of the testing process varies with the intended use of the ballistic panel 1604. An example of a ballistic test is testing performed utilizing an M-16 A-2 with a twenty inch barrel or equivalent. The round used is a 5.56 caliber 62 grain green tip round. The round shall be fired from a distance of not greater than 82 feet. Place one round into the center of the cylinder. Measure the depth of the penetration by utilizing a measurement probe. The measured penetration depth should be within the range of one inch to five inches for acceptance. The penetration depth is measured to the trailing edge of the projectile as measuring to the leading edge of the projectile is generally not convenient. A measured penetration depth outside of those parameters means that the replacement material is not suitable for the intended use and the repair should be removed and replaced.

Step 2520—Take measurements to prepare to mount the faceplate/proximal plate assembly. The proximal plate is operable to be the steel plate 1782 or another proximal plate such as the aluminum faceplate 1782 discussed below or an analogous plate that connects the outlet of the outlet valve to the opening of the faceplate and the proximal side of the void.

A piece of plywood or other flat surface serves as the faceplate 1640 (FIG. 16). The proximal plate such as steel plate 1782 and second steel nipple 1778 are connected together with the injector assembly outlet 1790 of the steel plate 1782 aligned with an opening in the faceplate 1640. Take measurements of the opening of the void 1608 and mark the proximal face 1612 of the ballistic panel 1604 to help in aligning the injector assembly outlet 1790 with the approximate center of the opening of the void 1608. The marks need to be sufficiently distant from the opening of the void 1608 so that the faceplate 1640 is operable to be placed over the void 1608 without covering the alignment marks.

Optionally, measure and record the length of the void 1608 at the horizontal midline of the void 1608 as this measurement is useful for positioning the vent hole. (discussed below)

Step 2524—Wet the repair area inside and around the void 1608 using a spray bottle with water (not shown). There should be no puddling or ponding of water, but the area should be saturated to the point of being thoroughly damp. The purpose of the wetting is to keep the existing ballistic material surrounding the void 1608 from quickly drawing water out of the replacement material.

Step 2528—Place the faceplate/proximal plate assembly over the void 1608 and align the injector assembly outlet 1790 with the approximate center of the opening of the void 1608 using the alignment marks.

Step 2532—Using a concrete drill and masonry bit, drill holes through the plywood faceplate 1640 into the ballistic concrete around the void 1608. These holes are for use with fasteners to hold the faceplate 1640 to the proximal face 1612 of the ballistic panel 1604. A set of six holes are operable to be adequate depending on the size of the faceplate 1640. The six holes are operable to be arranged with two holes to the right and to the left of the void and one hole above and below the void. Other patterns are operable to be used. As ballistic concrete differs from conventional concrete, in one embodiment it is necessary to modify the normal instructions for pilot holes for fasteners. For example, for a fastener used in conventional concrete that normally uses a one quarter inch pilot hole, it is useful to use a pilot hole made with a three-sixteenth inch drill bit.

Step 2536—Drill the vent hole. Take one half the previously measured length of the void opening and mark a spot above the centerline of the opening in the proximal plate such as second steel nipple 1778. Drill a vent hole using a three-quarter inch masonry bit at approximately a forty five degree angle so that the drill bit breaks through the existing ballistic material into the void 1608 about halfway towards the back of the void 1608. This will provide a vent hole 1812 to allow air to leave the void 1608 as replacement material is injected into the void 1608. While the vent hole 1812 shown in FIG. 20 is drilled through the faceplate 1640, those of skill in the art will recognized that depending on the size and placement of the faceplate 1640, the vent hole 1812 could be drilled above the top edge of the faceplate 1640. While a single vent hole 1812 is operable to be sufficient for many applications, those of skill in the art will recognize that the process is operable to include more than one vent hole, especially for a larger or irregularly shaped void. Those of skill in the art will recognize that some modification on the starting point and angle of the vent hole is appropriate for an unusually shaped void.

Alternatively, the vent hole is placed an inch or so above the top of the proximal plate such as steel plate 1782 and the vent hole is drilled at a horizontal or slight downward angle to intersect with the void. As the operation of the injector assembly is apt to drive replacement material to the back of the void 1608, the void 1608 will fill from the back to the front. In one embodiment, a small gap occurs along the front wall of the void 1608 as material is operable to fill the vent hole 1812 before the top portion of the front of the void 1608 is filled. This small gap is operable to be filled with troweled material during the surface clean up after removing the faceplate 1640.

FIG. 20 shows the status after the completion of the preceding step. Visible in FIG. 20 are the plywood faceplate 1640 and the steel plate 1782 with connected second steel nipple 1778. A set of eight fasteners 1804 connecting steel plate 1782 to faceplate 1640 is visible in FIG. 20. The fasteners 1804 are operable to be sheetrock screws of appropriate length for the choice of faceplate 1640 such as three quarters inch birch plywood. Should a fastener protrude from the distal face of the faceplate 1640, the tip of the fastener is operable to be broken off or otherwise removed. Minor surface imperfections caused by the fastener 1804 extending beyond the distal face of the faceplate 1640 are operable to be corrected at the end when other imperfections are addressed.

Two of the fasteners 1808 which hold the faceplate 1640 to the proximal face 1612 of ballistic panel 1604 are visible. Also visible is the proximal opening of the vent hole 1812.

Note an analogous view of this step using injector assembly 1700 (discussed below) would show proximal plate 1280 and the holes for connecting the outlet pipe 1778 to the outlet valve 1712.

Step 2540—Screw the rest of the injector assembly to the second steel nipple 1778. When done, the cap 1704 should be the highest point of the injector assembly 1700 so that a slurry of replacement material is poured into the injector assembly 1700 with the cap 1704 removed.

Step 2544—Measure for the Support Beam. Measure the distance between the location for the support beam 1736 (FIG. 16) on the inlet end 1660 of wye 1716 and the ground 1624.

Step 2548—Cut a Support Beam. Cut a two by four or other suitable board to form a support beam 1650 with the length measured in the preceding step. One of skill in the art will recognize that a jack stand or jack is operable to be used in lieu of a support beam.

Step 2552—Insert the support beam 1650 to support the inlet end 1660 of the injector assembly 1700 as the injector assembly 1700 will become significantly heavier when filled with replacement material. One of skill in the art will recognize that a small injector assembly 1700 that does not weigh an undue amount relative to the stiffness and length of the injector assembly is operated without a support beam.

Filling the Void

FIG. 22 shows a sequence of steps 2600 for using a mounted injector assembly 1700 to deliver replacement material to a void 1608.

Step 2604—Fill the Injector Assembly. Close the inlet valve 1708 and outlet valve 1712. Remove the cap 1704 (via camlock, threaded engagement or whatever is used to remove and replace the cap to hold it against pressure). Use a scoop or other suitable tool to load replacement material into the uncapped injector assembly 1700. Depending on the height of the opening to the injector assembly 1700, in one embodiment of the present invention it is necessary to use a step ladder or other lifting device. The lifting device is operable to be a forklift platform or a scissor lift, or other device to allow access to an injector assembly a distance above the ground.

Step 2608—Recap the Injector Assembly. Use a spray bottle to spray water to remove replacement material from any location that would interfere with closing the cap 1704. This is frequently necessary when using a cap that is removed and replaced through treaded engagement.

Step 2612—Pressurize the Injector Assembly. Attach an air hose to male coupler 1766 at the inlet end 1660 of the injector assembly 1700. The air hose should be connected to a source of compressed air such as a portable air compressor (not shown). One of skill in the art will appreciate that an oil-free compressor would be preferred in order to avoid injecting oil into the replacement material. The setting for the air compressor output will be a function of the air injector assembly and is limited by the type of replacement material used as some replacement material does not tolerate being subjected to high pressures as they alter the properties of the replacement material and divergence in ballistic properties relative to the replacement material in the test cylinder. A suitable for air compressor setting for an injector assembly made with schedule 80 PVC components is 25 psi (gage pressure). The pressure should be set before turning on the compressor.

As referenced above, the injector assembly is operable to include a pressure regulator which will limit the pressure seen by the inlet valve 1708 to a prescribed value such as 25 PSIG. A pressure gage is operable to be placed inline before the inlet valve 1708 to allow the operator to ensure that the pressure regulation performed at the air compressor or at the pressure regulator is working to limit the pressure to within a prescribed range or limit. Open the inlet valve 1708 to allow air pressure to pressurize the injector assembly 1700.

Step 2616—Open the Outlet Valve. Opening of the outlet valve 1712 will cause the pressurized replacement material to move to through the outlet valve 1712 through the second steel nipple 1778 and out the injector assembly outlet 1790 on the distal face of the faceplate 1640 into the lower pressure of the vented void 1608. The void 1608 does not become pressurized as the vent hole 1812 allows air to leave the void 1608. In one embodiment of the present invention, it is helpful to close the inlet valve 1708 to allow the portable air compressor to build up pressure and then open the inlet valve 1708 to move more replacement material. Once the replacement material has been substantially removed from the injector assembly 1700, there will be a perceptible change in sound or vibration of the injector assembly 1700 as compressed air travels through the injector assembly 1700.

Step 2620—Repeat Process to Completely Fill the Void. Unless replacement material is seen leaving the upper opening in the vent hole 1812, more replacement material is needed. Repeat steps 2604, 2608, 2612, and 2616 until replacement material leaves the upper opening in the vent hole 1812. Continue to use a spray bottle to spray water to remove replacement material from any location that would interfere with closing the cap 1704.

Step 2624—Remove the Bulk of the Injector Assembly. After replacement material seeps out the top of the vent hole 1812, close the inlet valve 1708 and then the outlet valve 1712. Remove the air compressor hose from the male coupler 1766 at the inlet end 1760 of the inlet valve 1708. Rotate the injector assembly 1700 to unthread the outlet valve 1712 from the first steel nipple 1774 to leave the outlet valve 1712 on the second steel nipple 1778 that is attached to the steel plate 1782 (proximal plate).

Step 2628—Clean the Removed Portion of the Injector Assembly. Clean the injector assembly components thoroughly before the replacement material hardens.

Step 2632—Wait for the Replacement Material in the Void to Partially Set-Up. In one embodiment of the present invention, this takes in the range of about 35 to about 40 minutes depending on the weather conditions, the replacement material used, and other factors. The process of setting up is operable to be observed by looking at replacement material present on the inlet side of the outlet valve 1712.

Step 2636—Remove the Outlet Valve. Once the replacement material in the outlet valve 1712 has set up sufficiently, unthread the outlet valve 1712 from the second steel nipple 1778. Clean the outlet valve 1712 thoroughly.

Step 2640—Remove the Proximal Plate. Remove the fasteners 1804 that hold the proximal plate such as steel plate 1782 to the faceplate 1640. A cross-tip bit is operable to be used depending on the fastener used. After the proximal plate is removed, replacement material will be visible through a corresponding 2 inch diameter hole in the faceplace 1640. Once the replacement material visible in the hole in the faceplate 1640 is sufficiently set up, then proceed to the next step.

Step 2644—Remove the Faceplate. Once the replacement material is set-up, remove the fasteners 1808 holding the faceplate 1640 to the proximal face 1612 of the ballistic panel 1604.

Post-Processing the Replacement Material

FIG. 23 shows a sequence of steps 2700 to process the replacement material after removal of the injector assembly 1700.

Step 2704—Spray the Replacement Material with Water. Spray the replacement material visible with the faceplate 1640 removed to keep the area moist so it is able to be worked.

Step 2708—Process the Plug Area. The process will leave a plug of approximately two inches of diameter that extends from the proximal face 1612 of the ballistic panel 1604 as this material was extending through the opening in the faceplate 1640 and at least partially filling the second steel nipple 1778. Knock off the protruding plug and work the surface of the replacement material over the entire surface of the filled void to smooth the surface. Any marks from fasteners 1804 that extend beyond the faceplate 1640 is able to be addressed in this step. In one embodiment, sprayed water and troweling additional replacement material is required.

Step 2712—Process the Vent Hole. Likewise, remove any protruding material from the vent hole 1812 and work the area to provide a smooth surface. Any holes from the fasteners 1808 in the ballistic panel 1604 are filled with replacement material at this time.

Step 2716—Let the Repaired Area Set. Let the repaired surfaces set for several minutes. Inspect to ensure that the surface of the repaired area has set sufficiently to proceed to the next step.

Step 2720—Spray the Void and Vent Hole with Water. Soak the areas to saturation.

Step 2724—Cover the Repaired Area. Place plastic film over the repaired area and seal with duct tape to hold in the moisture on the repairs. Expect to see condensation on ballistic panel side of the plastic film.

Step 2728—Mark the Area with a No-Shoot Indicator. For example, one might use bright red tape or other warning tape to mark the perimeter of the area to indicate that the repaired area should not be shot and should not be behind a target that is used. In one embodiment, a date is written on the tape along with a unique identifier for the test cylinder in case there are many different repairs and different test cylinders.

Step 2732—Test the Test Cylinder. After the replacement material in the test cylinder has cured sufficiently for testing, test the test cylinder to ensure that replacement material meets the ballistic criteria.

Step 2736—Remove the Plastic and Warning Tape. After the test of the test cylinder confirms that the replacement material meets the ballistic criteria, the plastic film and all tape is operable to be removed and this portion of the ballistic panel is used without restriction.

Second Example of an Injector Assembly.

Figure 27:
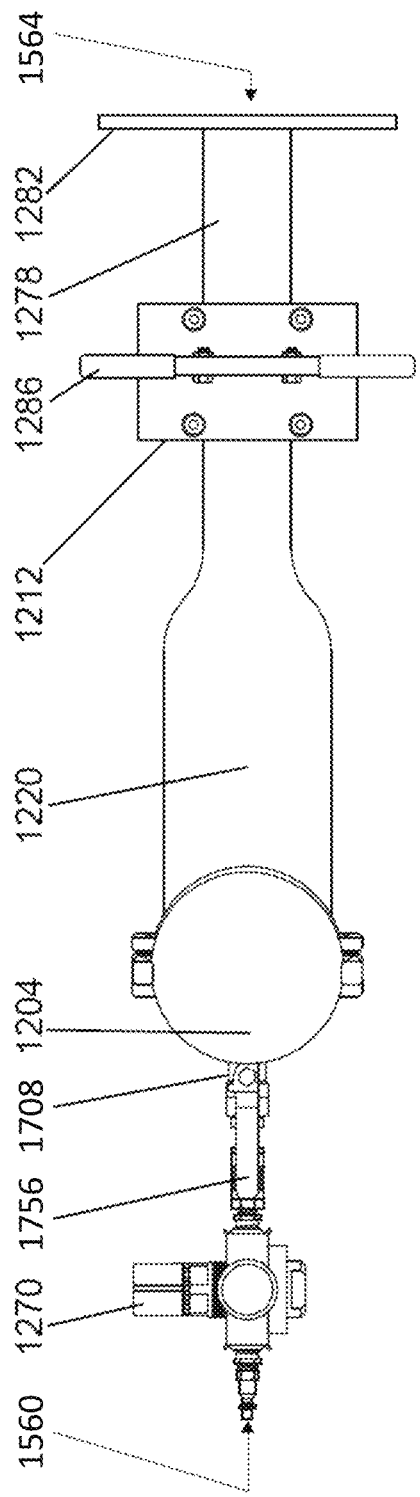
FIG. 27 illustrates a top orthogonal view of an injector assembly, according to one embodiment of the present invention.

A second injector assembly 2100 is shown in FIG. 27 which is a side view of an injector assembly 2100 connected to a ballistic panel 1604 with a void 1608. More specifically, FIG. 27 shows a ballistic panel 1604 with a base 1620 on the ground 1624 or some other support surface. A proximal face 1612 of the ballistic panel 1604 has a void 1608 extending from the proximal face 1612 a portion of the distance to the distal face 1616. FIG. 27 shows an injector assembly 2100 connected to a faceplate 1640 which is removably attached to the proximal face 1612 of the ballistic panel 1604 by a set of fasteners such as concrete anchors. The faceplate 1640 is operable to be three quarter inch birch plywood. Optionally, a support beam 1650 is operable to be cut to the size needed to support the injector assembly 2100 in a substantially horizontal orientation with respect to an opening in the faceplate 1640 (discussed below). The support beam 1650 helps support the injector assembly 2100 as the injector assembly 2100 will be filled with replacement material (not shown here) loaded into the injector assembly 2100 through an opening on the top end of the injector assembly 2100 that is accessible after removing a cap 1204. Once the injector assembly 2100 is at least partially filled with replacement material and the cap 1204 replaced, air pressure is operable to be used to inject the replacement material into the void through the use of inlet valve 1708 and outlet valve 1212. (Valves shown in FIG. 25)

Figure 25:
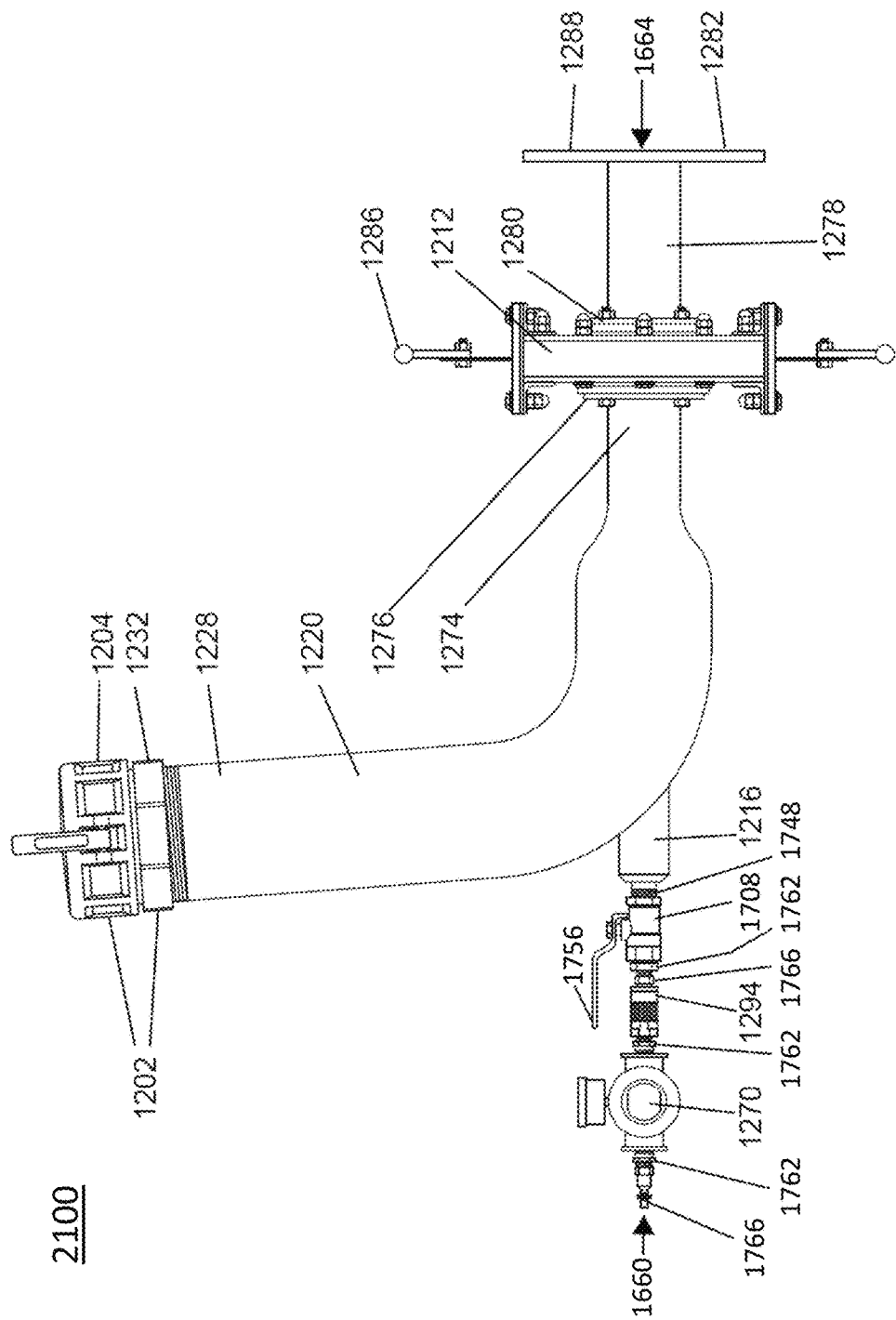
FIG. 25 illustrates a side orthogonal view of an injector, according to one embodiment of the present invention.

FIG. 25 is a side view of the injector assembly 2100. The majority of the interior volume for receipt of replacement material is found within injector body 1220. The injector assembly 2100 shown in FIG. 25 uses an injector body 1220 that is a manufactured nominal four inch aluminum pipe assembly that reduces to a nominal two inch pipe and has an inlet protrusion 1216. The three ends of the injector body 1220 are: the threaded top 1228; inlet protrusion 1216; and outlet end 1274. Thus, injector body 1220 replaces the wye 1716 and elbow 1720 from FIG. 25. Injector body 1220 is operable to be made from a material such as schedule 40 aluminum pipe. Those of skill in the art will recognize that other materials are operable to be used based on design choice for pressure used to pressurize the injector assembly 2100, desire to hold down the weight of the injector assembly 2100, desire to have a durable assembly given the abrasive qualities of the replacement materials, and other design criteria.

Both injector assembly 1700 and injector assembly 2100 have a cap 1704 or 1204 located above a line running between the inlet valve 1708 and the outlet valve 1212. By having the opening in the top of the injector assembly some distance above the valves, the upper portion of the injector assembly serves as a reservoir for replacement material. As indicated in FIG. 25 the teachings of the present disclosure do not require that the upper portion of the injector assembly 2100 be oriented in a pure vertical orientation. Filling the injector assembly 2100 with a quantity of replacement material works well as long as the upper portion has a substantial vertical orientation. In many instances this is closer to pure vertical than 45 degrees but one could make an injector assembly with an upper portion oriented at 30 degrees or some other angle less than 45 degrees as long as gravity helps deliver replacement material to the portion of the injector assembly 2100 between the inlet valve 1708 and the outlet valve 1212.

A cap 1204 such as a four inch aluminum dust cap is operable to be repeatedly removed and replaced via a camlock, threaded engagement, or other design choice suitable for repetitive use in the field and the desire to pressurize the injector assembly 2100. The combination of the cap 1204 and the coupling adapter 1232 is operable to be called the cap assembly 1202.

The outlet end of the injector body 1220 reduces to a two inch nominal diameter. The inlet end 1660 of the inlet protrusion 1216 has a one half inch nominal diameter threaded opening which is operable to be engaged by a brass nipple 1748. An inlet valve 1708 is operable to be threadedly connected to the brass nipple 1748. The inlet valve 1708 is operable to be a one half inch brass ball valve with inlet valve handle 1756. The inlet end 1660 of the inlet valve 1708 is operable to have a one half inch to one quarter inch brass bushing 1762. A one quarter inch male coupler 1766 extends from the bushing 1762 to connect an air coupler 1294. A one half to one quarter inch bushing 1762 connects the inlet end of the air coupler 1294 to a pressure regulator 1270. Another one half to one quarter inch bushing 1762 connects the pressure regulator 1270 to a one quarter inch male coupler 1766. An air hose from a compressed air source (not shown) is operable to be connected to the one quarter inch male coupler 1766 on the inlet end 1660 of the injector assembly 2100.

Those of skill in the art will recognize that other components with larger or smaller interior diameters are operable to be used to provide compressed air to the inlet protrusion 1216 without deviating from the teachings of the present disclosure.

Connected to the outlet end 1274 of the injector body 1220 is an outlet valve 1212 with actuator 1286. The outlet end 1274 of the injector body 1220 are operable to have a distal plate 1276 that are operable to be a four inch square plate that is welded to surround the aluminum pipe to allow the outlet end 1274 of the injector body 1220 to be bolted to the inlet end 1660 of the outlet valve 1212.

Note that a push-pull actuator with two handles on either side of the outlet valve 1212 is advantageous for use as the actuator 1286. Placement of the push-pull actuator such that the outlet valve 1212 is closed when the actuator 1286 is in the up position allows downward pressure against the pressurized replacement material which is the more difficult change in valve position to be done with the least risk of dislodging the injector assembly from the support beam 150. Horizontal orientation for the push-pull actuator is operable to be implemented if additional caution is used to avoid pushing the injector assembly 2100 off the support beam 1650. An injector assembly/support beam interaction that would keep the injector assembly 2100 supported even after some horizontal movement of the inlet end 1660 of the injector assembly 2100 is acceptable. For a smaller injector assembly that is not supported by a support beam, the outlet valve 1212 is operable to be oriented so that the actuator 1286 is down when the valve is closed so that the force to move the actuator is not added to the weight of the filled injector assembly 2100 when the actuator 1286 is moved to open the pressurized injector assembly 2100.

Those of skill in the art will recognize that there are a number of different valve designs that are used with fluids but will also recognize that some valve designs are more prone to fouling from the sand and grit in the replacement material, so certain valve choices will be more reliable and durable than other choices. Many of the viable choices will be types of gate valves such as knife valve, slide valve (sometimes called guillotine valve), or wedge valve.

Connected to the outlet end 1664 of the outlet valve 1212 is the outlet pipe 1278 which is operable to be a two inch schedule 40 aluminum pipe welded to an aluminum faceplate 1282. The outlet pipe 1278 has a proximal plate 1280 that is operable to be a four inch square plate that is welded to surround the aluminum pipe to allow the outlet pipe 1278 to be bolted to the outlet end 1664 of the outlet valve 1212.

While injector assemblies 2100 is made of various sizes, an injector assembly 2100 as shown in FIG. 25 is operable to have a total length of approximately three feet from the from the distal face 1288 of aluminum faceplate 1282 to the inlet end 160 of the male coupler 1766 on the inlet end 1660 of the pressure regulator 1270. The length is operable to be longer if an optional pressure gage was included between the pressure regulator 1270 and the inlet valve 1708.

Figure 26:
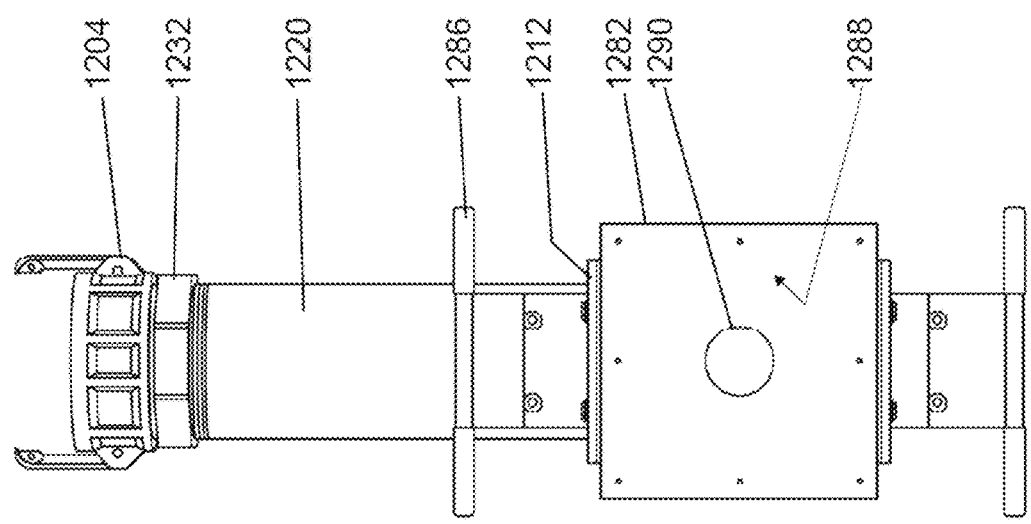
FIG. 26 illustrates a front orthogonal view of an injector assembly, according to one embodiment of the present invention.

FIG. 26 is a front view of injector assembly 2100. Several components introduced during the discussion of FIG. 25 are visible from a different perspective in FIG. 26. Aluminum faceplate 1282 is shown with the distal face 1288 which would be facing the proximal face 1612 of ballistic panel 1604 (see FIG. 27). The aluminum faceplate 1282 would be separated from the proximal face 1612 of ballistic panel 1604 by the faceplate 1640 which is sized to extend beyond the void 1608 in all directions. The injector assembly outlet 1290 is aligned with an opening in faceplate 140 to allow injection of a slurry of replacement material into the void 1608.

Also visible in FIG. 26 are previously introduced components: cap 1204, coupling adapter 1232; injector body 1220, outlet valve 1212; and actuator 1286.

While injector assemblies are operable to be various sizes, an injector assembly 2100 as shown in FIG. 26 is operable to have a total height of approximately twenty inches from the lower actuator 1286 to the top of the cap 1204 (excluding the camlock).

FIG. 27 is a top view of injector assembly 2100. This view shows components previously introduced from other views. Moving from the inlet end 1660 to the outlet end 1664 the major visible components are: pressure regulator 1270, inlet valve 1708 with inlet valve handle 1756; cap 1204 with camlocks, injector body 1220, outlet valve 1212 with actuator 1286, outlet pipe 1278 with aluminum faceplate 1282.

Alternative Materials.

While examples provided above have named materials that are operable to be used for specific components such as aluminum, steel, plywood, brass, and PVC, those of skill in the art will recognize that other materials are operable to be substituted. The decision to change material generally impacts the weight of the injector assembly or the cost of the injector assembly but those of skill in the art will understand those impacts and make decisions based on particular needs.

Scaling

The overall volume of replacement material that is loaded into a injector assembly 1700 or 2100 before being driven into the void 1608 is operable to be varied by altering the diameters and lengths of components between the outlet of the inlet valve 1708 and the inlet out the outlet valve (1712 or 1212). Changes to increase the volume will increase the weight of an empty injector assembly and the weight of a filled injector assembly but will decrease the need for many cycles of loading with replacement material to fill a large void 1608.

Omission of Pressurization of Injector Assembly.

One of skill in the art will recognize that for certain uses of an injector assembly, it is sufficient to fill the injector assembly with replacement material and open the outlet valve before opening the inlet valve so that there is not an intermediate act of pressurizing the injector assembly before opening the outlet valve. Such a deviation from the process set forth in this disclosure should be viewed as an alternative covered by the scope of this disclosure.

Use of Pressurized Gas Other than Air.

While compressed air is a well-known item for use in construction sites including remote sites as air compressors are made with a variety of fuel options and tanks of compressed air are easy to carry to a remote site, the process does not require that the compressed gas be air. Other gases are operable to be used providing that they are compatible with the replacement material (won't alter the replacement material) and safe for use around those performing the procedure.

Alignment of Inlet and Outlet.

While the examples of injector assemblies 1700 and 2100 show an inlet approximately horizontal with the outlet, this is not a requirement. One of skill in the art will appreciate that a pressurized gas inlet could be placed out of horizontal alignment with the outlet. For example, an injector assembly inlet could be placed above the outlet. The inlet could even be placed above the removable cap.

If the inlet to the injector assembly was placed relatively high relative to the outlet valve, one could potentially forego the inlet valve 1708 and simply use a valve at the source of the compressed gas (such as a tank of compressed gas) or the controls for a compressor to turn on and off the provision of compressed gas through a pressure regulator.

Preparations of Bullet Absorbing Component

In a non-limiting formulation, the bullet absorbing components are prepared by mixing cement, fine aggregate, and water to form a grout. The grout is operable to be obtained from a ready mix concrete supplier.

Next an air entrainment additive is mixed into the grout. Then calcium phosphate, aluminum hydroxide and fiber are added. After mixing for a number of minutes the density is checked. As noted below, the addition of the calcium phosphate and aluminum hydroxide are operable to be omitted if preventing lead leaching is not a concern.

If the mixture is above the target density range, additional mixing adds additional entrained air bubbles to reduce the density. The process of measuring density and providing additional mixing is repeated until the measured density is within a target range of the optimal density.

When the density is deemed appropriate, the ballistic concrete is pumped into the void to fill it. Typically, the ballistic concrete is allowed to harden and cure for at least 4 weeks. Batching, mixing, transporting, testing, curing and placing the ballistic concrete would preferably meet the standards described in the Army Corp. of Engineers guidelines "Technical Specification for Shock Absorbing Concrete (SACON)," which have been listed above.

The calcium phosphate is operable to be granulated bone meal, bone ash, or precipitated calcium phosphate. In one non-limiting embodiment, it is technical grade or higher. The aluminum phosphate is operable to be metakaolinite or precipitated aluminum hydroxide. In one non-limiting embodiment, it is technical grade or higher. Color pigments are optionally added to create the appearance rocks, trees, buildings, etc. Suppliers of concrete pigments include Scofield Co. (Douglasville, Ga.) or Lambert Corp. (Orlando, Fla.). Thus, the present disclosure teaches the option of pigmented bullet absorbing components.

The present disclosure teaches the creation of components made from wet ballistic concrete prepared without an addition of preformed foam.

One of skill in the art of ballistic concrete manufacturing would recognize that these materials are prepared on industrial scale and accordingly quantities and proportions are operable to vary in accordance with industry norms. In addition, one skilled in ballistic concrete manufacturing would recognize that materials are operable to be measured by volume or by timed delivery from a storage container.

The following examples further illustrate the various teachings of the disclosure and are not intended to limit the scope of the claimed invention.

The bullet absorbing structural component made with ballistic concrete comprises:
   (a) about 1 part by mass cement, such as Portland Cement;
   (b) about 0.5 to 1.5 part by mass fine aggregate;
   (c) about 0.005 to 0.15 part by mass fiber;
   (d) about 0.005 to 0.05 part by mass calcium phosphate;
   (e) about 0.005 to 0.05 part by mass aluminum hydroxide; and
   (f) about 0.0005 to 0.05 part by mass air entrainment additive, such that the bullet absorbing component is capable of passing the penetration test described above.

In one non-limiting embodiment, the bullet absorbing component comprises
   (a) about 0.8 to 1.2 part by mass fine aggregate;
   (b) about 0.008 to 0.012 part by mass fiber;
   (c) about 0.008 to 0.012 part by mass calcium phosphate;
   (d) about 0.008 to 0.012 part by mass aluminum hydroxide; and
   (e) about 0.0008 to 0.002 part by mass air entrainment additive.

In another non-limiting embodiment, the bullet absorbing component comprises
   (a) about 0.9 to 1.1 part by mass fine aggregate;
   (b) about 0.009 to 0.011 part by mass fiber;
   (c) about 0.009 to 0.011 part by mass calcium phosphate;
   (d) about 0.009 to 0.011 part by mass aluminum hydroxide; and
   (e) about 0.0009 to 0.0015 part by mass air entrainment additive.

The mixture comprising the cement, the fine aggregate, the fiber; the calcium phosphate, the aluminum hydroxide, and the air entrainment additive is operable to be mixed until the mixture has a density within a range of 88 to 94 pounds per cubic foot. The teachings of the present disclosure is operable to be used to create a ballistic concrete without the use of the calcium phosphate and aluminum hydroxide if lead-leaching control is not an objective.

In one non-limiting embodiment, the fiber is a polyolefin fiber, which in one embodiment is fibrillated. In another embodiment the air entrainment additive is DARAFILL Dry.

The bullet absorbing component is operable to have air bubbles resulting from the air entrainment additive that are less than about 0.04 inches (1 mm) in diameter. Alternatively, the bullet absorbing component is operable to have air bubbles resulting from the air entrainment additive that are greater than 0.0004 inches (10 microns) in diameter. In another non-limiting embodiment, the bullet absorbing component has air bubbles resulting from the air entrainment additive that are less than about 0.04 inches (1 mm) in diameter and greater than 0.0004 inches (10 microns) in diameter.

The training with the live ammunition is operable to be performed with at least one of the following types of weapons:
   0.22 caliber weapon, 0.38 caliber weapon, 0.40 caliber weapon, 0.45 caliber weapon, 5.56 mm weapon, 6.8 mm weapon, 7.62 mm weapon, 9 mm weapon or a grenade or other fragmentation device.

Preparation of Components for Use Live Fire Ammunition

The ingredients for making the ballistic concrete components are as follows:

Amount per unit ballistic concrete in Ingredient English System Metric System Cement 972 pounds (441 kilograms); Fine Aggregate (SSD) 972 pounds (441 kilograms); Water 466 pounds (211 kilograms); Calcium Phosphate 9.72 pounds (4.41 kilograms); Aluminum Hydroxide 9.72 pounds (4.41 kilograms); DARAFILL Dry 11.4 ounces (323 grams); GRACE FIBERS. 14.8 pounds (6.71 kilograms).

Figure 28:
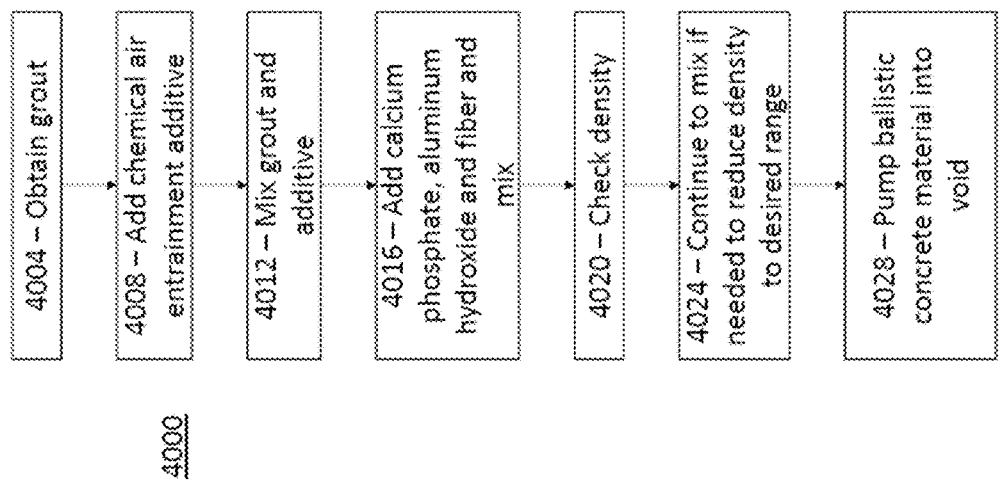
FIG. 28 summarizes the process for making ballistic concrete made with chemical air entrainment additive rather than foam, according to one embodiment of the present invention.

FIG. 28 summarizes a process 4000 for making bullet absorbing components. As noted below, some of the steps are performed in slightly different orders but for sake of clarity, it is useful to introduce one sequence of steps for discussion rather than muddy the water with premature digressions on alternatives. The steps are summarized as follows:

Step 4004—Obtain a grout of cement, such as Portland cement, fine aggregate, and water in a mixer in accordance with ACI standard 304R and/or ASTM standard C 94. The act of obtaining includes creating the grout or obtaining the grout from some third party.

Step 4008—Add a chemical air entrainment additive (DARAFILL Dry, W. R. Grace & Co.).

Step 4012—Following the addition of the additive, mix the grout for five minutes. Mixing is operable to be achieved by rotating the drum on a cement mixer truck.

Step 4016—Add Calcium Phosphate, Aluminum Hydroxide, and fiber. One suitable fiber is GRACE FIBERS. Mix for an additional ten minutes.

Step 4020—Check density such as by weighing using a ¼ cubic foot testing pot. Target weight is 22.7 pounds (approximately 91 pounds per cubic foot) as the actual target is 91 pounds per cubic foot+−. 3 pounds per cubic foot.

Step 4024—Continue to mix if needed to reduce density to desired range. Additional mixing lowers the density. Continue to mix, checking frequently, until target density is achieved. The target wet density material when poured into components is 1458 kg/m.sup.3 (91-pounds per cubic foot+3 pounds per cubic foot).

Step 4028—Pump ballistic concrete material into void. As with traditional SACON type ballistic concrete, vibration such as is operable to be used with standard structural concrete is to be avoided to minimize destruction of air bubbles.

Changes in Order and Additives.

Note that the step of adding the calcium phosphate and aluminum hydroxide could be done at the same time as adding the chemical air entrainment additive.

Note further, that as the calcium phosphate and aluminum hydroxide are added to reduce lead-leaching from ballistic concrete blocks which have absorbed ammunition with lead components; these chemicals are not central to the ballistic properties of the ballistic concrete. Thus, in applications where the need to reduce lead-leaching is not important (whether because of local rules, post use disposal plans, or a movement to ammunition with minimal or no lead), one is able to make ballistic concrete in accordance with the teachings of the present disclosure without addition of calcium phosphate or aluminum hydroxide.

The fiber is operable to be added at the same time as the chemical air entrainment additive (and possibly the calcium phosphate and aluminum hydroxide) as this process does not require achieving a pre-fiber density before adding the fiber. When the process is modified so that there is not a need to add material after five minutes of mixing, simply mix for fifteen minutes before checking density. In some embodiments, additional mixing is required to reduce density.

It is to be understood that, while the teachings of the disclosure have been described in conjunction with the detailed description, thereof, the foregoing description is intended to illustrate and not limit the scope of the claimed invention. Other aspects, advantages, and modifications of the teachings of the disclosure are within the scope of the claims set forth below. All publications, patents, and patent applications cited in this specification are herein incorporated by reference as if each individual publication or patent application was specifically and individually indicated to be incorporated by reference.

One of skill in the art will recognize that some of the alternative implementations set forth above are not universally mutually exclusive and that in some cases additional implementations are able to be created that employ aspects of two or more of the variations described above. The legal limitations of the scope of the claimed invention are set forth in the claims that follow and extend to cover their legal equivalents. Those unfamiliar with the legal tests for equivalency should consult a person registered to practice before the patent authority which granted this patent such as the United States Patent and Trademark Office or its counterpart.

The invention claimed is:

1. A bullet-absorbing concrete structure constructed with a concrete mixture comprising:
   (i) about 1 part by mass cement;
   (ii) about 0.5 to 1.5 part by mass fine aggregate; and
   (iii) about 0.005 to 0.15 part by mass fiber;
   wherein the bullet-absorbing concrete structure is constructed with at least two arms and at least one center stem;
   wherein the concrete mixture does not include preformed foam;
   wherein the concrete mixture is poured at a density of less than about 90.8 pounds per cubic foot.

2. The concrete structure of claim 1, wherein the at least two arms include four arms and wherein the at least one center stem consists of one center stem, wherein planes including the outer edges of the four arms are perpendicular to a plane including the one center stem, wherein the one center stem and each of the four arms have two ends, and wherein one end of each of the four arms is connected to the one center stem.

3. The concrete structure of claim 2, wherein ballistic concrete mix is operable to be placed between any two of the four arms in order to create a solid block with increased bullet penetration resistance.

4. The concrete structure of claim 1, wherein the concrete structure is shaped substantially similar to an H, wherein the at least two arms include four arms, wherein the at least one center stem consists of a center stem, wherein each of the four arms includes two ends, wherein each of the four arms is connected to the center stem by one of the ends of each of the four arms, wherein the end of each of the four arms where each of the four arms is connected to the center stem is wider than the end of each of the four arms that is not connected to the center stem, and wherein the center stem has two ends, wherein two of the four arms originates from each of the two ends of the center stem, and wherein the two arms originating from each of the two ends of the center stem are collinear.

5. The concrete structure of claim 1, wherein the concrete mixtures includes an air entrainment additive.

6. The concrete structure of claim 1, wherein the concrete mixture further calcium phosphate and/or aluminum hydroxide.

7. The concrete structure of claim 1, wherein the concrete structure contains no additional metal in the form of metal plates or metal shielding.

8. The concrete structure of claim 1, wherein the concrete structure is shatter-resistant when struck with a bullet between about 4 mm (0.172 caliber) with muzzle velocity about 120 m/s (390 ft/s) and about 12.7 mm weighing 600-800 grains (40-50 g) (50 caliber) with muzzle velocity of 2800-3100 feet/sec (850-950 m/s) and kinetic energy of 12,000-15,000 foot-pounds (17-21 kJ).

9. A bullet-absorbing concrete structure constructed with a concrete mixture comprising:
(i) cement; and
air entrainment additive;
wherein the bullet-absorbing concrete structure is constructed with at least two arms and at least one center stem;
wherein the concrete mixture is poured at a density of less than about 90.8 pounds per cubic foot; and
wherein the concrete structure is constructed without foam or additional metal in the form of metal plates or metal shielding.

10. The concrete structure of claim 9, wherein the concrete mixture further comprises fine aggregate.

11. The concrete structure of claim 9, wherein the at least two arms include four arms and wherein the at least one center stem consists of one center stem, wherein planes including the outer edges of the four arms are perpendicular to a plane including the one center stem, wherein the one center stem and each of the four arms have two ends, and wherein one end of each of the four arms is connected to the one center stem.

12. The concrete structure of claim 11, wherein the four arms include inner and outer edges, and wherein the inner edges of the of the four arms contact the one center stem and the outer edges of the four arms do not contact the one center stem, and wherein the inner edges of the four arms are angled towards the center of the concrete structure relative to the outer edges of the four arms such that the inner edges of the four arms are not perpendicular to the one center stem.

13. The concrete structure of claim 11, wherein ballistic concrete mix is operable to be placed between any two of the four arms in order to create a solid block with increased bullet penetration resistance.

14. The concrete structure of claim 9, wherein the concrete structure is shatter-resistant when struck with a bullet between about 4 mm (0.172 caliber) with muzzle velocity about 120 m/s (390 ft/s) and about 12.7 mm weighing 600-800 grains (40-50 g) (50 caliber) with muzzle velocity of 2800-3100 feet/sec (850-950 m/s) and kinetic energy of 12,000-15,000 foot-pounds (17-21 kJ).

15. A bullet-absorbing concrete component constructed with a concrete mixture comprising:
(i) cement; and
(ii) fine aggregate;
wherein the concrete mixture is poured at a density of less than about 90.8 pounds per cubic foot;
wherein the concrete mixture includes air entrainment additive and/or wherein the concrete mixture does not include preformed foam;
wherein the bullet-absorbing concrete component is constructed with at least two arms and at least one center stem; and
wherein the concrete structure is constructed without foam or additional metal in the form of metal plates or metal shielding.

16. The concrete component of claim 15, wherein the concrete mixture further calcium phosphate and/or aluminum hydroxide.

17. The concrete component of claim 15, wherein the concrete component is shatter-resistant when struck with a bullet between about 4 mm (0.172 caliber) with muzzle velocity about 120 m/s (390 ft/s) and about 12.7 mm weighing 600-800 grains (40-50 g) (50 caliber) with muzzle velocity of 2800-3100 feet/sec (850-950 m/s) and kinetic energy of 12,000-15,000 foot-pounds (17-21 kJ).

18. The concrete component of claim 15, wherein the concrete mixture further comprises the air entrainment additive.

\* \* \* \* \*